United States Patent
Wohlert et al.

(10) Patent No.: US 8,792,419 B2
(45) Date of Patent: Jul. 29, 2014

(54) PRESENCE-BASED COMMUNICATION ROUTING SERVICE AND REGULATION OF SAME

(75) Inventors: Randolph Wohlert, Austin, TX (US); Steven Frew, Round Rock, TX (US); Milap Majmundar, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 953 days.

(21) Appl. No.: 12/756,473

(22) Filed: Apr. 8, 2010

(65) Prior Publication Data

US 2011/0249658 A1 Oct. 13, 2011

(51) Int. Cl.
*H04W 4/00* (2009.01)
(52) U.S. Cl.
USPC ............................................ 370/328; 370/338
(58) Field of Classification Search
USPC .................. 370/252, 310–350, 351, 464–465
See application file for complete search history.

(56) References Cited

U.S. PATENT DOCUMENTS

| | | | |
|---|---|---|---|
| 7,139,587 B2 * | 11/2006 | Ishii | 455/552.1 |
| 7,177,632 B1 | 2/2007 | Ringen et al. | |
| 7,245,913 B1 | 7/2007 | Nguyen et al. | |
| 7,336,945 B2 | 2/2008 | Ringen et al. | |
| 7,822,188 B1 | 10/2010 | Kirchhoff et al. | |
| 7,894,807 B1 | 2/2011 | Drennan | |
| 8,219,080 B2 * | 7/2012 | Sokondar | 455/432.1 |
| 8,229,431 B2 * | 7/2012 | Buckley et al. | 455/435.3 |
| 8,443,063 B1 * | 5/2013 | Nelson et al. | 709/221 |
| 2001/0023446 A1 * | 9/2001 | Balogh | 709/229 |
| 2002/0089985 A1 * | 7/2002 | Wahl et al. | 370/395.1 |
| 2004/0192306 A1 * | 9/2004 | Elkarat et al. | 455/435.2 |
| 2005/0101323 A1 * | 5/2005 | De Beer | 455/435.2 |
| 2005/0159184 A1 | 7/2005 | Kerner et al. | |
| 2006/0068786 A1 * | 3/2006 | Florence | 455/435.2 |
| 2006/0217153 A1 * | 9/2006 | Coles et al. | 455/558 |
| 2008/0299954 A1 | 12/2008 | Wright et al. | |
| 2009/0094680 A1 * | 4/2009 | Gupta et al. | 726/3 |

FOREIGN PATENT DOCUMENTS

| | | | | |
|---|---|---|---|---|
| WO | WO2004/031488 | * | 10/2003 | E01F 9/06 |
| WO | WO2004/031488 | * | 4/2004 | E01F 9/06 |
| WO | WO2008/123835 | * | 10/2008 | H04Q 7/32 |

OTHER PUBLICATIONS

Office Action dated Jun. 3, 2013 for U.S. Appl. No. 12/756,481, 38 pages.
Office Action dated Nov. 20, 2013 for U.S. Appl. No. 12/756,481, 39 pages.
Non-Final Office Action dated Mar. 24, 2014, U.S. Appl. No. 12/756,481, 44 pages.

* cited by examiner

*Primary Examiner* — Warner Wong
(74) *Attorney, Agent, or Firm* — Amin, Turocy & Watson, LLP

(57) ABSTRACT

Systems, methods, and user interfaces are provided for customized communication routing and regulation thereof. The routing of an incoming communication to a device, wireless or wireline, is based on a routing preference and a presence condition of a mobile device in a home or visited wireless environment served by a confined-coverage access point (AP). The routing preference can be configured for a device that operates in the home or visited wireless environment. The confined-coverage AP can be owned or leased by a subscriber associated with the incoming call or by a third party. Provisioning of routing of incoming call based on a third-party confined-coverage AP can be event-based. Add-on services can be provisioned and configured; screening of incoming call(s) based on screening rule(s) specific to an confined-coverage AP is provided. Customized communication routing to equipment that operates in a confined-coverage area served by a third-party confined-coverage AP can be cancelled.

20 Claims, 40 Drawing Sheets

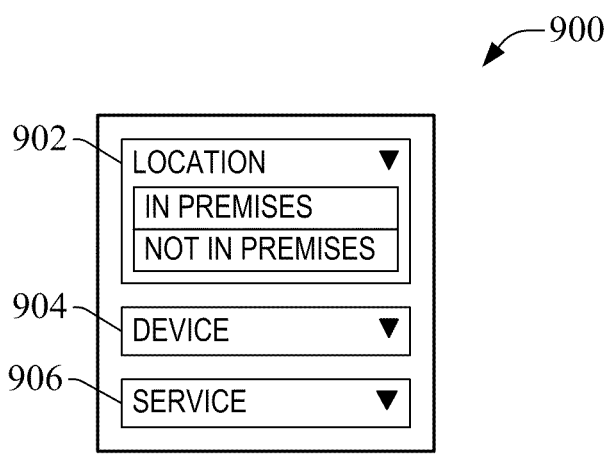
FIG. 9A
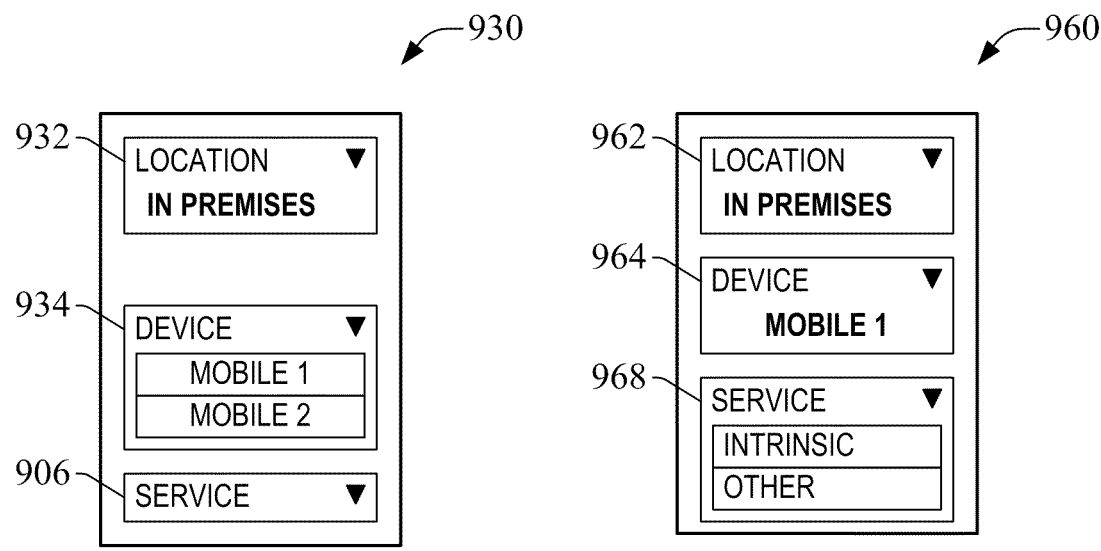
FIG. 9B  FIG. 9C

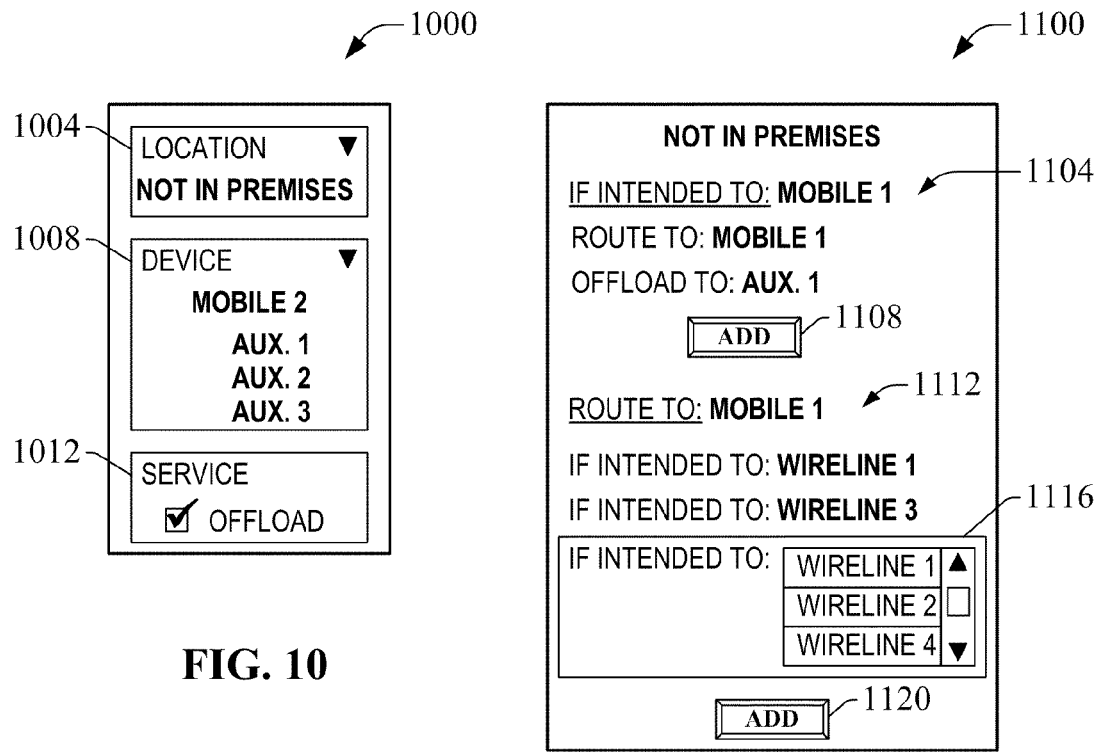
FIG. 10
FIG. 11
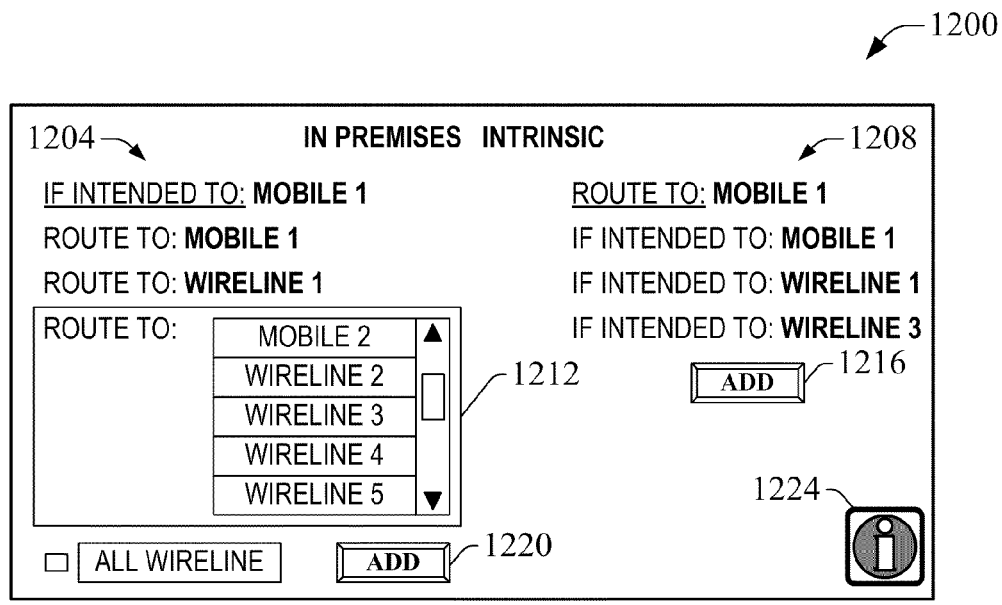
FIG. 12

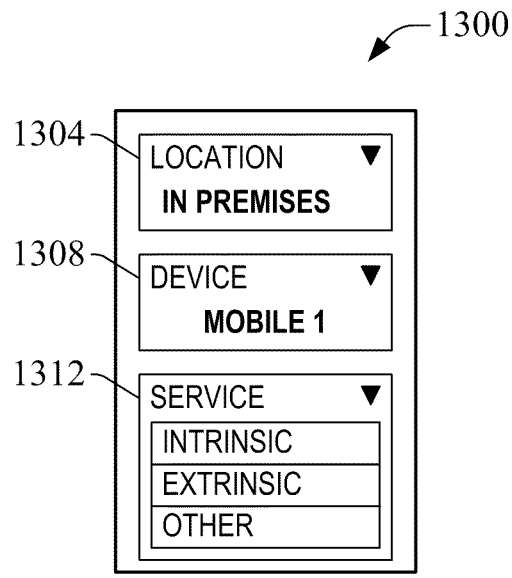
FIG. 13A
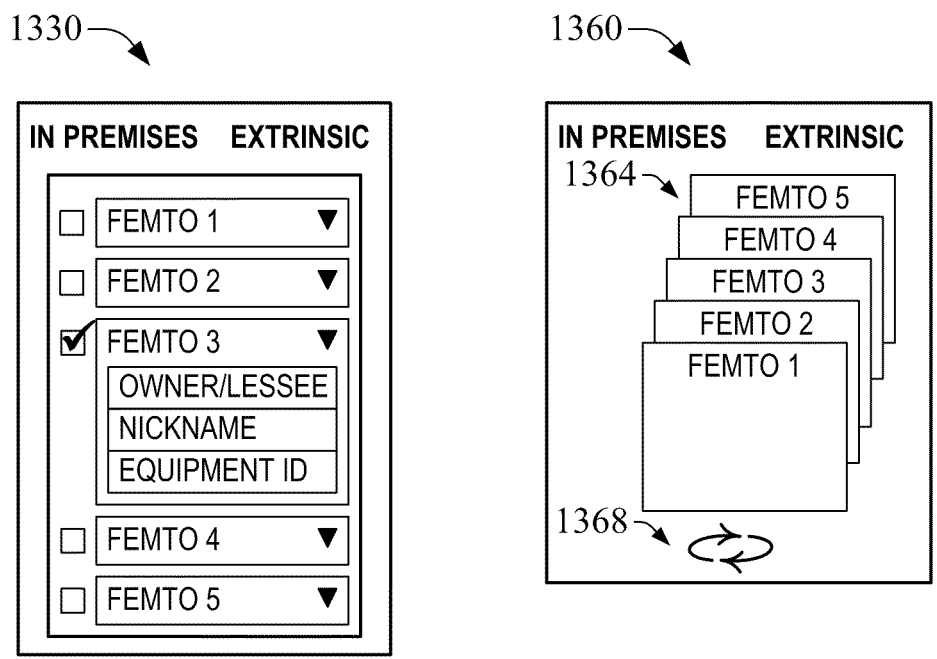
FIG. 13B
FIG. 13C

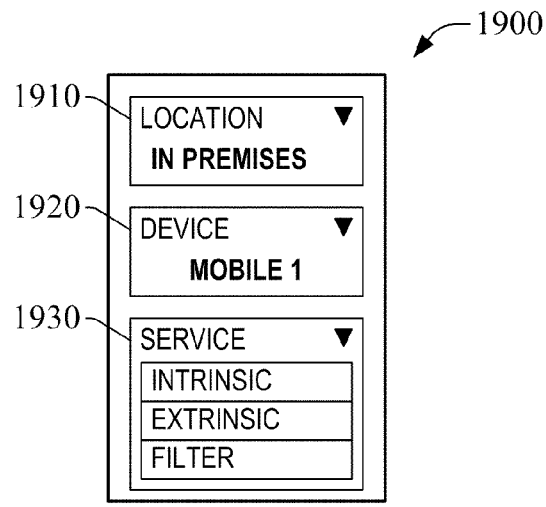
FIG. 19
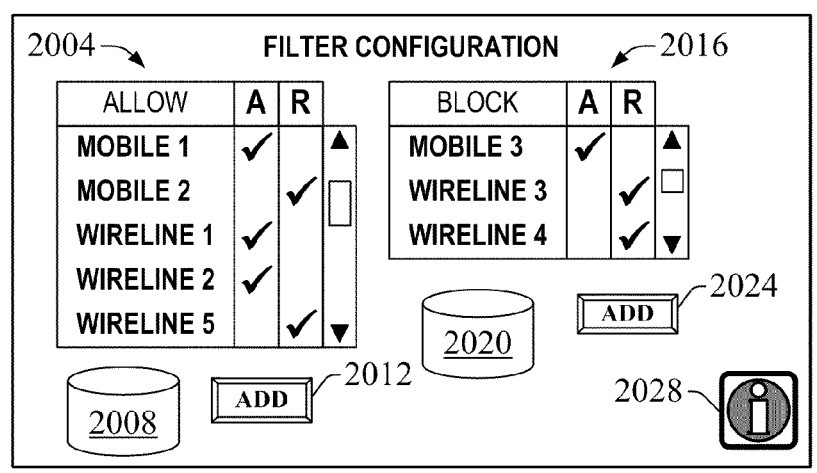
FIG. 20
FIG. 21

PRESENCE-BASED COMMUNICATION ROUTING SERVICE AND REGULATION OF SAME

CROSS-REFERENCE TO RELATED APPLICATION

The subject application is related to co-pending, and commonly assigned, U.S. patent application Ser. No. 12/756,481, entitled "COMMUNICATION ROUTING BASED ON PRESENCE IN A CONFINED WIRELESS ENVIRONMENT," and filed on Apr. 8, 2010. The entirety of the above-referenced application is incorporated herein by reference.

TECHNICAL FIELD

The subject disclosure relates to wireless and wireline communications and, more particularly, to communication routing service amongst wireless and wireline devices based on subscriber preferences and presence information of a mobile device in confined, home or visited wireless environments, and to regulation of the communication routing service.

BACKGROUND

Wireless communication offers an array of services that allow substantive personalization of mobile devices employed for telecommunication; thus, a significant segment of wireless service subscribers employ their mobile devices as primary point of contact with other parties, even when the mobile devices operate indoors. Available wireline services, such as digital television, internet protocol (IP) television, media on demand, broadband internet access, voice over internet protocol (VoIP) communications, also can provide highly customized services and can satisfy the communication needs of the wireless service subscribers—particularly within the confined environment in which the various devices that provide the wireline services are deployed. Even though a wireless subscriber has access to highly personalized service in both the wireless service domain and the wireline service domain, a calling party to a wireless subscriber generally originates a communication without knowledge of communication mechanism preference (e.g., wireless service or wireline service) of the wireless subscriber. In addition, the calling party typically does not know a current location of the wireless subscriber (at home, at the workplace, in transit in a vehicle, out of wireless service area, etc.), which can dictate election of a specific called device (e.g., cellular telephone, VoIP device) associated with the wireless subscriber. As a result, connectivity amongst the calling party and the wireless subscriber can suffer due to various usage pitfalls, with the ensuing perceived quality of service degradation. For example, the wireless subscriber may not be reached because the wireless subscriber was distanced from his mobile device when an important communication was directed to the mobile device; thus, the important communication can be directed to a voice mail inbox that is accessed at a time the communication has become irrelevant. As another example, the wireless subscriber may not be reached because the calling party directed her call to a wireline telephone in the wireless subscriber's office while the wireless subscriber was outside the office.

While wireline networks can be integrated with network elements that provide wireless services in indoor and outdoor environments, integration of wireless service domain and wireline service domain within indoor environments has been directed primarily to provision of certain control functions of specific devices, and telecommunication enhancement and continuity (e.g., call session preservation during handover from macrocell coverage to femtocell coverage). Generally, network integration and regulation thereof have not been exploited to pursue robust connectivity that mitigates common usage pitfalls amongst other wireless service deficiencies that can lead to low perceived quality of service and related subscriber attrition.

SUMMARY

The following presents a simplified summary of the subject disclosure in order to provide a basic understanding of some aspects thereof. This summary is not an extensive overview of the various embodiments of the subject disclosure. It is intended to neither identify key or critical elements of the subject disclosure nor delineate any scope thereof. Its sole purpose is to present some concepts in a simplified form as a prelude to the more detailed description that is presented hereinafter.

One or more embodiments of the subject disclosure provide systems, methods, and user interfaces that enable presence-based customized routing of an incoming communication to wireless device(s) or wireline device(s), and regulation of the presence-based customized routing. The customized routing is based on at least one routing preference and presence information of a mobile device in a confined wireless environment served by an access point. The spatial boundaries of the confined wireless environment are determined by the coverage range, or radius, of the access point, and thus the confined wireless environment can correspond to a confined coverage area which can include indoor space, outdoor space, or a combination thereof. The at least one routing preference is specific to a subscriber who owns (or leases) and operates the mobile device, and thus is a personalized routing preference. The at least one routing preference can be configured for a device, wireless or otherwise, that operates in a confined, home or visited wireless environment, whereas the confined-coverage AP can be owned or leased by a subscriber associated with the incoming call or by a third party. The confined-coverage AP provides wireless service to the confined wireless environment. The at least one routing preference is subscriber-specific and configurable by the subscriber linked to the mobile device, whereas the presence condition reveals if the mobile device is attached to the confined-coverage AP and is automatically detected. Presence-based customized communication routing of an incoming call based on a third-party confined-coverage AP can be provisioned in accordance with one or more events. In an aspect, the one or more events can include, for example, update of an access control list that regulates access to the third-party confined-coverage AP and wireless coverage furnished thereby; registration of a mobile device on a femtocell AP, which can enable extrinsic forwarding service; or the like. Add-on communication services also can be provisioned and configured; screening of incoming call(s) based on screening rule(s) specific to a confined-coverage AP that hosts customized communication routing service is provided. Customized communication routing to equipment that operates in a confined area served by a third-party confined-coverage AP can be cancelled.

A routing server retrieves or receives, or otherwise accesses, the at least one routing preference and the presence information for the mobile device. The presence information for the mobile device can originate in (i) a confined-coverage AP that serves a first confined area and is owned or leased by a subscriber that owns or leases the mobile device, or (ii) in a confined-coverage AP that serves a second confined area and is owned or leased by a third-party. Accordingly, the subscriber need not own or lease a confined-coverage AP to benefit from presence-based customized routing as described herein. In addition, the at least one routing preference can be specific to a confined-coverage AP owned or leased by the subscriber or a third-party confined-coverage AP. Based on routing logic applied to the at least one routing preference and the presence information, the routing server directs the incoming communication to a set of wireline devices, a set of wireless devices, or a combination thereof.

In an aspect, a customization server manages (e.g., retrieves, receives, generates, modifies, or commits) a set of routing preferences linked to a subscriber that consumes personalized communication routing; the routing preferences in the set are personalized routing preferences. In one or more embodiments, a configuration component that is part of the customization server provides a configuration environment (e.g., a graphical user interface, a user interface . . . ) to collect data that defines, at least in part, a routing preference that is personalized or specific to a subscriber. The routing preference can be configured for routing of an incoming communication based on presence condition in a confined-coverage AP owned or leased by the subscriber that configures the routing preference or in a third-party confined-coverage AP. As part of the configuration environment, distinctive ringing can be configured for a device that operates in a confined wireless area served by the third-party confined-coverage AP and receives a presence-based, custom routed call session. In such one or more embodiments, the configuration component also can provide a disparate configuration environment to collect data that establishes the screening rule(s) to be employed with a filtering service, which can be at least one of several add-on communication services available in conjunction with presence-based customized routing.

An interface component can render the configuration environment to receive the data; the interface component conveys the data to the customization component, which can commit the data in routing preference storage, or process (e.g., decode, modify) the data prior to data commitment in the routing preference storage. The configuration component is remote to the customization component and communicates thereto via an interface that can include at least one of wired links, wireless links, or network functional elements. In alternative or additional embodiments, the interface component and the customization component can be integrated in a subscriber device (e.g., a mobile device). Collected data that defines a routing preference is delivered to the customization server for management of at least one routing preference.

In another aspect, a client-server architecture enables generation of presence information of the mobile device based in part on processing of attachment signaling exchanged with a confined-coverage access point; generation can include detection, processing, and reporting of a presence condition of the mobile device. Based on deployment (e.g., installation, configuration, testing, and acceptance), the client-server architecture can implement various procedures to ascertain a presence condition of the mobile device. The procedures include (a) network-based procedures, wherein a presence client component embodied in a network element executes at least part of the procedures; (b) access-network-based procedures, wherein the presence client component resides in an confined-coverage access point and executes at least part of procedures; and (c) mobile device procedures, wherein the presence client component in the mobile device executes at least part of the procedures. For the various procedures, a presence server in the telecommunication network platform of a wireless service provider supplies, e.g., produces and stores, one or more presence condition records based on attachment notification(s) and related location data; such records can be retained in a memory, and reveal whether a mobile device is attached to a femtocell access point or not.

Aspects, features, or advantages of the subject disclosure are network and radio technology agnostic, and can be exploited in substantially any network and through most any or any wireless communication technology. For example, Wi-Fi (wireless fidelity), Worldwide Interoperability for Microwave Access (WiMAX); IS-95; Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA), or LTE Advanced. Additionally, substantially all or all aspects of the subject disclosure can include legacy telecommunication technologies.

While various aspects, features, or advantages of the subject disclosure are illustrated in reference to femtocell (femto) access point(s), such aspects and features also can be exploited in other types of confined-coverage access points (e.g., home-based access point(s), enterprise-based access point(s)) that provide wireless coverage to a confined wireless environment through substantially any or any disparate telecommunication technologies such as, but not limited to, Wi-Fi or picocell telecommunication.

To the accomplishment of the foregoing and related ends, the subject disclosure, then, comprises the features hereinafter fully described. The following description and the annexed drawings set forth in detail certain illustrative aspects of one or more embodiments of the disclosure. However, these aspects are indicative of but a few of the various ways in which the principles of the subject disclosure may be employed. Other aspects, advantages and novel features of the subject disclosure will become apparent from the following detailed description of various example embodiments of the subject disclosure when considered in conjunction with the drawings.

BRIEF DESCRIPTION OF DRAWINGS

FIGS. 9A-9C illustrate a set of three example user interfaces that can be rendered as part of configuration of a communication routing service(s) in accordance with aspects described herein.

FIGS. 10-12 illustrate example user interfaces that can be rendered as part of configuration of a communication routing service in accordance with aspects described in the subject disclosure.

FIGS. 13A-13C illustrate a set of three example user interfaces that can be rendered as part of configuration of a communication routing service based in part on at least one of a femtocell presence condition and one or more routing preferences in accordance with aspects described herein.

FIG. 19 displays an example UI to configure a routing service for a specific device based on location according to aspects described herein.

FIG. 20 represents an example UI that enables configuration of a screening criterion in accordance with aspects of the subject disclosure.

FIG. 21 presents an example UI that can prompt an end-user that owns or leases a femtocell AP to select a group of mobile devices that can exploit extrinsic forwarding service and related service(s) in accordance with aspects described herein.

DETAILED DESCRIPTION

Figure 1:
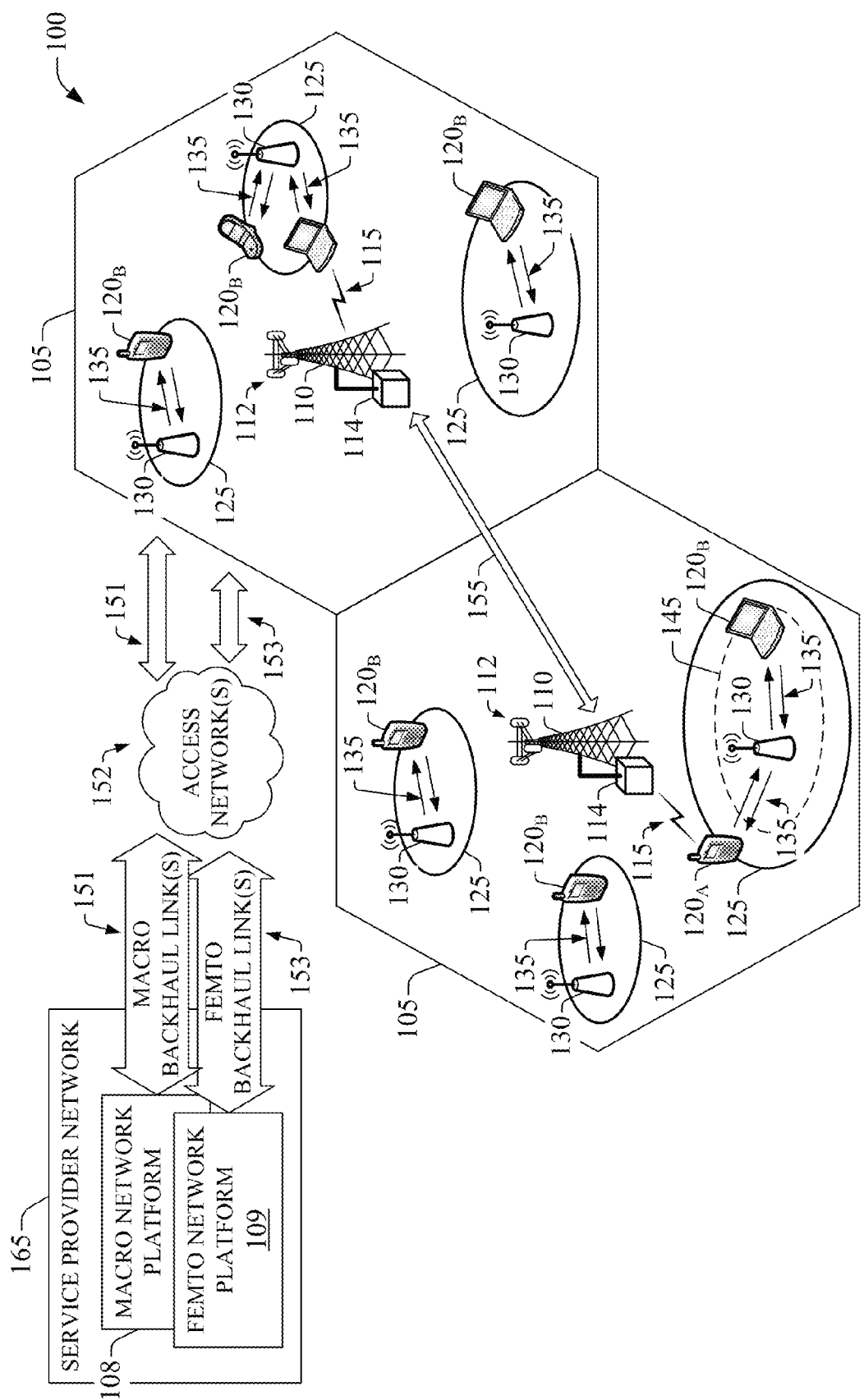
FIG. 1 illustrates a schematic deployment of a macrocells and a femtocells for wireless service coverage in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the present disclosure. It may be evident, however, that the present innovation may be practiced without these specific details. In other instances, well-known structures and devices are shown in block diagram form in order to facilitate describing the present disclosure.

As employed in this specification and annexed drawings, the terms "component," "system," "platform," "interface," "node," "driver," "coder," "decoder" "layer," and the like are intended to refer to a computer-related entity or an entity related to an operational apparatus with one or more specific functionalities, wherein such entities can be either hardware, a combination of hardware and software, software, or software in execution. One or more of such entities are also referred to herein as "functional elements." As an example, a component may be, but is not limited to being, a process running on a processor, a processor, a memory, a code object, an executable code instruction, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures or code instructions stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, node, driver, coder, decoder, layer, and the like.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP);" "base station," "Node B;" "evolved Node B (eNode B);" "home Node B (HNB)" or "home access point (HAP)," which include femtocell access point, picocell access point, Wi-Fi base station . . . ; and the like, are utilized interchangeably in the subject application, and refer to a wireless network component or apparatus that at least delivers and receives data, control, voice, video, sound, gaming, or substantially any or any data stream or signaling stream. Sources or recipients of such data, control, voice, video, sound, gaming, or substantially any or any data stream or signaling stream can be at least a set of network components such as, but not limited to, user equipment, customer premises equipment, or network servers, controllers, gateways or management components. Data and signaling streams can be packetized or frame-based flows. It is noted that context in the subject specification generally distinguishes amongst a base station that provides or is intended to provide primarily outdoor wireless coverage and a facility-based access point (e.g., femtocell AP) that provides or is intended to provide primarily indoor wireless coverage or outdoor wireless coverage within a confined range. Explicit distinction between indoor-serving AP and outdoor-serving base station is made when context may be insufficient to distinguish the utilized terms.

Furthermore, the terms "user," "subscriber," "customer," "consumer," and the like are employed interchangeably throughout the subject specification, unless context warrants particular distinction(s) among the terms. It should be appreciated that such terms can refer to human agent(s) or automated component(s) supported through artificial intelligence (e.g., a capacity to make inference based on complex mathematical formalisms) which can provide simulated vision, sound recognition and so forth.

Further yet, the term "set" as employed herein excludes the empty set. Thus, a "set" in the subject disclosure includes one or more elements or entities. As an illustration, a set of devices includes one or more devices; a set of access points includes K access points with K a natural number greater than or equal to unity; a set of attributes spans one or more attributes; etc.

As described in detail below, the subject disclosure provides system(s) and method(s) that enable routing of an incoming communication, or incoming call, to wireless device(s) or wireline device(s) based in part on at least one routing preference and presence information of a mobile device in a confined wireless environment served by a confined-coverage access point. The at least one routing preference is specific to a subscriber who owns (or leases) and operates the mobile device, and thus the at least one routing preference is personalized to the subscriber. A routing server retrieves or receives, or otherwise accesses, the at least one routing preference and the presence information for the mobile device. In an aspect, the routing server is functionally coupled to or integrated, at least in part, with one or more functional elements of a telecommunication network platform that enable standard call processing. Based on routing logic applied to the at least one routing preference and the presence information, the routing server directs the incoming communication to a set of wireline devices, a set of wireless devices, or a combination thereof.

Calls referred to and described in the subject disclosure, e.g., incoming calls or call sessions, include voice communications and data communications, such as multimedia communications (video call, text message, audio communication, data communication, etc.) In addition, the various devices referred to and described herein include any communication devices, such as cellphones, wireline telephones, personal computers, portable computers (e.g., netbooks or laptops), personal digital assistants (PDAs), Moving Picture Experts Group (MPEG)-1 Audio Layer 3 (MP3) players, set top boxes, television sets (TVs), stereo players, radio tuners (satellite-signal based or conventional), gaming boxes (set top or portable), digital video recorders (DVRs), or the like.

Features or aspects described in the subject disclosure can rely, at least in part, on delivery or reception of directive(s), indication(s), request(s), or the like, and information or payload data (e.g., content(s)) associated therewith. Directive(s) can be embodied in multi-bit words (e.g., P-bit words, with P a positive integer) and coded to specifically convey a request to a particular functional element (e.g., a femtocell AP) in order to execute one or more specific operation. Information or payload data within signaling, and request(s) or indication(s) conveyed therein, can be embodied, for example, in one or more reserved bits in a packet header, a light-payload (e.g., of the order of 1 byte) data packet, a predetermined multi-bit word conveyed in a control channel, a lightweight file (e.g., a cookie), an email communication, an instant message, or the like. In addition, directive(s), request(s), indication(s), or the like, as described herein, can be delivered in accordance with various communication protocols. As an example, the various protocols can include at least one of file transfer protocol (FTP), secure shell FTP (SFTP), FTP over secure socket layer (FTPS), short message service (SMS) protocol, multimedia messaging service (MMS) protocol, unstructured supplementary service data (USSD) standard, simple network management protocol (SNMP), lightweight directory access protocol (LDAP), session initiation protocol (SIP), SIP for Instant Messaging and Presence Leveraging Extensions (SIMPLE), Open Mobile Alliance (OMA) device management (DM) protocol, Technical Report 069 (TR-069) protocol, also referred to as Customer Premise Equipment (CPE) Wide Area Network (WAN) Management Protocol or CWMP, or the like.

While aspects or features of the subject disclosure are illustrated in terms of applicability to femtocell access points, such aspects and features are also applicable to, and can be exploited in, other radio access points such as Wi-Fi APs, picocell base station, microcell base stations, or the like, which may provide greater radio access capacity.

Various illustrative scenarios are set forth herein to represent example operational environments that exploit one or more features of communication routing based on femtocell present intelligence as described herein, and reveal the utility of such one or more features. The various illustrative scenarios are, of course, not exhaustive of the multiple operational environments in which the one or more features described in the subject disclosure can be exploited. In addition, the various illustrative scenarios and related examples are intended to be non-limiting, without restricting the applicability or utility of the various embodiments of systems and methods described herein, or any modification or variations thereof.

With respect to the drawings, FIG. 1 illustrates a schematic deployment of a macrocells and a femtocells for wireless service coverage in accordance with aspects of the subject disclosure. In wireless environment 100, two areas 105 represent macrocell (macro) cell coverage, each macrocell is served by a base station 110, which includes a set of one or more antennas 112 and various equipment or apparatuses 114 that enable operation of the base station. It should be appreciated that macro cells 105 are illustrated as hexagons; however, macrocells can adopt other geometries generally dictated by the deployment or floor plan, geographic areas to be covered (e.g., a metropolitan statistical area (MSA) or rural statistical area (RSA)), and so on. Macro coverage is generally intended to serve mobile wireless devices, like UE $120_A$, in primarily outdoor locations. An over-the-air wireless link 115 provides such coverage, the wireless link 115 comprises a downlink (DL) and an uplink (UL), and utilizes a predetermined band of the radio frequency (RF) spectrum. As an example, UE $120_A$ can be a Third Generation Partnership Project (3GPP) Universal Mobile Telecommunication System (UMTS) mobile phone. It is noted that a base station, its associated electronics, circuitry or components, and a wireless link operated in accordance to the base station form a radio access network (RAN). In addition, base station 110 communicates with macro network platform 108 via backhaul link(s) 151 through one or more components (e.g., radio network controller(s), aggregator component(s) . . . ) that are part of access network(s) 152; aspects and deployment of the one or more components are dictated by the underlying radio technology employed for telecommunication. In cellular wireless technologies (e.g., 3rd Generation Partnership Project (3GPP) Universal Mobile Telecommunication System (UMTS), Global System for Mobile Communication (GSM)), macro network platform 108 represents a core network. In an aspect, macro network platform 108 controls a set of base stations 110 that serve either respective cells or a number of sectors within such cells. Macro network platform 108 also communicates with other base stations (not shown) that serve other cells (not shown). Backhaul link(s) 151 can include a wired backbone link (e.g., optical fiber backbone, twisted-pair line, T1/E1 phone line, a digital subscriber line (DSL) either synchronous or asynchronous, an asymmetric ADSL, or a coaxial cable . . . ). Backhaul pipe(s) 155 link disparate base stations 110.

In wireless environment 100, within one or more macro coverage cells 105, a set of femtocells 125 served by respective femtocell (femto) access points (APs) 130 can be deployed. While in illustrative wireless environment 100 three femtocells are deployed per macrocell, aspects of the subject innovation are geared to femtocell deployments with substantive femto AP density, e.g., $10^4$-$10^8$ femto APs 130 per base stations 110. A femtocell 125 typically covers an area that includes confined area 145, which is determined, at least in part, by transmission power allocated to femto AP 130, path loss, shadowing, and so forth. While coverage area associated with femtocell 125 and confined area 145 typically coincide, it should be appreciated that in certain deployment scenarios, coverage area 125 can include an outdoor portion (e.g., a parking lot, a patio deck, a recreation area such as a swimming pool and nearby space) while area 145 spans an enclosed living space. The coverage area associated with femtocell 125 typically is spanned by a coverage radius, or coverage range, that ranges from 20 to 100 meters. The confined coverage area 125 can encompass a setting that can span about 5000 sq. ft., and can include a residential dwelling, a business space, an entertainment area, a worship area, an educational facility, a wellness area, a hospital, etc., and access to wireless service typically is regulated. In addition or in the alternative, the confined coverage area 125 can be mobile; for example, it can be part of a vehicle (a car, an elevator, an aircraft, a vessel, etc.). It should be noted that the confined coverage area is substantially smaller, e.g., 1-3 orders of magnitude smaller, than a macrocell 105.

In the subject disclosure, a confined coverage area, such as confined coverage area 125, embodies a confined wireless environment, which, as indicated supra, can include indoor space, outdoor space, or a combination thereof. In addition, femtocell AP (e.g., 130) or any other type of access point (e.g., Wi-Fi AP, picocell AP) that serves the confined coverage area (e.g., 125) is referred to as confined-coverage AP, to denote that such an AP provides wireless service coverage to a confined wireless environment. Moreover, a confined-coverage AP transmits electromagnetic radiation (e.g., radiates) at lower power than a base station intended for outdoor coverage and that serves a macrocell. In an aspect, an AP (e.g., femtocell AP, picocell, Wi-Fi AP) that serves the confined coverage area (e.g., 125) can be deployed within the indoor space (e.g., within a building or structure) that the AP serves;

outdoor space that is part of the confined coverage area (e.g., confined coverage area 125) also is served by the AP. In yet another aspect, an AP that covers the confined coverage area (e.g., 125) can be deployed in the outdoor space that the AP serves; in certain deployments the AP can be mounted on or attached to non-residential structure present in the outdoor space that is part of the confined area. A confined coverage area (e.g., confined coverage area 125) referred to in the subject disclosure is owned or leased by the owner or lessee of the AP that serves the confined coverage area; where the AP is deployed as part of structure (mobile or stationary) within the confined-coverage area.

A femto AP 130 typically serves a few (for example, 1-5) wireless devices (e.g., subscriber station $120_B$) within confined coverage area 125 via a wireless link 135 which encompasses a downlink (DL) and an uplink (UL). A femto network platform 109 can control such service, in addition to mobility handover from macro-to-femto handover and vice versa, and registration and provisioning of femto APs. Control, or management, is facilitated by backhaul link(s) 153 that connect deployed femto APs 130 with femto network platform 109 through one or more components of access network(s) 152. The one or more components can include a network interface device (NID), a gateway node, a digital subscriber line (DLS) access multiplexer (DSLAM), or the like. In addition, the one or more components of access network(s) 152 can be functionally coupled to an access aggregator node 420, which can be embodied in a broadband remote access server (B-RAS); such aggregator node generally is functionally coupled to a femtocell gateway node (not shown) deployed (e.g., installed, configured, and active) within femto network platform 109. Backhaul pipe(s) 153 are substantially the same as backhaul link(s) 151. In UMTS-based radio technology, backhaul link 150 is embodied, at least in part, in Iuh interface.

In an aspect of the subject innovation, part of the control effected by femto AP 130 is based on measurements of radio link conditions and other performance metrics. Femto network platform 109 also includes components, e.g., nodes, gateways, and interfaces, that facilitates packet-switched (PS) (e.g., internet protocol (IP)) traffic and signaling generation for networked telecommunication. It should be appreciated that femto network platform 109 can be femto AP 130 can integrate seamlessly with substantially any packet switched (PS)-based and circuit switched (CS)-based network such as macro network platform 108. Thus, operation with a wireless device such as $120_A$ is substantially straightforward and seamless when handover from femto-to-macro, or vice versa, takes place. As an example, femto AP 130 can integrate into an existing 3GPP Core Network via conventional interfaces, or reference links, such as Iu-CS, Iu-PS, Gi, or Gn. In addition, femto AP 130 can serve a mobile device that operates in accordance with 3GPP radio technology(ies) without dedicated functionality, such as Wi-Fi receivers.

It is to be noted that substantially all voice or data active sessions associated with subscribers within femtocell wireless coverage (e.g., area 125) are terminated once the femto AP 130 is shut down; in case of data sessions, data can be recovered at least in part through a buffer (e.g., a memory) associated with a femto gateway at the femto network platform. Coverage of a suspended or hotlined subscriber station or associated account can be blocked over the air-interface. However, if a suspended or hotlined customer who owns a femto AP 130 is in Hotline/Suspend status, there is no substantive impact to the customers covered through the subject femto AP 130. In another aspect, femto AP 130 can exploit high-speed downlink packet access either via an interface with macro network platform 108 or through femto network platform 109 in order to accomplish substantive bitrates.

In addition, in yet another aspect, femto AP 130 has cell identifier(s) (e.g., in UMTS-based radio technology, a LAC (location area code) or a RAC (routing area code)) that is different from the underlying macro network. It should be appreciated that in macro networks, cell identifiers (IDs) such as LAC and RAC are reused over several base stations, or Node Bs, and large areas so location information, or intelligence, accuracy and attachment procedure(s) (e.g., LAU or RAU) frequency are relatively low. It should be noted that based at least in part on radio technology deployment for macro networks, cell ID reuse granularity may differ, wherein radio technologies with distributed processing and more signaling capacity may afford more granular cell ID (e.g., LAC and RAC) assignments.

Femto LAC and RAC are used to identify subscriber station location for a variety of reasons, most notably to direct incoming voice and data traffic to appropriate paging transmitters, and emergency calls as well. As a subscriber station (e.g., UE $120_A$) that exploits macro coverage (e.g., cell 105) enters femto coverage (e.g., area 125), the subscriber station (e.g., UE $120_A$) attempts to attach to the femto AP 130 through transmission and reception of attachment signaling. The signaling is effected via DL/UL 135; in an aspect of the subject innovation, the attachment signaling can include a Location Area Update (LAU) and/or Routing Area Update (RAU). As an example of attachment procedure and mechanis(s) associated therewith, UMTS handsets monitor network pilots, e.g., generated through a femtocell, or femtocell AP, while in the idle mode; each pilot includes LAC and/or RAC. As a subscriber station moves between pilots, e.g., moves within a macro sector and reaches vicinity of a femto cell, the subscriber station probes for a change in LAC or RAC. When a change in LAC or RAC is detected, the subscriber station performs LAU and/or RAU so mobile network(s) becomes aware of subscriber station location in order to properly route incoming call pages. Attachment attempts are thus a part of procedures to ensure mobility, so voice calls and data sessions can be initiated even after a macro-to-femto transition or vice versa.

It is to be noted that UE $120_A$ can be employed seamlessly after either of the foregoing transitions. In addition, femto networks typically are designed to serve stationary or slow-moving traffic with reduced signaling loads compared to macro networks. A service provider network 165 (e.g., an entity that commercializes, deploys, or utilizes femto access point 130 or macrocell base stations 110) is therefore inclined to minimize unnecessary LAU/RAU signaling activity at substantially any opportunity to do so, and through substantially any available means. It is to be noted that substantially any mitigation of unnecessary attachment signaling/control is advantageous for femtocell, or femtocell AP, operation. Conversely, if not successful, UE $120_A$ is generally commanded (through a variety of communication means) to select another LAC/RAC or enter "emergency calls only" mode. It is to be appreciated that this attempt and handling process can occupy significant UE battery, and femto AP capacity and signaling resources (e.g., communication of pilot sequences) as well.

When an attachment attempt is successful, UE $120_A$ is allowed on femtocell 125, and incoming voice and data traffic are paged and routed to the subscriber through the femto AP 130. To facilitate voice and data routing, and control signaling as well, successful attachment can be recorded in a memory register, e.g., a Visited Location Register (VLR), or substantially any data structure stored in a network memory. It is to be noted also that packet communication (e.g., voice and data traffic, and signaling) typically paged/routed through a backhaul broadband wired network backbone 153 (e.g., optical fiber backbone, twisted-pair line, T1/E1 phone line(s), T3 phone line(s), digital level zero line (DS0), digital subscriber line (DSL) either synchronous or asynchronous, an asymmetric DSL, a coaxial cable . . . ). To this end, femto AP 130 is typically connected to the broadband backhaul network backbone 140 via a broadband modem (not shown). In an aspect of the subject innovation, femto AP 130 can display status indicators for power, active broadband/DSL connection, gateway connection, and generic or specific malfunction. In another aspect, no landline is necessary for femto AP 130 operation.

Figure 2:
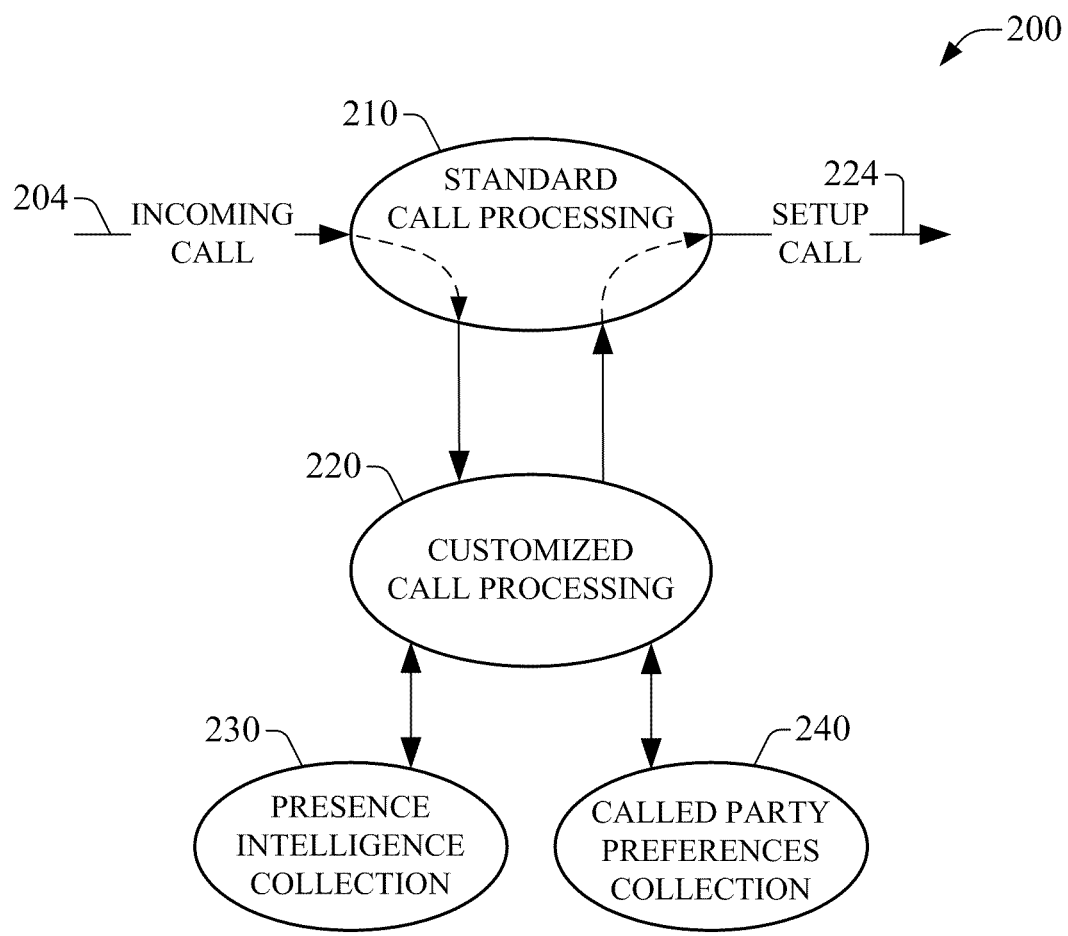
FIG. 2 illustrates displays a diagram that illustrates logic that provides communication routing service based on femtocell presence condition in accordance with aspects of the subject disclosure.

FIG. 2 displays a diagram 200 that illustrates logic that provides customized communication routing service of calls in accordance with aspects described herein. The customized communication routing service can based in part on at least one of a femtocell presence condition and one or more routing preferences. In addition or in the alternative, the communication routing service can exploit one of the femtocell presence condition or the one or more routing preferences. Calls referred to and described in the subject disclosure, e.g., incoming calls or call sessions, include voice communications and data communications, such as multimedia communications (video call, text message, audio communication, data communication, etc.). The subject logic can be represented in one or more example methods described herein. One or more systems in accordance with aspects of the subject disclosure implement, e.g., execute, the one or more example methods to effect the subject logic.

An incoming call 204 is initially processed in accordance with standard call processing logic 210, which in an aspect of the subject disclosure is configured, e.g., adapted or modified, to enable processing of the incoming call 204 in accordance with customized call processing logic 220—such enablement illustrated with a dashed arrow outgoing from block 210 to block 220. The incoming call 204 can be a wireless call or a wireline call. Customized call processing logic 220 consumes information generated as part of presence intelligence collection logic 230 and called-party routing preferences collection logic 240. In the subject specification and annexed drawings, routing preferences are also referred to as preferences. A subscriber that utilizes the customized communication routing service can configure at least one routing preference. The presence intelligence collection logic 230 produces a femtocell presence condition associated with a location of a destination mobile device (e.g., UE 120$_B$); the femtocell presence condition can be embodied in a record (e.g., a logical variable or a field entry in table) retained in a memory or memory element, such as a database or a memory register. Based on at least one of a presence condition and a routing preference, customized call processing logic 220 determines appropriate call handling to apply and, after applying such handling, it provides signaling, and related payload data, to standard call processing logic 210—such provision is illustrated in the subject drawing as an outgoing dashed arrow. Standard call processing logic 210 consumes such signaling, and related payload data, and completes call session establishment resulting in setup call 224, which can be consumed in a wireline device or a wireless device, or any combination thereof.

The various aspects disclosed herein in connection with customized call processing do not affect adversely the operational features of wireless devices and wireline devices that establish a call session 224 according to aspects described herein. A subscriber that consumes the customized routing service set forth in the subject disclosure continues to be able to utilize their wired and wireless devices to communicate without operation features thereof being degraded.

Implementation of the logic described in connection with diagram 200 enables at least the communication scenarios illustrated in FIGS. 3-4. In diagram 300 of a first communication scenario, a confined area 302 is afforded wireless service through femtocell AP 320, also referred to herein and annexed drawings as femto AP 320. The femtocell AP 320 is connected to an access network (e.g., 152) via NID 330. The confined area 302 is illustrated as a residential dwelling, such as a single-family home or an apartment, with four living areas 315$_1$-315$_4$ and one exterior space 315$_5$ (e.g., a deck, patio, veranda, garage, or combination thereof) covered by femtocell AP 320. It should be appreciated that while a single femto AP 320 is illustrated, features of the subject communication scenario are also realized in dwelling areas covered by a plurality of two or more femtocell access points. It should further be appreciated that the confined area 302 can be embodied in other locations such as a business space (e.g., a hotel); an enterprise place of operation; a factory; an entertainment area which can include bars, night-clubs, or the like; a worship area such as a church or mosque; an educational facility, which can include open and semi-open spaces as it may be the case in a college campus; a wellness area, e.g., a health club; a hospital or nursing home; etc. In addition, femto AP 320 or one femto AP in the plurality of one or more femtocell APs can supply wireless service to more or less than four indoor areas and one exterior space.

In an aspect of the subject first scenario, mobile device 310 can be located in living area 315$_3$, within an enclosure (e.g., a purse located in an upstairs bedroom) or deposited in a piece of furniture (e.g., dresser in the upstairs bedroom). A subscriber linked to the mobile device 310, e.g., the mobile device's owner, can roam throughout the residential dwelling 302 without carrying mobile device 306. In particular, the subscriber, illustrated with a solid star, can be at living area 315$_1$ (e.g., the kitchen of residential dwelling 302) conducting a specific activity (e.g., cooking with grandchildren, or cooking and watching television) when an incoming call 204 directed to mobile device 310 is effected. As an example, incoming call 204 can be a voice call placed by the subscriber's neighbor to alert the subscriber that the subscriber's dog is loose in the neighbor's backyard. In conventional communication scenarios that do not exploit customized call processing logic 220, the subscriber misses the established call session 224. In contrast, if customized call processing logic 220 is configured, in instances the subscriber is at the residential dwelling 302, incoming call 204 intended for mobile device 310 can be automatically routed as a call session 224 (e.g., voice call) to one or more devices, wireless or wireline, within residential dwelling 302; e.g., devices 306, 308, 312, or 314, or a combination thereof. In particular, call session 224 can be established through wireline telephone 312 placed in living area 315$_1$ and thus the subscriber can answer the call session 224. Such communication behavior has at least the following advantages with respect to conventional communication scenarios: (i) Improved service experience for the subscriber and related customer satisfaction with the ensuing enhanced service provider stickiness (e.g., lessened churn reduction), and (ii) increased connectivity and related service delivery.

In the foregoing communication scenario, the instances in which the subscriber is within confined area 302 can be asserted based at least on a presence condition extracted from data on attachment to femtocell AP 320. Likewise, instances in which the subscriber is outside area of femtocell service coverage also can be asserted based at least on a presence condition gleaned from data on attachment to a macrocellular base station (not shown in FIG. 3). As described in greater detail below, changes in presence conditions associated with mobility of mobile device 310 outside femtocell service coverage can result in incoming calls 204 intended to mobile device 310 no longer being routed to one or more devices within the confined area 302.

Figure 3:
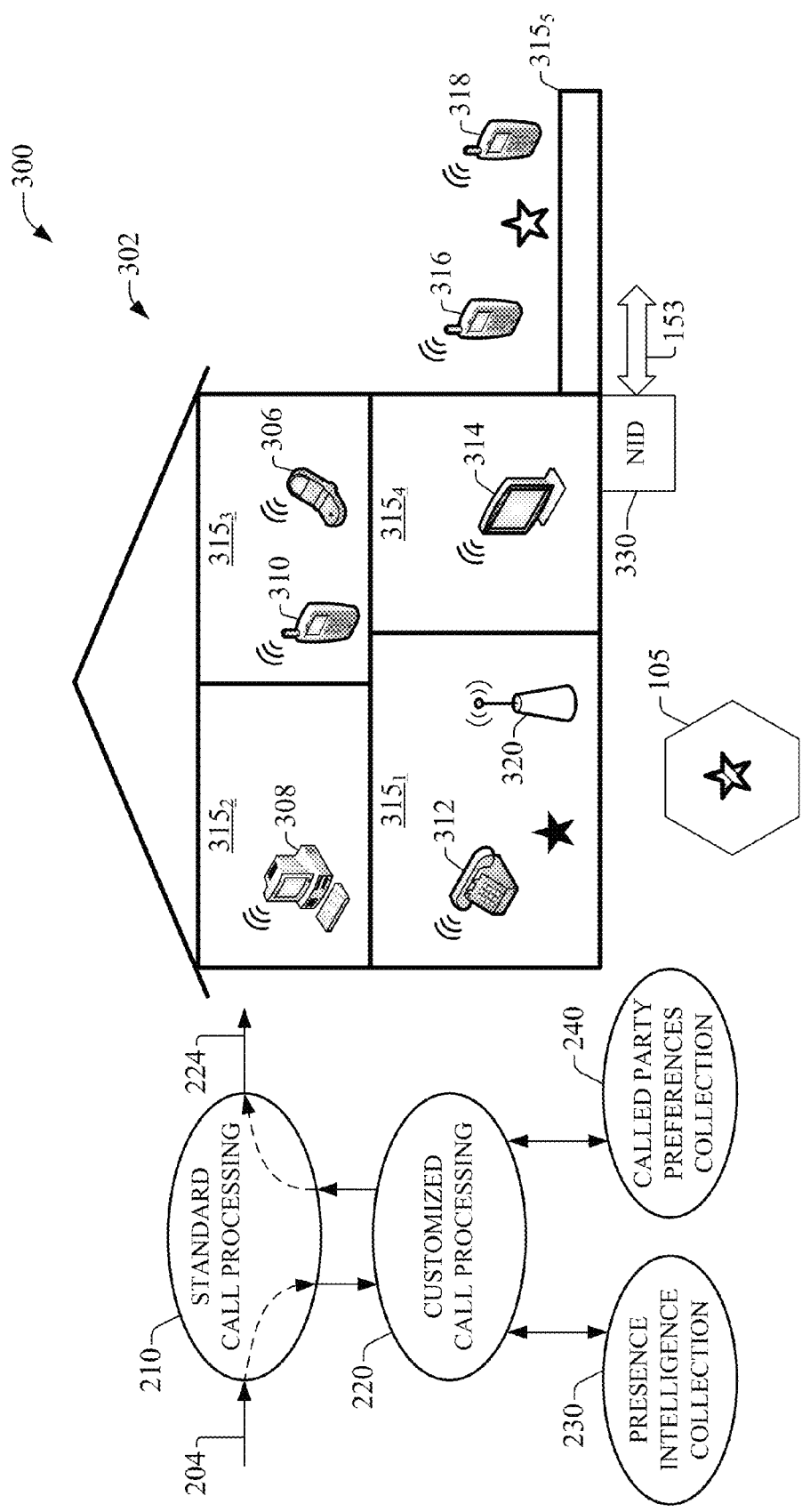
FIGS. 3-4 illustrate example communication scenarios that can be enable through implementation of the logic in FIG. 2 in accordance with aspects described herein.
Figure 4:
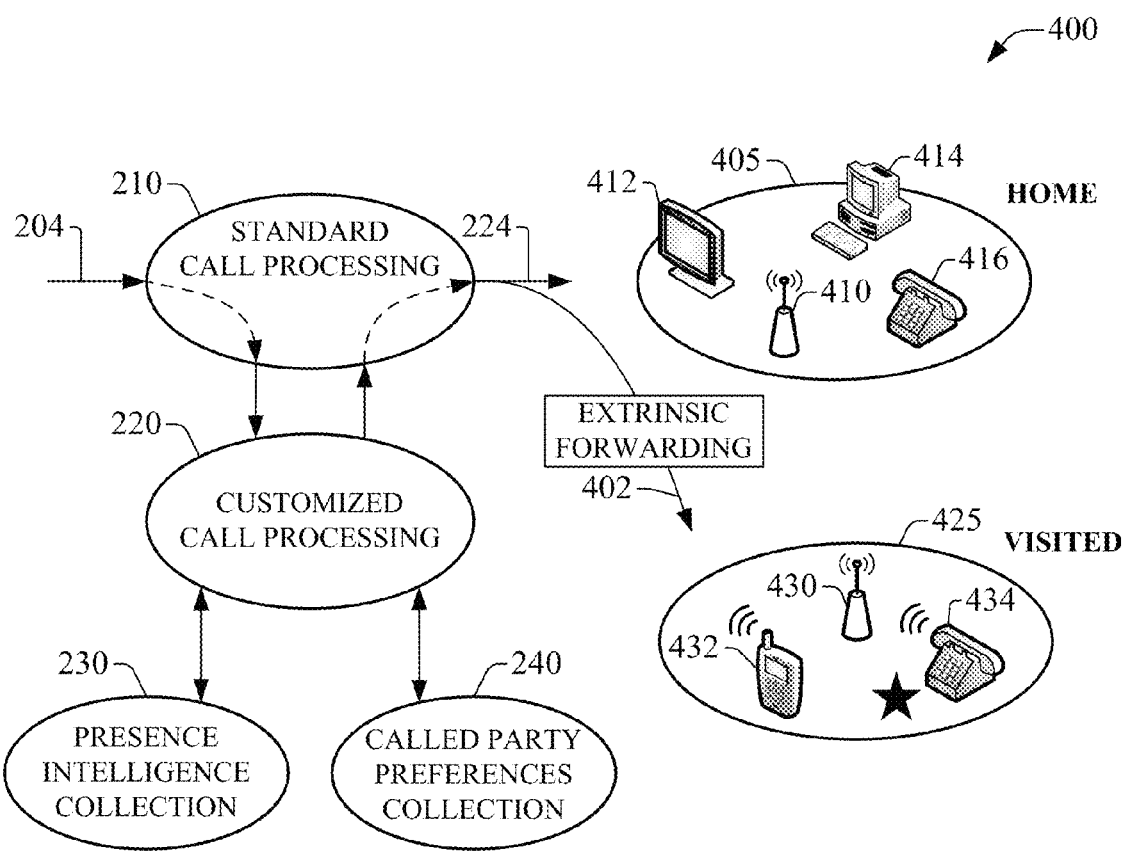

In another aspect of the subject first communication scenario, the subscriber can be in a semi-open area, e.g., area $315_5$, separated from mobile device 310 when incoming call 204 (e.g., voice call) directed to mobile device 310 is effected; the subscriber represented by an open star in FIG. 3. In view that the subscriber is distanced from the mobile device 310, in conventional communication scenarios that do not exploit customized call processing logic 220, the subscriber typically misses the incoming call 204. Yet, when customized call processing logic 220 is enabled and active (e.g., configured with a set of routing preferences), and based on at least one routing preference and a presence record, the incoming call 204 can be routed as a call session 224 to one or more devices (e.g., wireless devices 316 and 318) that are attached to femtocell AP 320. The at least one preference can be configured (e.g., generated, conveyed, or committed) by the subscriber via at least one functional element (e.g., a device or apparatus). Proximity of such mobile stations to the subscriber (represented by open star) and the subject customized routing prevent the subscriber from missing the incoming call 204 and enable the subscriber to engage in the call session 224 originating from incoming call 204. In an aspect, the subject disclosure allows simultaneous or substantially simultaneous ringing of mobile device 310 and mobile stations 316 and 318. Specific ringtones can alert the subscriber and bearers of mobile stations 316 and 318 that the established call session is intended for the subscriber. As an illustration, after entering confined area 302, the subscriber can leave the mobile device 310 in her purse in living space $315_3$ while bearers of mobile stations 316 and 318, who can be family members of the subscriber, carry such mobile stations with them while inside the confined area 302. If the subscriber (represented with an open star) and the bearers of mobile stations 316 and 318 are located in exterior space $315_5$ and incoming call 204 intended for mobile device 310 is effected by an end user linked to the subscriber, such as a friend of the subscriber, a call session 224 can be established with the mobile device 310 and mobile stations 316 and 318 based on at least one of one or more customized routing preferences linked to the subscriber and presence record that reveals mobile device is within confined area 302. Bearers of mobile stations 316 and 318 can identify the end user and provide the subscriber with one of the mobile stations 316 or 318 so the subscriber can respond to the call session 224 and thus not miss the incoming call.

In yet another aspect of the subject first scenario, incoming call 204 (e.g., voice call) can be a wireline call intended for a wireline device (e.g., telephone 312) within residential dwelling 302. Conventionally, in communication scenarios that do not exploit customized call processing logic 220, a subscriber misses the incoming call 204 when the subscriber is outside residential dwelling 302 and related femtocell service coverage area. In contrast, in accordance with aspects of the subject innovation, at a time customized call processing logic 220 is configured, such deficiency is mitigated or avoided if the subscriber is linked or associated to a mobile device (e.g., 310) or other one or more devices (not shown) with wireless capability that operate in close proximity of the subscriber. In particular, in an instance the subscriber is outside residential dwelling 302 and based on at least one routing preference, the incoming call 204 (e.g., voice call) intended for the wireline device (e.g., telephone 312) can be routed automatically, e.g., without human intervention, as a call session 224 to the mobile device (e.g., 310) or the other one or more devices with wireless capability that operate in close proximity of the subscriber. In an aspect, the at least one routing preference is associated with the subscriber; the association can be a one-to-one relationship or a one-to-many relationship. In another aspect, the one or more devices operating in proximity to the subscriber can include a wearable device with enabled wireless capability that is attached to the subscriber's garment or gear (goggles, helmet, etc.). In diagram 300, a dashed star within a coverage cell 105 represents the subscriber being outside area of femtocell coverage provide by femtocell AP 320 and associated with dwelling 302. As an illustration, such customized routing functionality can allow an end-user to communicate with the subscriber while unbeknownst to the end-user the subscriber is outside the residential dwelling 302 (e.g., shopping in grocery store) and despite the end user being memory challenged and attempting to communicate through the subscriber's home phone number, which the end user has used for the past several (e.g., 30) years, because the end user's fails to remember subscriber's mobile device number. It should be appreciated that for the end user, e.g., the subscriber's aging mother, with a perceived imperative need to contact the subscriber, as it may be the case when the end user is worried about results of her most recent doctor visit, enhanced connectivity can provide an increased perceived quality of service related to the telecommunication service provider.

The functionality afforded by implementation of customized call processing logic in the foregoing scenario results in at least the following advantages with respect to conventional communication scenarios: (i) Improved service experience for the subscriber and related customer satisfaction with the ensuing enhanced service provider commercial stickiness (e.g., lessened churn reduction), and (ii) increased connectivity and related service delivery.

The communication scenarios described supra are characterized herein as "intrinsic" forwarding service scenarios in that the presence intelligence that dictates, in part, the customized routing, is associated with a femtocell AP (e.g., femto AP 320) that is owned or leased by the subscriber that consumes the customized communication routing. However, at least one additional or alternative communication scenario can be realized: "Extrinsic" forwarding service, as described in connection with FIG. 4.

In diagram 400, customized call processing enables an incoming call 204 directed to a first device of a subscriber to be routed to a second device that operates in a "Visited" area 425 served by femtocell AP 430, which can be leased or owned by a third party, e.g., a relative, friend, colleague, a vendor (e.g., a dentist, a childcare provider), or employer of the subscriber. "Home" area 405 and "Visited" area 425 can overlap at least in part. The first device of the subscriber can be a mobile device or a wireline device (e.g., 412, 414, or 416), which operates within a confined "Home" area 405 associated with the subscriber. The second device can be a mobile device of the subscriber (e.g., 432) or wireless or wireline device deployed within area 425. Even though a femtocell AP 410 owned or leased by the subscriber is shown within "Home" area 405, it is noted that extrinsic forwarding service, or extrinsic forwarding, can be effected in scenarios in which wireless service within "Home" area is not provided by a femtocell AP. Stated in alternative terms, extrinsic forwarding service can be provided to the subscriber even though the subscriber does not own or leases a femtocell AP because extrinsic routing of an incoming call 204 is based on at least femtocell presence intelligence and at least one routing preference rather than the subscriber having femtocell service. At least an advantage of the latter is that an enterprise subscriber (e.g., a car dealer, a department store, a restaurant chain, a coffee shop chain) that owns or leases a set of femtocell APs (or other types of confined-coverage APs) can offer extrinsic forwarding service to customers of the enterprise subscriber. It should be appreciated that in an embodiment in which femto AP 410 is absent, or non-operational, for at least partially overlapping areas 405 and 425, the presence condition can be dictated by attachment to femto AP 430, while the routing preference can direct calls to wireline devices that operate within area 405.

Moreover, in one or more embodiments, a plurality of M "Visited" areas can allow extrinsic forwarding of an incoming call 204; wherein M is a natural number greater than unity and its magnitude is determined by characteristics of the visited areas. As an example, in an enterprise scenario, the subscriber can be provided with extrinsic forwarding service in each, or at least one, facility of an employer (e.g., a car dealer) or a vendor (e.g., the car dealer, a restaurant chain, a coffee shop chain); accordingly, M can be large, e.g., 50-500. As another example, in a residential scenario, the subscriber can be allowed extrinsic forwarding service in a group of family members and friends who have access to femtocell service; accordingly, M can be small, e.g., 1-5. In a particular scenario, if the frequently visits a relative (for example, while caring for an aging parent, or providing child care service, etc.), and the relative has an active femtocell AP, then the subscriber can be provisioned extrinsic forwarding service.

Similarly to intrinsic routing, extrinsic routing can be effected based in part on at least one routing preference and femtocell presence information, such as a presence condition record. In comparison to intrinsic routing, extrinsic routing further improves (i) service experience for the subscriber and related customer satisfaction, and (ii) connectivity and related service delivery. The following operational scenario is provided as an illustration of extrinsic forwarding advantages and utility. For a "Visited" area 425 for which extrinsic forwarding service is active (e.g., provisioned and configured) for a subscriber that utilizes mobile device 432, the subscriber can receive an incoming communication 204 extrinsically forwarded as a call session 402 to the mobile device 432 and to wireline device 434, which is deployed within the "Visited" area 425, when the subscriber is within area 425. The subscriber (illustrated with a solid star) can thus engage the communication through wireline device 434, which is in proximity of the subscriber, even if the mobile device 432 is distanced from the subscriber. For example, the subscriber is enjoying a preferred activity, such as watching a television movie in a media room, with an owner or lessee of "Visited" area 425, and the mobile device 432 is within the subscriber's purse or coat in a living room that is part of "Visited" area 425. It should be appreciated that an incoming call 204 intended for a wireline device that operates within the subscriber's "Home" area 405 also can be similarly extrinsically routed to mobile device 432 or wireline device 434, or both. In a conventional communication system, however, the subscriber typically misses the incoming communication in such a situation; not a desirable operational aspect since the incoming communication 204 can be a critical communication from the party associated with the subscriber.

The incoming communication 204 that is extrinsically forwarded is intended to the subscriber and effected by a party associated with the subscriber (e.g., the subscriber's spouse). Accordingly, in an aspect, the wireline device 434 can effect a predetermined, specific ringtone or alerting pattern to identify the call session as an incoming call that has been extrinsically forwarded and is intended for the subscriber that utilizes mobile device 432. In another aspect, wireline device 434, or another wireline device (e.g., a television set; not shown), can render and identifier code or token to disclose the originator of the incoming call that has been extrinsically forwarded. The foregoing distinctive indicia and identifying information enable the subscriber to engage in the call session rather than the owner or lessee of "Visited" area 425.

It should be appreciated that extrinsic forwarding service increases the connectivity of a mobile device of a subscriber during a period the mobile device operates within a visited confined area where femtocell wireless service is available; the visited confined area associated with a first geographic location different from a second geographic location linked to the mobile device. Thus, the primary beneficiary of the extrinsic forwarding service beneficiary is the subscriber of the mobile device and not the party that owns or leases the femtocell AP that provides wireless coverage to the visited confined area. Accordingly, it is desirable and intended for the extrinsic forwarding service to have minimal or no impact to operation of the femtocell communication infrastructure (e.g. software or hardware, devices, access network, or core network components) of the party that owns or leases the femtocell AP.

It should further be appreciated that, in one or more scenarios, the owner or lessee of the femtocell AP 430 that provides service to the visited area 425 can be the subscriber that utilizes the mobile device 432. As an example, a business owner with a femtocell AP at his business location can activate extrinsic forwarding service in order to route his "home" calls automatically to his business location, e.g., to a wireline telephone in the business owner's desk.

Figure 5:
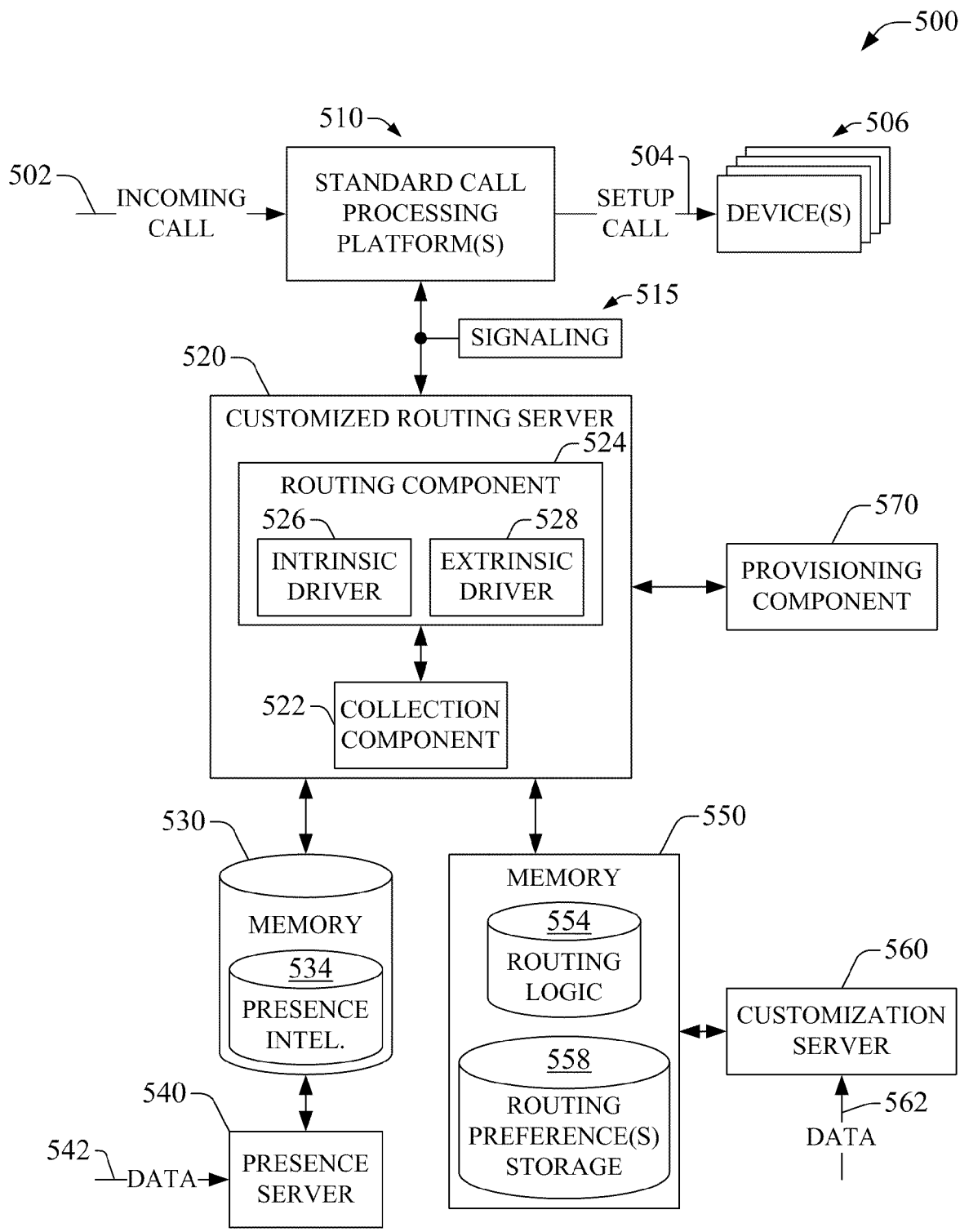
FIG. 5 is a block diagram of an example system that enables a customized routing service of communications, or calls, based in part on at least one of a femtocell presence condition and one or more routing preferences in accordance with aspects described herein.

FIG. 5 is a block diagram of an example system 500 that enables communication routing service of communications, or calls, based in part on at least one of a femtocell presence condition and one or more routing preferences in accordance with aspects described herein. Standard call processing platform(s) 510 includes a set of components that enable, in part, establishment of a call session 504 in response to an incoming call 502 (e.g., a telephone call) and in accordance with customized call routing processing; the call session 504 can be to one or more devices in a set of one or more devices 506. Standard call processing platform(s) 510, through at least one component in the set of components, can invoke, or initiate, customized call processing routing. To invoke customized call processing routing, the at least one component can apply a group of filter criteria or assess a set of trigger rules at one or more trigger points to convey an indication to effect customized communication routing; the indication can be delivered to customized routing server 520 as part of signaling 515 and related payload data. In an aspect, a filter criterion can be an IMS filter rule and a trigger point can be a Customized Applications for Mobile Enhanced Logic (CAMEL) trigger point or an Advanced Intelligent Network (AIN) trigger point. A CAMEL trigger point can be employed if incoming call 502 is received in the circuit-switched (CS) domain, whereas in case the incoming call 502 is placed in the packet-switched (PS) domain the IMS filter rule can be applied. The at least one component can be embodied in a CAMEL server in the CS domain and in an Application Server (e.g., a Telephony Application Server) within an IMS in the PS domain.

To provide customized communication routing invocation, the at least one component can execute one or more methods for implementing personalized handling of an incoming call, wherein the one or more methods can be embodied in at least one set of code instructions retained in a memory in the standard call processing platform(s) 510. In an embodiment, the one or more methods can be integrated in mechanisms conventionally employed to effect add-on communication services in order to modify such mechanisms and afford the one or more features and advantages of the subject disclosure. For example, the one or more methods, when implemented (e.g., executed by at least a processor), can exploit Serving Call Session Control Function (S-CSCF) to apply the IMS filter rule that can initiate customized communication routing.

Customized routing server 520 receives the indication to effect customized communication routing. In response, the customized routing server 520 retrieves, or otherwise accesses, (a) femtocell presence information, e.g., a presence condition record, of a mobile device associated with the incoming call 502, and (b) at least one routing preference for customized communication routing. The femtocell presence information establishes if a mobile device of a subscriber that consumes the customized communication routing service is inside a confined area of femtocell coverage service or outside the confined area. In an aspect, in an instance the mobile device is inside the confined area, the presence condition record can adopt an "In Premises" value, whereas in other instances in which the mobile device is outside the confined area, the presence condition record can adopt a "Not In Premises" value. The "In Premises" value can be a composite value, e.g., a 2-tuple that includes an indicator (an alphanumeric flag, a set of bits, etc.) that characterized the femtocell AP that serves the confined area; for instance, "In Premises" can equal "(In;3P)", "(In;own)" or "(In:At Home)", which indicate, respectively, that the confined area is served by a third party femto AP or by femto AP owned or leased by the subscriber associated with the mobile device for which the presence condition record is established. Other format(s) for "In Premises" value that can characterize ownership of the femtocell AP that serves the confined area are also possible. The at least one routing preference can be gathered based in part on the collected presence information; in an aspect, intrinsic driver 526 can collect the at least one preference in case a presence condition record that embodies the presence information adopts one of "In Premises:At Home" or "Not In Premises" values, whereas extrinsic driver 528 can collect the at least one routing preference if the presence condition record is "In Premises:At Party_Name".

Based on the at least one routing preference for customized communication routing and the femtocell presence information, the customized routing server 520 effects personalized communication routing, and establishes, in part, call session 504. In the illustrated embodiment of customized routing server 520 in example system 500, collection component 522 can retrieve, or otherwise access, the at least one routing preference from routing preference(s) storage 558. Collection component 522 also can extract, or otherwise access, the presence condition record from presence intelligence storage 534, also referred to as presence intelligence 534 in the subject disclosure. In addition, in the illustrated embodiment, customized server 520 includes a routing component 524 that directs the incoming communication 502 to one or more devices, e.g., device(s) 506, to establish, in part, setup call session 504 based in part on the at least one routing preference and the presence condition record. Device(s) 506 can include mobile devices (e.g., cellular telephone (cellphone), laptop computer with wireless connectivity card, netbook, DVR . . . ) and wireline devices (e.g., POTS telephone, home manager IP-based telephone . . . ) that utilize wireless network resources to telecommunicate voice or data.

Depending in part on the at least one routing preference, incoming communication 502 (e.g., a wireless call or a wireline call) can be routed to a wireless device, a wireline device, or any combination thereof, represented in example system 500 by device(s) 506. In an example, in a scenario in which the incoming communication 502 is intended to a mobile device, e.g., a wireless call, if the presence condition record has a value of "In Premises", and if the at least one routing preference conveys a subscriber associated with the mobile device desires to receive the wireless call on both the mobile device and one or more wireless home devices and one or more wireline home devices; then, the incoming call 502 (e.g., the wireless call) is routed to at least one of a wireline number and a wireless number (e.g., a cellphone number). The one or more wireless home devices and the one or more wireline home devices are determined, in part, by the discriminator in "In Premises" that conveys whether the mobile device is registered on a femto AP owned or leased by the subscriber that owns or leases, or is otherwise responsible, for the mobile device, or a disparate femto AP owned or leased by a third party. In another example, in a scenario in which the incoming communication 502 is intended to a wireline home telephone, e.g., a wireline call, if the presence condition record has a value of "Not In Premises", and if the at least one routing preference conveys a subscriber associated with the wireline home telephone desires to receive the wireline call on a subscriber mobile device when the subscriber is not at home, and the subscriber does not desire their wireline calls to provide alerting when they are not at home; then, the wireline call is routed to the subscriber mobile device number and not the subscriber's wireline home telephone number.

Routing component 524 can operate in at least one of two routing modes: intrinsic forwarding and extrinsic forwarding. In intrinsic forwarding mode, routing component implements its functionality, as described herein, via intrinsic driver component 526, also referred to as intrinsic driver 526. In extrinsic forwarding mode, routing component 524 implements at least part of its functionality through extrinsic driver component 528, also referred to as extrinsic driver 528. Operation in extrinsic forwarding mode can be provisioned based at least on one or more events that can initialize extrinsic forwarding service; extrinsic driver 528 can provision and activate extrinsic forwarding service for a mobile device. The one or more events can include, for example, update of an access control list that regulates access to femtocell wireless service; registration of a mobile device on a femtocell AP, which can host extrinsic forwarding service; or the like. It should be appreciated that a subscriber that owns or leases the mobile device, or operates on the mobile device on behalf of the owner or lessee—as it can be the case when the mobile device is a business mobile device owned by the subscriber's employer—need not own or lease a femtocell AP in order to be exploit extrinsic forwarding service as described herein.

In an aspect, extrinsic driver 528 prioritizes customized communication routing for a mobile device for which intrinsic forwarding service and extrinsic forwarding service are provisioned. In such scenario, a first set of routing preferences associated with a presence condition record with "In Premises:3P" or "In_Premises:Party_Name" value is assigned precedence over a second set of routing preferences associated with "Not In Premises" presence condition record. In another aspect, extrinsic driver 528 can manage service interaction. To at least that end, extrinsic driver 528 can implement (e.g., execute) at least one protocol or procedure to ensure integrity of communication routing in a scenario in which an owner or lessee of a 3P femtocell AP that enables, at least in part, extrinsic forwarding service has a disparate call forwarding service provisioned. In such scenario, extrinsic driver 528 can deliver a directive to render a service management environment (e.g., one or more user interfaces and related navigational indicia) in a device, wireless or otherwise, of the owner or lessee and a subscriber that benefits from extrinsic forwarding service. Extrinsic driver 528 can collect and analyze configuration data for a plurality of call forwarding services, and identify integrity issues or potential integrity conflicts amongst extrinsic forwarding service and other call forwarding service(s). In yet another aspect, extrinsic forwarding driver 528 can administer implementation of specific ringing features based on presence condition record and a routing preference. In a scenario, extrinsic forwarding driver 528 can identify a ringtone configured for a device, wireless or wireline, and deliver a directive to a network node (e.g., an AS within IMS core network) to set up a session call, e.g., setup call 224, employing in part the ringtone.

Presence server 540 determines and maintains (generates, modifies, stores, etc.) dynamic femtocell presence information, which presence server 540 can store in presence intelligence storage 534 within memory 530. In an aspect, based on data 542, the presence server 540 automatically determines the femtocell presence information based in part on whether or not the mobile device is registered on, or attached to, a femtocell AP that supplies wireless service to the confined area. To provide such functionality, the presence server 540 can execute a first set of procedures, which can be embodied in one or more sets of code instructions retained in a machine-readable or computer-readable storage medium. Presence server 540 can be part of a telecommunication network platform (e.g., macro network platform 108 or femto network platform 109) or a backend service platform thereof. In an embodiment, the presence server 540 can be an application server deployed external to other components of the telecommunication network platform or the backend service platform; conventional standardized or proprietary interfaces can be utilized to functionally connect (e.g., communicatively couple) presence server 540 to the other components. In another embodiment, the presence server 540 can be integrated within an existing node in the telecommunication network platform or the backend service platform. For example, the existing network node can be a CAMEL serving node in the circuit switched (CS) domain of the telecommunication network platform; a femtocell gateway node; or an internet protocol (IP) Multimedia Subsystem (IMS) Telephony Application Server (TAS).

Data 542 can be generated through execution of a second set of procedures, which determine the scope (e.g., data domain or data structure) of the data 542; various components within at least one of a telecommunication network platform (e.g., CN in UMTS-based technologies), an access network (AN), or a group of end-user devices can execute the second set of procedures. The second set of procedures also can be embodied in one or more sets of code instructions retained in a machine-readable or computer-readable storage medium. The first set of procedures and the second set of procedures form a group of presence procedures.

The second set of procedures can be categorized based on the component(s) that can execute such procedures: Network-based procedure(s), access-network-based procedure(s), and subscriber-device-based procedure(s). Network-based procedure(s) affects primarily one or more components in a telecommunication network platform, AN-based procedure(s) affects mainly a femtocell AP, while subscriber-device-based procedure(s) particularly impacts at least one user device (e.g., a mobile device linked to a subscriber that has customized routing service as described herein).

Network-Based Procedure(s).—

The second set of procedures can be retained in a memory within the telecommunication network platform administered by a telecommunication carrier, or external network(s) functionally coupled thereto. A procedure in this category is determined in part by the underlying operational features of the telecommunication network platform or the external network(s); e.g., CS network platform (e.g., 2G, 2.5G networks) or PS network platform (e.g., 3G, 3.5G, or 4G networks). (1) A CS-based procedure can exploit Signaling System #7 (SS7) signaling, and related payload data. In an aspect, the CS-based procedure can include a group of code instructions, retained in memory (e.g., memory 530), that can be part of Customized Applications for Mobile Enhanced Logic (CAMEL). Presence server 540 can execute the group of code instructions in order to exploit the CAMEL functionality that discloses mobility management events, and related data, to a Service Control Function (SCF) component, and generate (e.g., determine and maintain) femtocell presence information. In an aspect, a wireless subscriber can be provisioned with CAMEL service(s), particularly with relevant CAMEL subscription information to support mobility management events. Example mobility management events that presence server 540 can consume to generate a presence condition record associated with femtocell presence information include the following. Location update within a Visited Location Register (VLR) service area; location update to a disparate VLR service area; IMSI attach; mobile device initiated IMSI detach, or explicit detach, e.g., the mobile device is powered off; or network initiated IMSI detach, or implicit detach. The foregoing location update events occur in response to movement of a mobile device between macrocell coverage area (e.g., 105) and femtocell coverage area (e.g., 125, 302), whereas IMSI attach occurs if a mobile device is powered on and explicit detach occurs if the mobile device is turned off. At least one of the example mobility events can trigger the CAMEL functionality that conveys data on the at least one of the example mobility events to the SCF component; based on this conveyance of data, the SCF component accesses femtocell presence information, which can be delivered to the presence server 540. Further to femtocell presence information, the SCF component can access, or otherwise acquire, information related to routing incoming calls (e.g., 402). An incoming call destined to a mobile telephone number (TN) provisioned with customized communication routing can invoke the CAMEL service(s). Service logic, which can be part of routing logic 454, can be exploited by the SCF component to determine how to route a call based at least on presence condition record(s). It should be noted that in certain embodiments, when SCF component is invoked and routing information is to be returned or exchanged, the SCF component returns a single destination address, or number, in response to the invocation; however, in such embodiments, various destination addresses can be supplied sequentially. In addition or in the alternative, the group of code instructions that are part of the CS-procedure can be retained in VLR. As part of the CS-procedure, the VLR can receive a Location Update message when (e.g., at a time, or after a time) a mobile device of a subscriber that is provisioned customized routing service moves from macrocell coverage to femtocell coverage, or from femtocell coverage to macrocell coverage. The VLR can analyze Serving Area Information (SAI) and determined of the mobile device is attached to a femtocell AP owned or leased by the subscriber or a third party, and based on the analysis notify the presence server 540 that the mobile device is in "In Premises" presence condition or "Not In Premises" presence condition. For "In Premises" value, a discriminator that characterized the femtocell AP that established femtocell presence intelligence is included. In the alternative or in addition, the VLR can send the SAI to presence server 540, which can analyze the information to determine if the presence condition of the mobile device; either "In Premises" or "Not In Premises".

(2) A PS-based procedure, when executed by a functional element, can exploit at least one or more components of a PS domain in the telecommunication network; for example, the one or more components can be part of an IMS core network. As part of the PS-based procedure, presence server 540 can receive an indication to supply femtocell presence information in response to an incoming call attempt to a mobile device. The incoming call attempt is received by the one or more components, which, in response, apply a filter criterion or filter rule to convey the indication; in an aspect, the filter criterion can be provisioned in a Home Subscriber Server within the PS domain. The indication can be delivered as part of data 542. As discussed supra, to supply femtocell presence information, the presence server 540 can generate or update a presence condition record and deliver it.

An advantage of PS-based procedure(s) is that access to femtocell presence information can be integrated with various PS-based (e.g., IP-based) applications that support a myriad of interfaces such as APIs, and services, including web based services. Another advantage of PS-based procedure(s) is integration of one or more aspects of SS7 interfaces and related functionality; for example, presence server 540 can exploit SS7 signaling, are related payload data, to produce femtocell presence information and supply such information as part of the PS-based procedure(s).

AN-Based Procedure(s).—

The second set of procedures can be retained within a femtocell AP, which can be owned or leased by the subscriber or a third party (3P), such as a relative, friend, colleague, vendor (e.g., a dentist), or employer of the subscriber. Data 542 includes femtocell presence information of the mobile device associated with a subscriber that consumes customized routing service. A femtocell AP conveys the femtocell presence information to presence server 540 through signaling delivered, in part, over a backhaul network (e.g., an IP broadband backhaul network, such as backhaul link(s) 153 and at least one component of access network(s) 152). In an aspect, a client component in the femtocell AP generates a presence information record at a time, or a predetermined period after the time, a mobile device registers on the femtocell AP or deregisters from the femtocell AP. For instance, when (e.g., at an instant, or after the instant) the mobile device registers on the femtocell AP, as part of the registration procedure and in response to registration, the client component generates a presence condition record with a value of "In Premises" for the mobile device and delivers a notification message within data 542 to the presence server 540 to convey the presence condition record. When the mobile device deregisters from the femtocell AP, in response to de-registration, the client component updates the presence condition record for the mobile device, or generates a new presence condition record for the mobile device, to reflect a condition value of "Not In Premises", and delivers a notification message to the presence server 540 to disclose the updated presence condition record or the new presence condition record. It should be appreciated that the response(s) of the client component to registration/de-registration of the mobile device with the femtocell AP can be enabled by execution of the second set of procedures. At least a portion of the second set of procedures can modify conventional registration procedures to accomplish the described aspects of the subject disclosure.

In one or more embodiments, the client component can be a Session Initiation Protocol (SIP) based client running on the femtocell AP and can alert (e.g., deliver signaling to) a SIP based AS in an IMS core network. The client component in the femtocell AP can execute the second set of procedures. In the alternative, at least one processor in the femtocell AP can execute the second set of procedures by executing the client component.

The subject AN-based procedure(s) can be advantageous in communication scenarios in which wireless devices that are not dual transfer mode (DTM) capable are expected to operate in the confined area(s) covered by femtocell wireless service. In such scenarios, femtocell presence information, and associated signaling to a presence server (e.g., 540) is not affected by the precedence of voice calls over data sessions in wireless devices that are not DTM capable.

Subscriber-device-based procedure(s).—

The second set of procedures can be retained within a mobile device of a subscriber that consumes the customized communication routing service described herein. The subject procedure(s) are a client based approach. A client component that resides in the mobile device can execute at least a portion of the second set of procedures in response to detection of attachment to a femtocell AP, owned or leased by the subscriber or a third party, or detection of attachment to a macrocell base station. As a result, the client component can produce (e.g., generate or update) a presence condition record and deliver a notification message to the presence server 540 to supply the presence condition record. The presence condition record can adopt a value of "At Home" (or an "In Premises" value) if attachment to the femtocell AP is detected, whereas detection of attachment to the macrocell base station leads to a "Not At Home" (or a "Not In Premises" value) value for the presence condition record. The client component can deliver the notification message, as part of data 542, through various protocols or mechanisms; e.g., SIP signaling or H.323 signaling in PS domain, short message service (SMS) or conventional SS7 signaling in GSM-based or UMTS-based radio technology, peer-to-peer protocol such as Extensible Markup Language (XML) Document Management Server (XDMS) protocol.

In one or more embodiments, the client component can be SIP client executing on the mobile device, via at least one processor, to enable interaction of the mobile device with IMS operational environment, or platform, over an IP access network (e.g., AN(s) 152). In an aspect, the client component can perform a SIP registration over a femtocell AP data channel when (e.g., at a time) it detects that the mobile device is registered with the femtocell AP. Such registration attempt, and related attachment signaling, is relayed to presence server 540, which can be embodied in an IMS AS. In an additional or alternative embodiment, the client component can communicate with the presence server 540 in accordance with other packet-based (e.g., IP) protocol, or signaling mechanism, to convey femtocell presence information.

Memory 530 can be embodied in at least one of a Home Location Register (HLR) or a Home Subscriber Server (HSS), or a data repository functionally coupled to a femtocell gateway node in a femtocell network platform (e.g., 109). Memory 530 also can be embodied in a memory integrated or operationally coupled to a server in an external network functionally connected to a macro network platform 108 (a Core Network, in UMTS based radio technology). In an example, memory 530 can be functionally connected to an AS (the server) in an IMS (the external network). In another example, memory 530 can be functionally connected to a broadband remote access server (B-RAS; the server) and the internet (the external network); in this example, memory can be either a conventional data repository or a cloud web-based file server. In addition, in an embodiment, memory 530 can be part of a memory platform in a backend service infrastructure, such as a consolidated data repository that centralizes data of one or more network platforms that provide wireline or wireless service(s). The data can be operational data and administrative data.

In one or more additional or alternative embodiments, presence intelligence storage 534 can be part of (a) customer premises equipment (CPE), e.g., a femtocell AP, a component that aggregates one or more femtocell APs, a switch or router, or a private branch exchange (PBX) apparatus; or (b) a user device, e.g., a mobile device, a personal computer or other home networking component. Compared to storage in a memory deployed within a telecommunication network platform (e.g., 108, 109), storage of a presence condition record in a memory 530 in accordance with aspects (a) and (b) results in increased flexibility and accessibility to the presence condition record by an end-user or user device. The increased flexibility and accessibility is provided at the expense of call session processing efficiency in view of increased signaling that might be incurred in order to access data (e.g., the routing preference) remote to the telecommunication network platform. Specific operational scenarios can afford such tradeoff.

Routing logic storage 554, also referred to as routing logic 554 in the subject disclosure, can include default logic and exception handling logic; wherein logic is a set of one or more rules. For a subscriber that consumes customized communication routing service, example default logic can comprise the following rules. (1) Route all incoming calls to a mobile device of the subscriber and a set of wireline devices linked to a physical address of the subscriber if the presence condition for the mobile device is "In Premises" or "In Premises:At Home". (2) Route an incoming call intended for a mobile device of the subscriber and an incoming call intended for a wireline device linked to the physical address of the subscriber to the mobile device and not the wireline device if presence condition for the mobile device is "Not In Premises". It should be appreciated that the foregoing rules are illustrative and additional or alternative rules can compose the default logic. In particular, default logic can route an incoming call 502 to one or more wireless devices (e.g., 316 and 318) registered on a femto AP (e.g., femto AP 320) utilized as a reference for presence intelligence associated with a mobile device (e.g., 310) of the subscriber. To implement such default logic, routing component 524 can convey a directive to collection component to extract one or more presence condition records for the one or more wireless devices and, based on the one or more presence condition records, direct the incoming call 502 to the one or more wireless devices. Routing component 524 can identify the one or more wireless device via at least one access control list that regulates access to the femto AP (e.g., 320); the ACL can be retained in a network-based memory, such as a subscriber database in HSS. It is noted that in one or more embodiments, routing of an incoming call to a set of mobile devices registered on a femtocell AP that establish presence condition can be effected only if the presence condition of the mobile device is in "In Premises" (or other suitable alphanumeric value). In addition, for the subscriber, exception handling logic can route an incoming call in anomalous scenarios: For example, for the subscriber becomes hotlined for lack of service payment, a customized routing service deactivation notice (e.g., a SMS communication, or an automated voice recording) can be delivered to a mobile device utilized by the subscriber to convey the service anomaly.

In addition, routing logic storage 554 can include schedules or profiles that regulate application of at least one routing preference. For instance, for a specific mobile device, such as a business cellular phone, customized communication routing is inactive during weekends (e.g., from 8:00 p on Friday until 5:00 a on following Monday). Routing logic storage 554 also can include discriminator(s) that establish level of personalization of customized routing, e.g., customization for residential subscribers can be different from that for enterprise or business subscribers. At least one discriminator can be employed for security or safety: As an example, the at least one discriminator can trigger collection of data related to a routed incoming call (traffic, called numbers, calling numbers, etc.) as part of Communications Assistance for Law Enforcement Act (CALEA), employer monitoring, or parental control. As another example, the at least one discriminator can override a routing preference that includes a specific group of one or more devices, wireless or otherwise.

Routing logic storage 554 also can include criteria to manipulate an incoming communication. For example, the criteria can dictate that the incoming communication is to be reformatted prior to delivery, and select a specific device for certain types of communication: A digital picture frame can be selected for MMS communication; selection can be automatic or based on a ranking, which can be configured by a subscriber that exploits the customized routing service.

Customization server 560 manages, e.g., creates, modifies, receives, or delivers routing preferences of a subscriber that consumes customized communication routing service as described herein. The routing preferences enable, in part, the femtocell presence based routing or customized call processing, and can be retained in memory 550. While illustrated as a separate functional element, in one or more embodiments, memory 550 can be integrated in customization server 560. In an aspect, customization server 560 can be a dedicated server or it can be integrated in one or more servers that provide other functionality. In an aspect, the customization server 560 can be integrated in a server that is part of a macrocell network platform 108 or a femtocell network platform 109. In another aspect, the customization server 560 can be integrated in a server that is part of an external network functionally coupled to at least one of such network platforms; for instance, the external network can be an IP Multimedia Subsystem (IMS) and the server can be embodied in an Application Server (AS). In addition, customization server 560 can include a database management component (not shown) that administers, at least in part, data retained in memory 550.

Memory 550 and memory 530 have similar aspects and, in one or more embodiments, such memories can be integrated. Memory 550 can be embodied in at least one of a Home Location Register (HLR) or a Home Subscriber Server (HSS). In addition, memory 550 can be embodied in a data repository functionally coupled to a femtocell gateway node in a femtocell network platform (e.g., 109). Memory 550 also can be embodied in a memory integrated or operationally coupled to a server in an external network functionally connected to a macro network platform 108 (a Core Network, in UMTS based radio technology). As an example, memory 550 can be functionally connected to an AS (the server) in an IMS (the external network). As another example, memory 550 can be functionally connected to a broadband remote access server (B-RAS; the server) and the internet (the external network); in this example, memory can be a conventional data repository or a cloud, web-based file server. In addition, in an embodiment, memory 550 can be part of a memory platform in a backend service infrastructure, such as a consolidated data repository that centralizes data of one or more network platforms that provide wireline or wireless service(s). The data can be operational data and administrative data, and can be retained as part of one or more customer profiles (e.g., a Common Customer Profile (CPP)) for access to at least one service.

In one or more additional alternative embodiments, routing preference(s) storage 558 within memory 550 can be part of (i) customer premises equipment, e.g., a femtocell AP, a component that aggregates one or more femtocell APs, a switch or router, or a private branch exchange (PBX); or (ii) a user device, e.g., a mobile device, a personal computer or other home networking component. Compared to storage of a set of routing preferences in a memory deployed within a telecommunication network platform (e.g., 108, 109), it should be appreciated that storage of a routing preference in a memory 550 in accordance with aspects (i) and (ii) results in increased flexibility and accessibility to the routing preference by an end-user or user device. The increased flexibility and accessibility is provided at the expense of call session processing efficiency in view of increased signaling that might be incurred in order to access data (e.g., the routing preference) remote to the telecommunication network platform. Such tradeoff can be afforded in specific operational scenarios.

In scenarios in which routing preference(s) storage 558 is distributed across multiple platforms or devices, or a combination thereof, one or more functional elements can be deployed (e.g., configured, installed, tested, and accepted) to ensure service integration integrity. In one or more embodiments, an integrity component (not shown) can be included in example system 500 to resolve such conflicts; conflict resolution and improved telecommunication performance can offset additional complexity associated with deployment of the integrity component. Deployment of such functional elements (e.g., components, servers) can increase operational complexity of example system 500, or any other system described herein for customized communication routing, but advantages associated with mitigation or eradication of service integration concerns, such as problems possibly conflicting call forwarding unconditional settings, can realize one or more operational efficiencies for a service provider or a subscriber.

Customization server 560 can receive or retrieve, or otherwise acquire, data 562 to commit at least one routing preference in routing preference(s) storage 558. Data 562 can include a set of preference parameters that define the at least one routing preference; the set of preference parameters can be generated by at least one system (not shown) that collects input data from a subscriber via a subscriber device. In an embodiment, the at least one system can be a user device (mobile station, PC, etc.) that executes an application (software or firmware) to configure the at least one routing preference. In another embodiment, the at least one system can be a functional element, such as a component or server, deployed (e.g., installed, configured, tested, and accepted) in a telecommunication network platform and that is communicatively coupled to a user device (mobile station, PC, etc.); the functional element executes an application (software or firmware) to configure the at least one routing preference. Data 562 also can be supplied by a customer support network component, as conveyed by a subscriber through personal interaction with a service provider representative, e.g. over the phone or at a service center.

In one or more embodiments of example system 500, one or more processors (not shown) configured to enable, or that enable, at least part of the functionality of the group of disclosed servers (e.g., 520, 530, and 550), and associated component(s), can be included in or functionally coupled to each server in the group of servers in the example system 500. To implement or provide at least part of the described functionality of at least a server in the group of servers, the one or more processors can execute one or more sets of code instructions (not shown) stored in one or more of memory 530 or memory 550, or other memory accessible to the one or more processors. The one or more sets of code instructions can include program module(s) or software application(s) or firmware application(s) that, when executed by the one or more processors (not shown), implement specific tasks which can be accomplished through at least one of the example methods described in the subject specification and that are associated, at least in part, with functionality of the at least one server in the group of servers in example system 500. In certain embodiments, a server in the group of servers (e.g., 520, 530, and 550) can be embodied, at least in part, in one or more sets of code instructions stored in a memory (e.g., 530 or 550) accessible to the one or more processors (not shown); when executed by the one or more processors, the one or more sets of code instructions implement the server and its functionality.

In one or more embodiments of example system 500, a server in the group of servers (e.g., 520, 530, and 550) in example system 500 can include input/output (I/O) interface(s) (not shown) that enable, at least in part, networked communication. Additionally, in example system 500, either memory 530 or memory 550, or both of these memories, can be a centralized element or a distributed element, and each can include any memory element described in connection with example system 500. In addition, memory 530 and memory 550 can be integrated, even though in the illustrated embodiment such memories are presented as separate entities.

Figure 6:
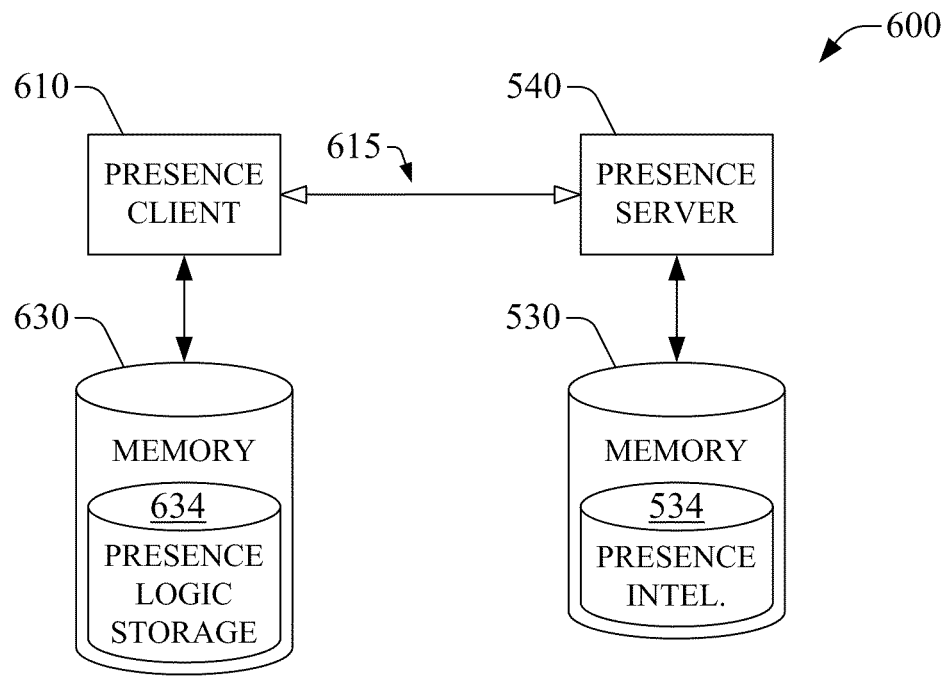
FIG. 6 is a block diagram of an example system to update presence intelligence in accordance with aspects described herein.
Figure 7:
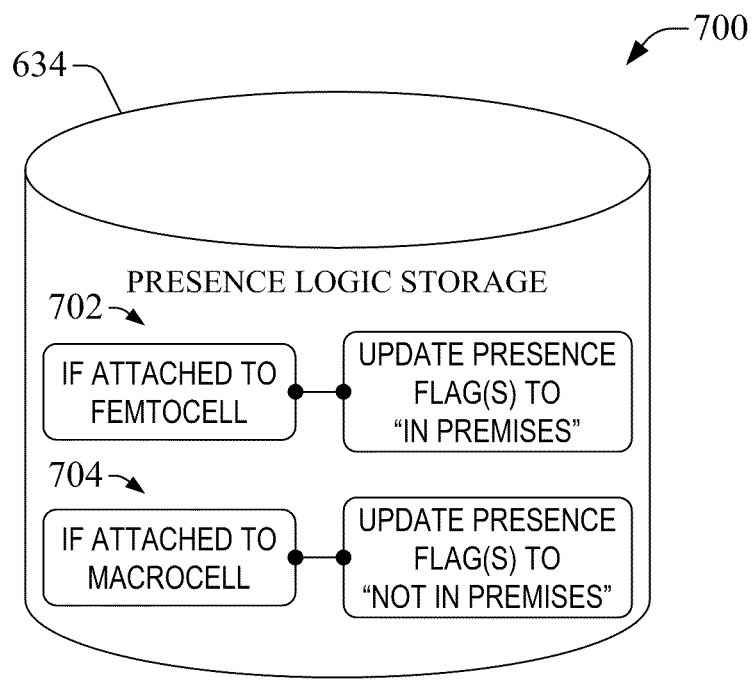
FIG. 7 is a diagram of an example presence logic storage in accordance with aspects of the subject disclosure.

FIG. 6 is a block diagram of an example system 600 to update femtocell presence intelligence in accordance with aspects described herein. An update to the femtocell presence intelligence includes creation or modification of the femtocell presence intelligence. Presence client component 610, also referred to as presence client 610 in the subject disclosure, can detect attachment of a mobile device of a subscriber that has access to a customized routing service to a femtocell access point (e.g., femto AP 320 or femto AP 430), and update a presence condition record within presence logic storage 634 in memory 630. Presence client 610 also can detect detachment of the mobile device from the femtocell AP, or attachment of the mobile device to a macrocell base station. As illustrated in diagram 700 of example presence logic storage 634 in FIG. 7, attachment to femtocell results in update of a presence condition record to "In Premises" value; see blocks 702. Attachment to a macrocell base station, or detachment from the femtocell AP, results in update of the presence condition record to "Not In Premises" value; see blocks 704. A presence condition records can be a logical presence flags, as illustrated in diagram 700. As indicated supra, the femtocell AP to which the mobile device can attach can be owned or leased by the subscriber or it can be a femtocell AP owned or leased by a third party (3P). Accordingly, "In Premises" presence flag can include at least two discriminators: "At Home" or "At Party_Name Premises," wherein the tag Party_Name labels the third party that owns or leases the 3P femtocell AP. In an aspect, Party_Name can be extracted from payload data that is part of signaling attachment exchanged amongst the mobile device and the third-party femtocell AP; Party_Name can be a nickname assigned to the 3P femtocell AP by its owner or lessee. In another aspect, discriminator can be appended to the "In Premises" value to form either of the following values "In Premises:At_Home" or "In Premises:Party_Name". Other constructions or definitions are also possible.

Presence client component 610 also can notify presence server 620, through interface 615, of an updated presence condition record. In an aspect, presence client component 610 can notify of the updated presence condition record through one or more communication protocols, proprietary or otherwise, such as SIP, XDMS, XML Configuration Access Protocol (XCAP), Hypertext Transfer Protocol (HTTP), or the like. As described supra, presence server 540 can retain payload data (e.g., data 542) available in the notification within memory element 534 in memory 530. In another aspect, interface 615 can be embodied in at least one of conventional link(s) (e.g., a fiber optic link, an Ethernet link, a T1/E1 line . . . ), reference link(s) (e.g., Gi, Gn . . . ), or one or more components of an access network or a core network.

In an aspect, presence client 610 can be embodied in a software application or firmware application comprising one or more sets of code instructions retained in a memory, e.g., memory 630, that when executed by at least one processor (not shown in FIG. 6) provide, at least in part, the described functionality of presence client 610. In an aspect, memory 630 can be part of the mobile device that attaches/detaches from the femtocell AP and the at least one processor can be a processor that provides functionality of such mobile device.

Figure 8:
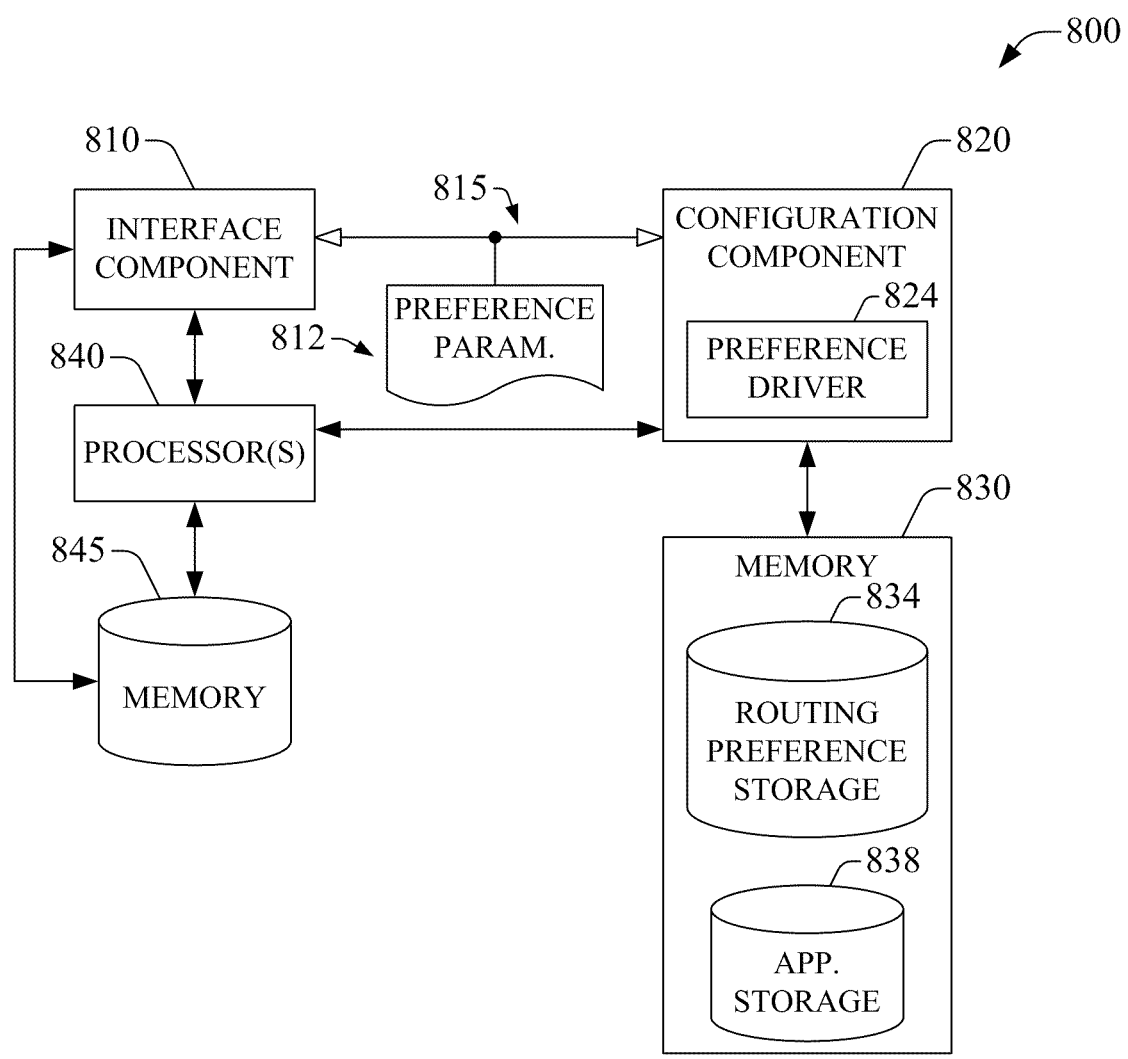
FIG. 8 is a block diagram of an example system that enables configuration of one or more routing preferences for customized call processing in accordance with features disclosed herein.

FIG. 8 is a block diagram of an example system 800 that enables configuration of a routing preferences for customized call processing, or personalized call processing, in accordance with features disclosed herein. Configuration includes at least one of generation, deletion, or modification, and can be effected by a subscriber via, at least in part, user device (e.g., a handset) or apparatus (e.g., a service kiosk computer in a service provider facility). Accordingly, such configuration results in routing preference that is specific to the subscriber or that is personalized to the subscriber, by the subscriber. Interface component 810 can supply at least one preference parameter 812 through interface 815; such preference parameter(s) can define a routing preference to be applied based at least on femtocell presence intelligence. Configuration component 820 receives the at least one preference parameter 812 and commits such parameter(s) to routing preference storage 834 within memory 830; to at least such ends, preference driver 824, or preference driver component 824, can execute a software application or a firmware application retained in application storage 838. The software application of the firmware application is stored as at least a set of one or more code instructions.

In an embodiment of example system 800, interface component 810 can be remote to configuration component 820, which can be part of configuration server 560. In such embodiment, interface component 810 can be part of a user device that (i) supplies and consumes data and signaling, and (ii) renders a configuration environment to define at least one routing preference in response to preference driver 824 executing the software application or firmware application. In an aspect, interface component 810 can be a display interface that is part of the user device. The user device can be a mobile device (e.g. cellphone) associated with a subscriber that configures at least one routing preference for personalized routing as described herein; a personal computer, pseudo-stationary or portable (laptop, notebook, netbook, etc.); a PDA, a television set top box for IP television (IPTV); or the like. In another aspect, configuration component 820 can be a web server that enables a configuration web portal when preference driver 824 executes the software application or the firmware application retained in application storage 838; the configuration environment rendered by the interface component 810 is at least a portion of the web portal. In such an embodiment, memory 830 is the same or substantially the same as memory 550, and memory element 834 is substantially the same or the same as routing preference(s) storage 558. In addition, interface 815 can be embodied in at least one of conventional link(s) (e.g., a fiber optic link, an Ethernet link, a T1/E1 line . . . ), reference link(s) (e.g., Gi, Gn . . . ), or one or more components of an access network or a telecommunication network platform (e.g., core network).

In another embodiment of example system 800, interface component 810, configuration component 820, memory 830 and memory 845 can be integrated in a single apparatus, e.g., a user device. Interface 815 can be at least one of a bus architecture or internal programming interfaces (not shown) retained in memory 830; the bus architecture can include at least one of a system bus, a memory bus, an address bus, or a message bus. In such an embodiment, configuration component 820 can deliver data (e.g., data 562) that includes the at least one preference parameter 812 to customization server 560 (not shown in FIG. 8); delivery can be effected in peer-to-peer modality in accordance with one or more communication protocols (e.g., XDMS, XCAP . . . ). In addition, routing preference storage 834 can operate as a data cache to store the at least one preference parameter 812 in accordance with a retention protocol (not shown) which can be stored in memory 830. The retention protocol can be statically or dynamically configured and includes a set of predetermined parameter (e.g. an inactivity period, priority ranking(s) . . . ) that dictate preservation or removal of data in memory element 834. In the subject embodiment, interface component 810 also can provide the functionality of a presence client component (e.g., 610).

Processor(s) 840 represent a set of one or more processors configured to enable, or that enable, at least part of the functionality of interface component 810 and configuration component 820. To implement or provide at least part of the described functionality of interface component 810 and configuration component 820, processor(s) 840 can execute one or more sets of code instructions (not shown) stored in one or more of memory 845 or memory 830. The one or more sets of code instructions can include program modules or software applications or firmware applications that, when executed by processor(s) 840, implement specific tasks which can be accomplished through at least one of the example methods described in the subject specification and that are associated, at least in part, with functionality of example system 800. While illustrated as stand-alone functional element(s), in certain embodiments of example system 800, processor(s) 840 can be distributed amongst interface component 810 and configuration component 820 to provide at least part of the described functionality thereof. Additionally, in an alternative or additional embodiment, interface component 810 can reside, at least in part, within memory 845 as one or more sets of code instructions that, when executed by processor(s) 840, implement each of such components and the described functionality thereof. Likewise, in such alternative or additional embodiment, configuration component 820, or at least one component thereof, also can reside within memory 830 (e.g., within application storage 838) as one or more sets of code instructions that, when executed by processor(s) 840, carry out the described functionality of configuration component 820, or the at least one component therein. Either memory 845 or memory 830, or both of these memories, can be a centralized element or a distributed element, and each can include any memory element described in connection with example system 800.

FIGS. 9A-9C illustrate a set of three example user interfaces 900-960 that can be rendered as part of configuration of a communication routing service based in part on at least one of a femtocell presence condition and one or more routing preferences in accordance with aspects described herein. Interface component 810, or one or more components therein or functionally coupled thereto, can render (e.g., display) the subject UIs. Example UI 900 illustrates a menu of options to configure a routing service for a specific device based on location, or presence condition. As illustrated, location menu 902 offers two alternatives compatible with available categories of presence condition records: "In Premises" and "Not in Premises." Example UI 930 presents selection 932 of "In Premises" category. Menu 934 renders a list of two mobile devices (Mobile 1 and Mobile 2); however, menu 934 can include additional optional mobile devices. Example UI 960, presents selections 932 and 934, wherein the latter indicates "Mobile 1" has been selected for configuration of a specific service (e.g., "Intrinsic" or "Other"), as rendered in selection 968. "Other" service category can include various wireless services supplied through femtocell wireless communication, e.g., integral control of networked home devices (e.g., on/off, timer, file sharing, etc.)

FIGS. 10-12 illustrates example user interfaces that can be rendered as part of configuration of a communication routing service based in part on at least one of a femtocell presence condition and one or more routing preferences in accordance with aspects described herein. In example UI 1000, Indicia 1004 indicates selection of "Not in Premises" presence condition category, whereas indicia 1008 presents an illustrative set of four devices (Mobile 2 and Auxiliary Device (Aux.) 1-Aux. 3) that can be employed to route an incoming communication in accordance with at least one routing preference and as part of offload service. In an aspect, based on presence intelligence, the offloading service can direct a specific incoming communication and content thereof to an auxiliary device better suited for a subscriber to consume the content. For example, a picture included an incoming communication directed to a mobile device can be offloaded to a digital media frame within the confined area served by a femtocell AP on which the mobile device is registered, and thus has an "In Premises" presence condition. As part of the offloading service, routing component 424 can analyze the content of an incoming call 402 in preparation for offloading the content in accordance with at least one routing preference and a femtocell presence condition record.

Example UI 1100 is directed to configuration of at least one routing preference for "Not in Premises" category of presence condition. Indicia 1104 illustrates a configured routing preference that establishes an incoming communication (e.g., incoming call 204) is routed to Mobile 1 (e.g., a subscriber's cellphone) if intended to Mobile 1. In addition, the configured routing preference establishes that the incoming communication is offloaded to device Aux. 1, which can be an auxiliary wireline device. A soft button 1108 allows to include an additional routing preference associated with a set of mobile devices (e.g., Mobile 1 and Mobile 2). Indicia 1112 conveys additional routing preferences the direct an incoming communication (e.g., incoming call 204) to Mobile 1 if the incoming call is intended to device Wireline 1 or to device Wireline 3. In an aspect, indicia 1116 illustrates rendition of content, or information, as a result of actuating soft button 1120 ("Add" button) to configure an additional routing preference; in an aspect, the actuating can be implemented via various gestures (touch, speech, movement, etc.). Indicia 1116 presents a set of wireline devices that can be selected as prospective destination addresses that result in routing of an incoming communication to wireless device "Mobile 1".

With respect to example UI 1200, various routing preferences are illustrated for wireless device "Mobile 1." Routing preferences 1204 establish that incoming communication(s) intended to Mobile 1 are to be routed to Mobile 1 and to Wireline 1 (e.g., home manager IP-based telephone). Indicia 1212 illustrate a menu of optional devices allowed to be utilized in a routing preference; the menu can be toggled on through actuation of soft button 1220. It should be noted that the menu presents "Mobile 2" as an optional device, such device can be a wireless device authorized to receive femtocell service through the femtocell AP that determines presence condition of the wireless device (e.g., "Mobile 1") for which the example UI 1100 is employed to configure a routing preference. Identity of the wireless device "Mobile 2" can be extracted from an access control list associated with the femtocell AP that determines presence condition; the identity can convey a number, code, or token for the wireless device and a tag the characterizes ownership (e.g., owned by friend, owned by employee, owned by relative) thereof. Characterization of ownership can guide, at least in part, configuration of a routing preference.

Example UI 1200 also enables generation of one or more routing preferences that direct an incoming communication (e.g., a SMS message) to all available wireline devices (e.g., POTS home telephone, home manager telephone, . . . ) in case "All Wireline" option is selected; in FIG. 12 such option is unchecked. Routing preferences 1208 disclose that an incoming communication intended to Mobile 1, Wireline 1, or Wireline 3 are routed to Mobile 1; for instance, a VoIP call session intended for PC 308 can be directed to mobile device 316. Soft button 1224 can be render support information for at least one of configuration of a routing preference, registration of a mobile device or wireline device to be included in menus of available devices, or the like. In an aspect, identity of a wireline device can be extracted through various mechanisms, which can be implemented by a configuration component, or a processor that enables, at least in part, the functionality of the configuration component: (1) Device handshake. The configuration component that transmits a directive to render a configuration environment can deliver a request for identification data to one or more devices provisioned in a wireline network (e.g., broadband network for packet-base services) with an associated physical address (e.g., billing address) that matches the physical address of a femto AP employed as reference for presence intelligence. In response, an active wireline device can acknowledge the request and deliver the identification data, which can be employed to populate a menu of available devices. (2) Identification data mining. The configuration component extract identification data for a wireline device provisioned in the wireline network and that has a physical address that matches the physical address of the femto AP. It should be appreciated that in one or more embodiments, actuation of soft-button 1420 does not provide a set of pre-populated fields but rather an empty form field into which data can be entered to identify a device, wireless or otherwise, to which a communication is intended to or to which the communication is to be routed to.

It should be appreciated that in FIGS. 10-12, mobile devices or wireline devices are identified with tags "Mobile 1," "Mobile 2;" "Wireline 1," "Wireline 2," "Wireline 3," "Wireline 4," "Wireline 5;" and "Aux. 1," "Aux. 2," and "Aux. 3." Each of those tags can be one of various device identifiers, codes or tokens that uniquely identify a device, such as an international mobile subscriber identity (IMSI), temporary IMSI (TIMSI), a mobile subscriber integrated services digital network (MSISDN), an international mobile equipment identifier (IMEI), a mobile directory number (MDN), a mobile identification number (MIN), a Telecommunications Industry Association (TIA) electronic serial number (ESN), or a multi-bit identification number like the mobile identity number (MEID).

Extrinsic forwarding service can include at least one add-on service that can enhance perceived customer service for the subscriber who benefits from the extrinsic forwarding service and a customer that allows, in part, the extrinsic forwarding service. The following communication scenario illustrates a filtering service that can embody the at least one add-on service. As described supra, when a mobile device of a subscriber that has been provisioned with extrinsic forwarding service is attached to a 3P femtocell AP that enables, at least in part, extrinsic forwarding service, the subscriber can have an incoming call (e.g., 204) intended to the mobile device automatically routed to a wireline device that operates within the coverage area (e.g., 425) of the 3P femtocell AP. The extrinsic forwarding service automatically routes the incoming call to the mobile device based on at least one of presence intelligence of the mobile device and one or more routing preferences associated with the mobile device. However, in certain scenarios, the one or more routing preferences are based, in part, of identification of terminating point(s) of an incoming call, rather than the originating point of the incoming call. As a result of substantive connectivity afforded by the extrinsic forwarding service, incoming call(s) originated from undesired parties (debt collectors, sale persons, former friends or spouses, etc.) or effected at inconvenient times (e.g., praying time in a Bible study meeting held at the coverage area of the 3P femtocell AP). Thus, the undesired incoming call is routed to wireline device, annoying the subscriber and the owner or lessee of the 3P femtocell AP.

The foregoing scenario can be mitigated through provision of a filtering service that is an add-on (e.g., complements or supplements) the extrinsic forwarding service. In such filtering service, prior to routing an incoming call intended to the mobile device of the subscriber that utilizes the 3P femtocell AP for extrinsic forwarding service, one or more components apply one or more of a first screening rule associated with (e.g., defined by) the subscriber or a second screening rule associated with (e.g., defined by) owner or lessee of the 3P femtocell AP. Application of either the first screening rule or the second screening rule, or both such rules, blocks the incoming call. As a result, neither the subscriber nor the owner or lessee of the 3P femtocell AP are annoyed by undesired incoming call(s).

FIGS. 13A-13C illustrate a set of three example user interfaces 1300-1360 that can be rendered as part of configuration of a communication routing service based in part on at least one of a femtocell presence condition and one or more routing preferences in accordance with aspects described herein. Interface component 810, or a component therein or functionally coupled thereto, can render (e.g., display) the subject example UIs. Example UI 1300 illustrates a menu of options to configure a routing service for a specific device based on location, or presence condition. Location menu 1304 presents a selection of "In Premises" category for location type; location menu 1304 also includes "Not In Premises" category, which can be selected even though it is not illustrated in FIG. 13A. In turn, example UI 1308 presents a selection of "Mobile 1" in a device menu 1308 as the wireless device for which a routing preference is to be configured; as discussed supra, "Mobile 1" can identify a mobile device associated with (e.g., owned or leased by) a subscriber the consumes personalized routing of incoming communications as described herein. Device menu 1308 can render a list of one or more optional devices wireless devices for which a routing preference can be configured. Example UI 1312 presents a menu of services to configure: "Intrinsic," "Extrinsic", or "Other". The "Intrinsic" and "Other" service categories include the same or substantially the same service functionality described supra. Selection of the "Extrinsic" category allows configuration of at least one routing preference for extrinsic forwarding service.

Example UI 1330 can be displayed in response to selection of the "Extrinsic" category. Available 3P femtocell APs to enable extrinsic forwarding service can be disclosed in a menu; in the illustration, five femtocell APs are listed, and one (e.g., femto 3) is shown as selected for configuration of a routing preference. Selection of a listed 3P femtocell AP (e.g., femto 3) associates, at least in part, the selected device, e.g., "Mobile 1", with the 3P femtocell AP and related identification (ID) information. Such information can include name of the owner or lessee of the 3P femtocell AP, a nickname (e.g., "Granny femto", "Doc's femto", "Sally's femto") that further characterizes the 3P femtocell AP, and an alphanumeric label (e.g., Equipment ID) that characterizes the 3P femtocell AP for identification to technical support or vendors, such as customer representative that can assist with configuration of extrinsic forwarding service described herein. It should be appreciated that a single entity (e.g., the name of owner or lessee) can be sufficient to characterize the 3P femtocell AP for configuration of a routing preference. Example UI 1360 presents an alternative or additional rendition of available 3P femtocell APs and associated information. The set 1364 of five available 3P femtocell APs are displayed as a windows that can be selected through actuation of selection indicia 1368 via, for example, pressure-sensitive gestures (e.g., finger "swipes"). Other renditions also can be exploited, such as a sequence of one or more screens or tabs that switched through various navigation gestures, such as actuation of "Back"/"Previous" or "Forward"/"Next" indicia (arrows, pop-up window, etc.), or other navigation indicia commonly utilized in navigation of a graphical user interface (GUI).

Figure 14:
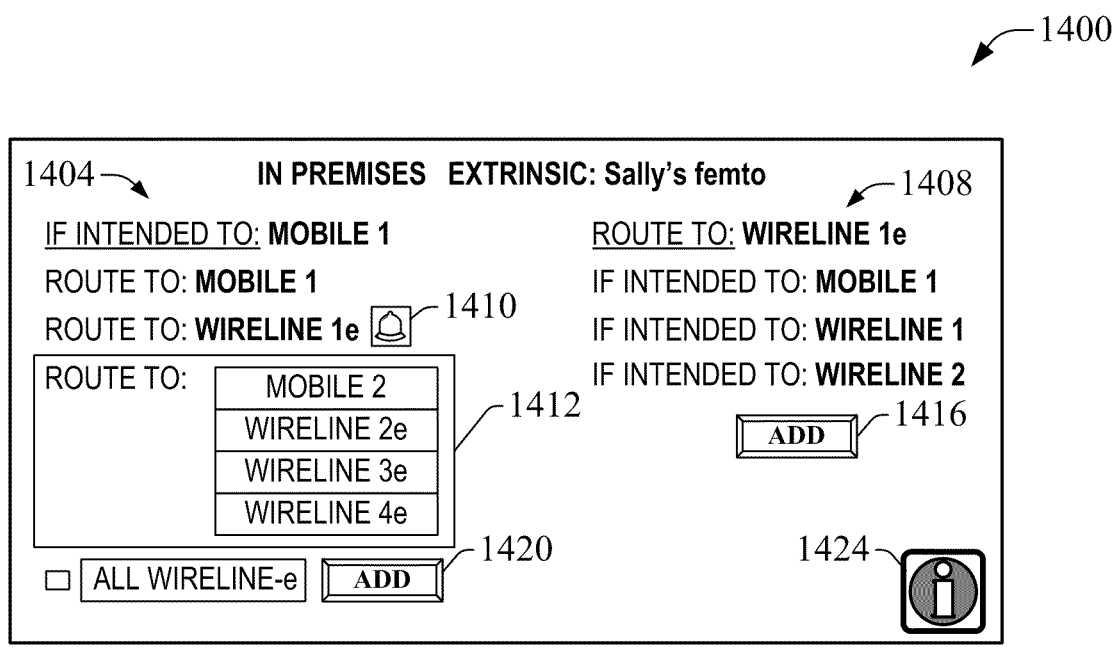
FIG. 14 presents an example UI that enables, in part, configuration of at least one routing preference in accordance with aspects described herein in a scenario in which extrinsic forwarding service is active.

FIG. 14 presents an example UI 1400 that enables, in part, configuration of at least one routing preference in a scenario in which a mobile device has a femtocell presence condition of "In Premises" within a 3P femtocell AP and extrinsic forwarding service is active. In the illustration, the 3P femtocell AP is identified through a nickname (e.g., "Sally's femto"); however, other alphanumeric values that identify the 3P femtocell AP can be utilized. Various routing preferences are illustrated for wireless device "Mobile 1" in a manner similar to that presented in example UI 1200. Routing preferences 1404 establish that incoming communication(s) intended to "Mobile 1" are to be routed to "Mobile 1" and to "Wireline 1e", which is a wireline device (e.g., home manager IP-based telephone) that operates in the area of coverage of "Sally's femto", the 3P femtocell AP that is employed as a reference for femtocell presence condition of "Mobile 1". As part of routing preferences 1404, distinctive ringing for wireline (e.g., "Wireline 1e") device that is part of extrinsic forwarding service can be configured through actuation of a soft-button 1410 (illustrated with a bell in FIG. 14) via various gestures. The distinctive ringing allows recognition of an intended party to a forwarded call session. One or more network nodes in the telecommunication network platform can provide or enable distinctive ringing functionality. In an aspect, actuation of soft-button 1410 can render (e.g., in a pop-up window) a menu of ringtones through which configuration component 820 can receive a selection indication in response to end-user input. Indicia 1412 illustrate a menu of optional devices allowed to be utilized in a routing preference for extrinsic forwarding based on "Sally's femto"; the menu can be toggled on through actuation of soft button 1420. It should be noted that the menu presents "Mobile 2" as an optional device, such device can be a wireless device authorized to receive femtocell service through the 3P femtocell AP that determines, in part, presence condition of the wireless device (e.g., "Mobile 1") for which the example UI 1400 is employed to configure the routing preference for extrinsic forwarding. As discussed supra, identity of the wireless device "Mobile 2" can be extracted from an access control list associated with the 3P femtocell AP that determines, in part, femtocell presence condition for "Mobile 1"; the identity can convey a number, code, or token for the wireless device.

It should be appreciated that in one or more embodiments, interface component 810 can render a stand-alone, or independent, environment, e.g., a web-based user interface or portal, to configure ringing of devices, wireline or otherwise, that are part of extrinsic forwarding routing. To render such embodiment, configuration component 820, via preference driver 824, can execute a dedicated software application or firmware application to provide the environment to configure the ringing of devices.

In similar fashion to example UI 1200, in example UI 1400, when "All Wireline-e" option is selected, an incoming communication (e.g., a SMS message) is routed to all available wireline devices (e.g., POTS home telephone, home manager telephone, . . . ) that operate in the area of coverage of "Sally's femto"; in FIG. 14 such option is unchecked. Routing preferences 1408 disclose that an incoming communication intended to "Mobile 1", "Wireline 1", or "Wireline 2" are routed to "Wireline 1*e*". Thus, incoming calls intended to the subscriber associated with "Mobile 1", "Wireline 1", and "Wireline 2" can be routed to wireline device "Wireline 1*e*" that operates within the area of coverage of "Sally's femto". Soft button 1424 can be actuated render support information for at least one of configuration of a routing preference, registration of a mobile device or wireline device to be included in menus of available devices, or the like. In an aspect, identity of a wireline device can be extracted through various mechanisms, which can be implemented by a configuration component (e.g., 820), or a processor (e.g., 840) that enables, at least in part, the functionality of the configuration component: (1) Device handshake. The configuration component that transmits a directive to render a configuration environment can deliver a request for identification data to one or more devices provisioned in a wireline network (e.g., broadband network for packet-based services) with an associated physical address (e.g., billing address) that matches the physical address of the 3P femtocell AP (e.g., "Sally's femto) employed as reference for presence intelligence. In response, an active wireline device can acknowledge the request and deliver the identification data, which can be employed to populate a menu of available devices. (2) Identification data mining. The configuration component extracts identification data for a wireline device provisioned in the wireline network and that has a physical address that matches the physical address of the femto AP. It should be appreciated that in one or more embodiments, actuation of soft-button 1420 does not provide a set of pre-populated fields but rather an empty form field into which data can be entered to identify a device, wireless or otherwise, to which a communication is intended to or to which the communication is to be routed to. In addition, configuration of one or more routing preferences is specific to a subscriber that utilizes customized communication routing service; data received by a device that renders one or more of the user interfaces described herein is provided by the subscriber and thus the one or more routing preferences are personalized routing preference(s), specific to the subscriber.

Figure 15:
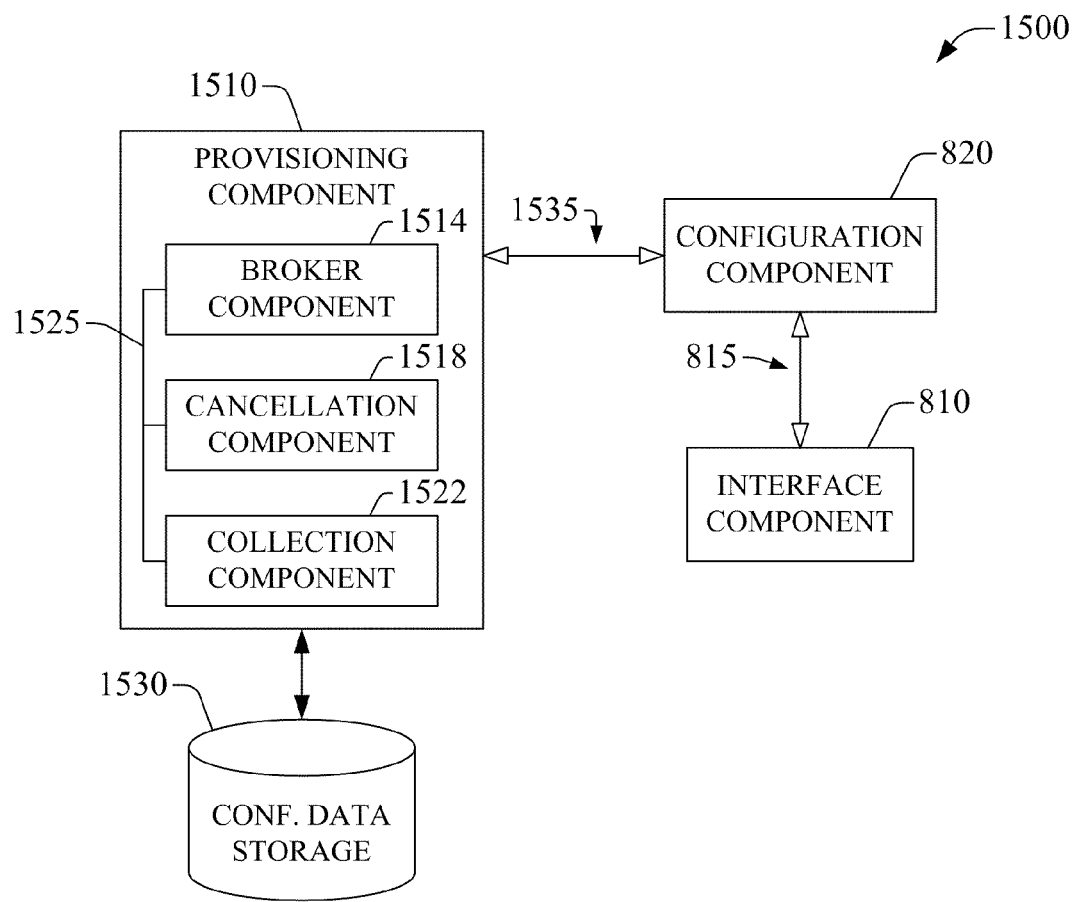
FIG. 15 illustrates a block diagram of an example embodiment of a component that enables, at least in part, provisioning of extrinsic forwarding service as part of customized routing service in accordance with aspects described herein.

FIG. 15 illustrates a block diagram of an example embodiment 1500 of a component that enables, at least in part, provisioning of extrinsic forwarding service as part of customized routing service in accordance with aspects described herein. Broker component 1514 can monitor one or more events that can result in adoption of extrinsic forwarding service and initialization thereof. In response to the one or more events, the broker component 1514 can trigger a prompt in a user device (e.g., UE or CPE) to activate extrinsic forwarding service. The prompt, when rendered, offers extrinsic forwarding service as part of femtocell presence based routing service; as described above, such prompt can be rendered in a device, wireless or wireline, associated with a subscriber who does not own or leases a femtocell AP. In addition or in the alternative, broker component 1514 can subscribe to a notification service effected by one or more network nodes and receive an indication that the one or more events occurred.

Figure 16:
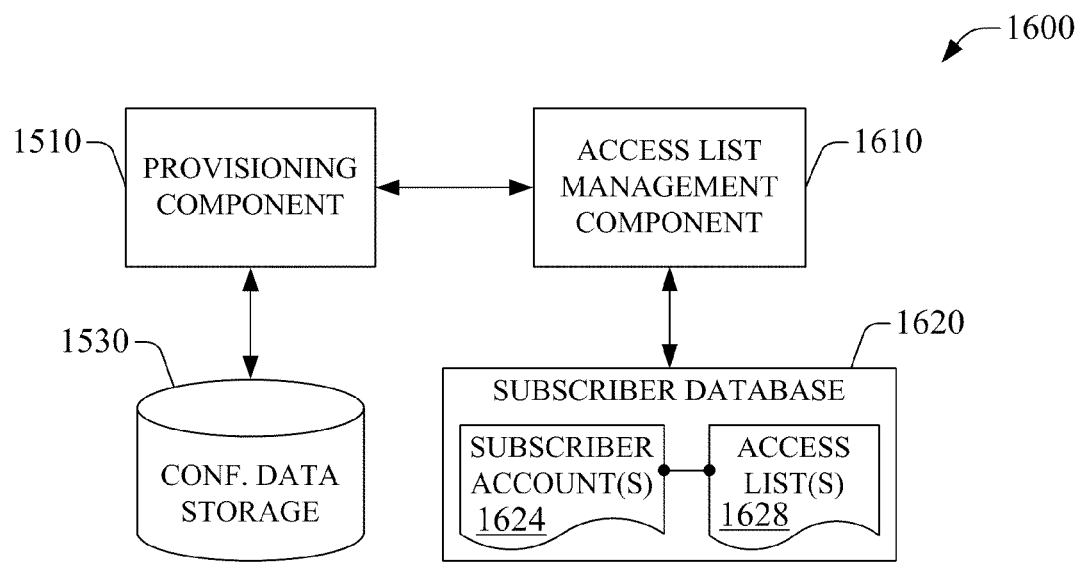
FIG. 16 displays a block diagram of an example system that enables, at least in part, provisioning of extrinsic forwarding service in accordance with aspects described herein.

In an example scenario, an event can be an update of an access control list that regulates access to femtocell wireless service. For such event, broker component 1514 can receive an indication that a mobile device or an identity thereof is included in an access control list for a femtocell AP that can host extrinsic forwarding service (e.g., femto AP 430). The indication can be received as part of implementation of the notification service. In an example embodiment 1600, which is illustrated in FIG. 16, access list management component 1610 can supply the notification service through which the access list management component 1610 can issue a notification or direct a network node to issue a notification if a mobile device identity has been updated in an access control list retained in subscriber database 1620; for example, an owner or lessee of a femtocell AP has populated the access control list with the identity of the mobile device. The access management component 1610 administers configuration (e.g., generation, modification . . . ) of a set of access control list(s) (e.g., access list(s) 1628) linked to one or more subscriber account(s) 1624. Broker component 1514 can generate a message to be delivered to the mobile device to convey that the mobile device has access to femtocell wireless service. The message can be part of the prompt in a user device to activate extrinsic forwarding service, and the broker component 1514 can supply the message either directly to the user device or to a network node or component for delivery to the user device. In an aspect, the message can be embodied in a voice mail message communicated to the mobile device that is granted access to femtocell wireless service. In another aspect, the message can be embodied in a SMS communication if directed to the mobile device that is granted access to femtocell wireless service, or an email communication to an email address linked to the subscriber that owns or leases the mobile device. When the message is rendered, via, for example, interface component 810, the user device prompts for activation of extrinsic forwarding service.

In another example scenario, an event can be registration of a mobile device on a femtocell AP, which can host extrinsic forwarding service. For such an event, if the femtocell AP is not configured to host extrinsic forwarding service, broker component 1514 can receive an indication the mobile device is registered on the femtocell AP and trigger a prompt in the mobile device to activate extrinsic forwarding service. In an aspect, to trigger the prompt, broker component 1514 can deliver a directive to an interface component (e.g., 810) to render a configuration environment and, in response to the directive, the interface component can render the configuration environment. In an aspect, the directive can be transmitted to a configuration component 820 and relayed to an interface component 810; broker component can communicate with the configuration component through various interfaces 1535. In one or more embodiments, the interface component (e.g., 810) can reside in the mobile device. In additional or alternative embodiments, an interface component (e.g., 810) deployed within the mobile device can render an environment to configure extrinsic forwarding service when (e.g., upon or after) the interface component receives an indication the mobile device is registered on the femtocell AP, and the interface component receives or retrieves an indication the mobile device lacks a configured extrinsic forwarding service for the femtocell AP.

In yet another example scenario, the event can be end-user intervention and associated signaling, and related payload data, received by broker component 1514. For example, a subscriber can manually invoke initialization of forwarding service when the subscriber arrives at a location, or facility, in which a confined-coverage AP is in operation; in this scenario, data that enables, at least in part, extrinsic forwarding service, can be supplied by the subscriber via an interface component (e.g., a keypad, a touch screen, or the like), particularly in cases that values for the data are not made available (e.g., prepopulated) by the interface component or other component(s) functionally coupled therewith.

Broker component 1514 can receive a response to the prompt to activate extrinsic forwarding service. In a scenario in which the response conveys activation of the extrinsic forwarding service, broker component 1514 can generate a service record that discloses that extrinsic forwarding service has been provisioned for a set of mobile devices; broker component 1514 can store the service record in configuration data storage 1530. In addition, broker component 1514 can generate a mapping that establishes an association amongst a mobile device in the set of mobile devices and a set of femtocell APs that provide femtocell presence intelligence; broker component 1514 can store the mapping in configuration data storage 1530.

Collection component 1522 retrieves or receives, or otherwise accesses, identification data that defines, in part, the extrinsic forwarding service. Identification data that is retrieved, received, or otherwise accessed, can be retained, at least temporarily, in configuration data storage 1530. The identification data can include at least the following: (i) Femtocell identity (ID), e.g., equipment ID, which can be a serial number specific to femtocell access points; (ii) name of femtocell owner or lessee; (iii) a set of device identifiers associated with a set of respective devices, wireline or wireless; or (iv) at least one routing preference, which can be a default routing preference defined in default routing logic retained in routing logic 554.

The identification data can be retrieved or received, or otherwise accessed, if an affirmative response to activate the extrinsic forwarding service is received by broker component 1514 and related signaling is delivered to configuration component 1522. In another aspect, the identification data can be retrieved or received, or otherwise accessed, in different modalities based, in part, on the one or more events that can result in adoption of extrinsic forwarding service and initialization thereof. In an embodiment in which the event is an update of an access control list, collection component 1522 can request the identification data from at least one of an access list management component (e.g., 1610), a femtocell AP associated with the access control list, or a configuration component (e.g., 820). In addition or in the alternative, the identification data can be retrieved or received, or otherwise accessed, as part of generation of the message to be delivered to the mobile device to convey that the mobile device has access to femtocell wireless service through a specific femtocell AP. In such scenario, as an example, broker component 1514 can request collection component to retrieve the identification data from the various sources described hereinbefore, and supply the information data in order to enter such data in the message. For instance, the following information can be included in the message. Femtocell ID and name of owner or lessee of the femtocell AP, both of which can be provided by the femtocell AP; a set of device numbers, which can be supplied in part (e.g., for wireless devices) by the femtocell AP or the access list management component, and in part by the configuration component via an interface component; and at least one routing preference, which can be supplied by the configuration component (e.g., 820).

In an embodiment in which the event is registration of a mobile device on a femtocell AP, collection component 1522 can be deployed (e.g., installed, configured, and operable) in the mobile device. In an aspect, the collection component 1522 can receive part of the identification data from an interface component (e.g., 810) and part of the identification data from the femtocell AP (e.g., broadcast by the femtocell AP). The interface component can be deployed in the mobile device and receive data from an end-user. The portion of identification data can be the name of femtocell owner or lessee, a set of device identifiers associated with a set of respective devices, wireless or wireline, and a least one routing preference. The portion of identification data received from the femtocell AP can be the femtocell ID (e.g., a home node B (HNB) name, or Home PLMN (Public Land Mobile Network)), which can be hidden from a subscriber that operates the mobile device, e.g., the femtocell ID need not be displayed nor confirmed.

The collection component 1522 can deliver the received identification data to a customization server 560. In another aspect, based on at least the femtocell ID broadcast by the femtocell AP, the collection component 1522 can query a network node within a telecommunication carrier network platform (e.g., 108) to obtain at least a portion of identification data—the femtocell owner or lessee, a set of device identifiers associated with a set of respective devices, etc. The network component can be an AAA server; a billing server; a subscriber database, such as HSS, HLR, VLR, or manager component(s) thereof; or the like. In this aspect, information related to configuration of extrinsic forwarding service (e.g., FIGS. 13B-13C and FIG. 14, and related disclosure) can be automatically furnished to reduce end-user intervention and improve perceived customer service. For instance, the following information data can be automatically furnished: Femtocell ID, as provided in femtocell broadcast message; name of femtocell AP owner or lessee, as supplied by the network component; the set of one or more device numbers associated with a set of respective devices, wireline or wireless; and at least one routing preference which can be part of previously configured default routing. Automatic provision of such information can result in a pre-populated UI, such as that illustrated in FIG. 14. An end user, either a subscriber linked to the mobile device that attached to the femtocell AP, or the owner or lessee of the femtocell AP can received the pre-populated UI and confirm the validity of the information or modify the information in case inaccuracy is present or different settings are desired.

In one or more scenarios, broker component 1514 can receive a directive to terminate submission of prompts to activate extrinsic forwarding service in response to the one or more events; the directive can be received in response to a prompt to activate extrinsic forwarding service. In one or more embodiments, when the one or more events include attachment of a mobile device to a femtocell AP, the mobile device can transmit an instruction to broker component 1514 to discontinue prompting for information when the mobile device attaches to a femtocell AP that is not configured as a host for extrinsic forwarding service. In scenarios in which the mobile device registers frequently, or predominantly, in public femtocell APs (e.g., femto APs deployed in public libraries), prompts or requests to adopt extrinsic forwarding service can produce a low perceived quality of service in addition to increased battery drainage.

In an aspect of the extrinsic forwarding service, before an incoming call (e.g., 154) directed to a first device associated with (e.g., owned or leased by) a subscriber who is granted extrinsic forwarding service is routed to a second device, wireline or otherwise, that operates within the coverage area of a 3P femtocell AP that enables, in part, the extrinsic forwarding service, confirmation to establish that routing the incoming call to the second device can be agreed upon is effected with the owner or lessee of the 3P femtocell AP. Such destination routing confirmation can be implemented (e.g., initiated and performed) at any time subsequent to provisioning of extrinsic forwarding service. In an example, destination routing confirmation can be implemented substantially upon or upon a mobile device of a subscriber that exploits the extrinsic forwarding service registers on the 3P femtocell AP. In another example, the destination routing confirmation can be implemented at the time or after the time at least one routing preference is defined or initialized. Provisioning component 1510, through broker component 1514, can confirm destination routing with a 3P femtocell AP or equipment, wireless or wireline, associated thereto.

Broker component 1514 can effect confirmation and collect related data in several modes. In an example mode, in response to configuration of a routing preference and associated data, configuration component 820 can deliver an indication of the configuration event. Broker component 1514 can receive the indication and implement a confirmation call directed to one or more devices associated with the owner or lessee of the 3P femtocell AP that enables, in part, extrinsic forwarding service. The implementation can be automatic and can include generation and delivery of the confirmation call; transmission of a request to network node(s) (e.g., Interactive Voice Response (IVR) platform, or other system(s) or component(s) within a Core Network) to generate and deliver the confirmation call; or the like. In an aspect, the network node(s) can be an automated voice recognition or key recognition system employed as a proxy for the subscriber that exploits the extrinsic forwarding service to enquire if the owner or lessee of the 3P femtocell AP has agreed to this service.

Cancellation component 1518 monitors event(s) that can result in termination or deactivation of extrinsic forwarding service. In response to detection of an event that terminates filtering service, the cancellation component 1518 updates a service record in configuration data storage 1530 to reflect termination of the filtering service and triggers various update procedures. In an example, an event that terminates extrinsic forwarding service is removal of a mobile device number, code, or token, from an access control list for a femtocell AP (e.g., 430) utilized as a source of presence intelligence. For such an event, at the time of or after removal, the mobile device is no longer allowed to register to the femtocell AP and thus presence condition record for the mobile device ceases to be available; accordingly, extrinsic forwarding service is discontinued. In addition, for the event cancellation component 1518 can deliver a message (e.g., an SMS communication, an email communication . . . ) that conveys termination of filtering service and requests a subscriber who owns or leases the mobile device that is removed from the access control list to update at least one routing preference associated with extrinsic forwarding service. In the alternative, the at least one routing preference is automatically updated. Such update can include logic deletion (e.g., a logical variable or parameter is set to a value that conveys the at least one routing preference is unavailable) or physical removal of data from memory (e.g., the at least one routing preference is physically removed from routing preference(s) storage). In another example, removal of a femtocell AP from a list of hosts (see, e.g., FIGS. 13A-13B) for extrinsic forwarding service is an event that cancels such service. The removal causes an update of routing preference(s) storage 1330 and can be accomplished, in part, through preference driver 824 via, for example, execution of a software application or firmware application to configure a routing preference. In an illustrative scenario, for a device, wireless or wireline, for which extrinsic forwarding service is configured, selection of "Extrinsic" in a service menu 1312 can render the list 1330 of hosts for extrinsic forwarding service that have one or more routing preferences configured. In an aspect, an active femto AP that serves as such host (e.g., "Femto 3") can be listed with a selected checkbox (e.g., soft button or radio button) that represents extant configuration of the one or more routing preferences; when the checkbox is unselected, the active femto AP is deactivated for extrinsic forwarding service. It should be appreciated that indicia other than checkbox(es) also can be employed. As part of execution of the software application or firmware application, and in response to unselecting the femto active AP, confirmation indicia can be rendered to confirm deactivation of the extrinsic forwarding service enabled, in part, by the unselected femto AP. Namely, a confirmation dialog box can be displayed, or aural confirmation prompts can be played, wherein the confirmation dialog box or aural confirmation prompts can convey the message "Are you sure you do not want to route your calls to Sally's home when you are at her house?" and can receive related "Yes" or "No" answers, or any other type of affirmative or negative answers.

The various components that are part of provisioning component 1510 can exchange data and signaling through a bus 1525, which can be embodied in at least one of a memory bus, a system bus, an address bus, a message bus, or one or more reference link(s) or interface(s). One or more processors (not shown) can enable, at least in part, the functionality of provisioning component 1510. To enable such functionality, the one or more processors can execute code instructions stored in a memory (not shown) functionally connected to provisioning component 1510. In one or more embodiments, provisioning component 1510, or one or more components therein, can be embodied in one or more sets of codes instructions that, when executed by at least the one or more processors, implement the functionality of provisioning component 1510, or the one or more components therein.

Figure 17:
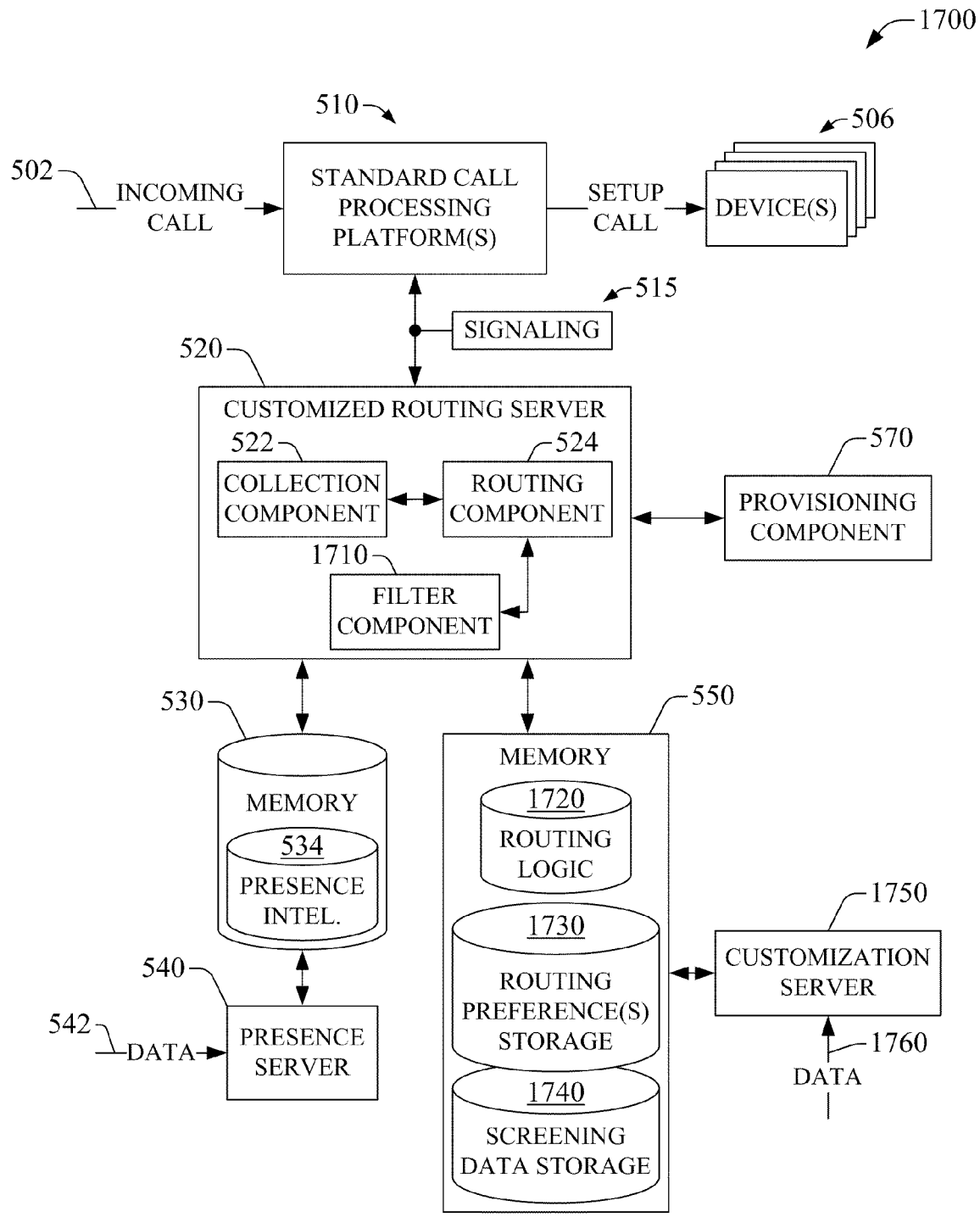
FIG. 17 is a block diagram of an example system that enables filtering features as part of customized communication routing in accordance with aspects described herein.

FIG. 17 is a block diagram of an example system 1700 that enables filtering features as part of customized communication routing in accordance with aspects described herein. Various functional elements of example system 1700 operate in the same manner as in example system 500. To provide filtering features, routing component 524 exchanges message(s) with filter component 1710 as part of default routing logic, which can be stored in routing logic 1720. In a scenario in which filtering service is active for a subscriber associated with a device to which incoming call 502 is intended to, filter component 1710 directs routing component 524 to apply at least one screening criteria as part of routing incoming call 502. Screening criteria can be established as either a pass-through list (or "White List") or a blockade list (or "Black List"). A first screening criterion in an access list expressly allows an incoming call that satisfies the first screening criterion; the pass-through list can be implemented in communication scenarios in which a substantive volume of incoming calls (e.g., nearly 80% of all incoming calls) is to be blocked. In the alternative, a second screening criterion in the blockade list expressly prevents an incoming call that satisfies the second criterion; such blockade list can be implemented in communication scenarios in which a substantive volume of incoming calls is to be allowed. Screening criteria can be characterized by one or more parameters that can include: (A) Calling party identity, such as party's name, telephone number, IP address; (B) schedule information, for example, calendar information, which includes time of day, day of week, week of month, etc.; or (C) network linkage, such as social network relationship, which can include real-life relationship (church members, sport team members, union members, scout leadership members, etc.) or second-life (or virtual) relationship (avatar friend, avatar foe, avatar spouse, avatar child, avatar spiritual leader; Facebook friends, LinkedIn contacts, Twitter followers, etc.). In addition, screening criteria can be categorized as either "generic" or "specific." A generic screening criterion is applicable to all incoming calls (e.g., SMS message), whereas a specific screening criterion is applicable to an incoming call based at least on a set of conditions. The set of conditions can include one or more of (i) presence status of a mobile device in a confined wireless environment, e.g., if a mobile device is attached to a specific femtocell AP, presence status can be set to logical true; (ii) operational status of the mobile device, e.g., "Do Not Disturb" mode, "Forwarding" mode, "Notice of Absence" mode . . . ; (iii) schedule(s) information, such as calendar information; (iv) information on originating point of the incoming call (telephone number is known, logical address such as IP address, SIP service address, etc., is safe); or the like. Screening criteria can be retained in screening data storage 1740 or as part of routing preference(s) storage 1730.

In an aspect of the subject innovation, filter component 1710 determines a sequence in which a set of screening criteria is applied; determination can be autonomous or dictated by a supplied predetermined order. The sequence can prioritize application of screening criteria with a higher likelihood of blocking an undesired incoming call. Screening criteria that expressly blocks incoming calls can be applied before screening criteria that expressly allows incoming calls, whereas a screening criterion that is specific, or rule-based, can be applied after a screening criterion that does not include time constraints or considerations. One or more sequences can be retained within screening data storage 1740. The following is an illustration of application of filter criteria sequence that results in routing of an incoming call (e.g., voice call): If Calling Party Identity="Subscriber Spouse" OR Calling Party Identity="Subscriber Supervisor" AND Day={Monday→Friday} AND Time=7:00→23:00 OR Calling Party Identity=MSISDN_Known AND Time=7→23:00 Route Incoming Call.

Filter component 1710 can collect screening outcome to generate and retain filtering historical data, which can allow, at least in part, the filter component 1710 to generate autonomously a filtering sequence; namely, the sequence in which the set of criteria is applied. Screening data storage 1740 can retain filtering historical data.

Figure 18:
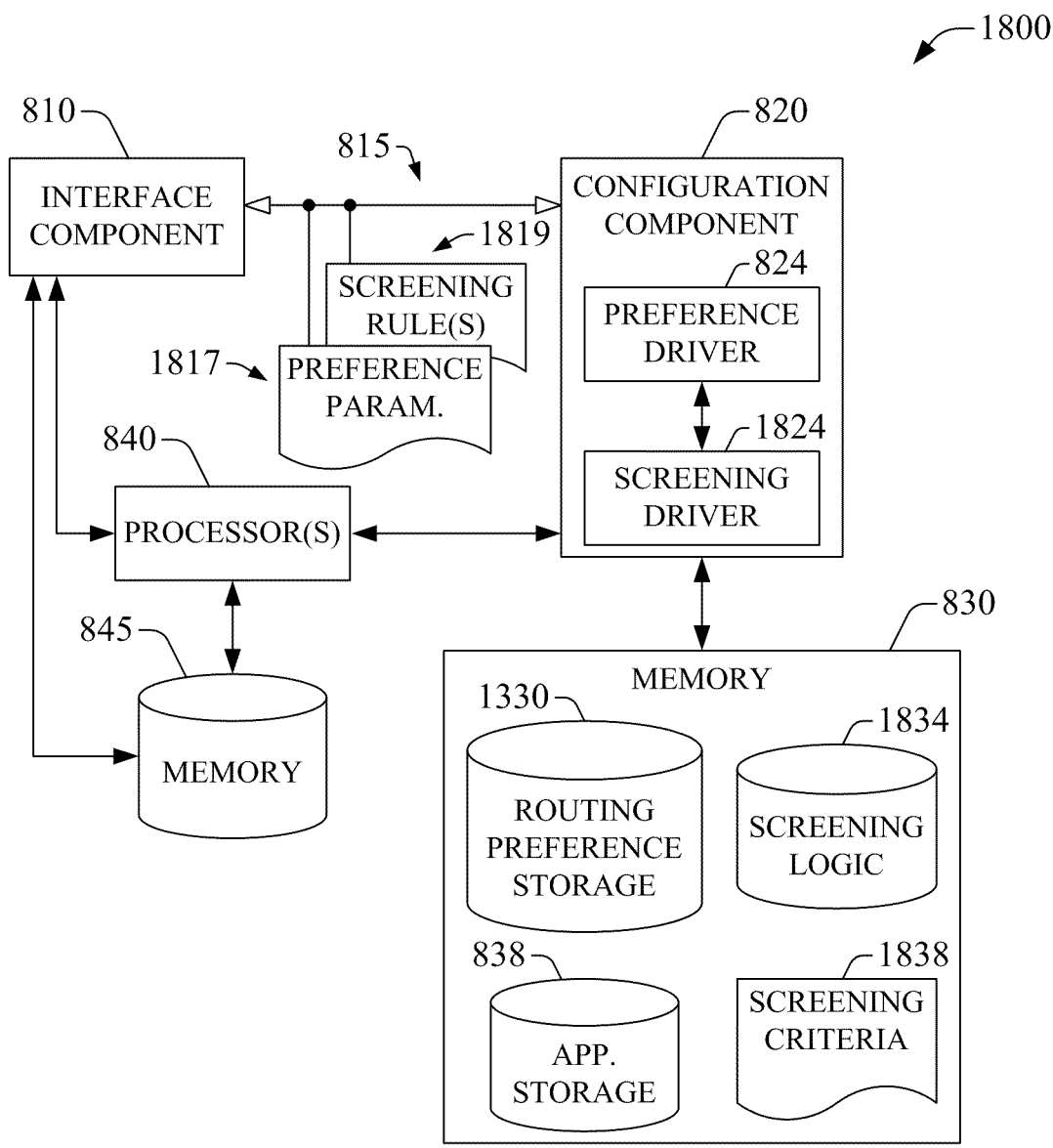
FIG. 18 is a block diagram of an example system that enables configuration of at least one routing preference and one or more screening rules according to aspects described herein.

FIG. 18 is a block diagram of an example system 1800 that enables configuration of at least one routing preference and one or more screening rules according to aspects described herein. Interface component 810 can supply at least one preference parameter 1817 through interface 815; such preference parameter(s) can define a routing preference based at least on femtocell presence intelligence, wherein the routing preference can be directed, in part, to routing of an incoming call as part of the extrinsic forwarding service described herein. Interface component 810 also can supply one or more screening rules 1819 that establish a set of filter criteria that enable, at least in part, the filtering service described herein. A screening rule determines at least one constraint to block an incoming call; the at least one constraint can be temporal device-specific.

As described supra, configuration component 820 receives the at least one preference parameter 1817 and commits such parameter(s) to routing preference storage 1730 within memory 830; to at least such ends, preference driver 824, also referred to as preference driver component 824, can execute a first software application or a first firmware application retained in application storage 838. The first software application or the firmware application is stored as one or more sets of code instructions. In an aspect, configuration component 820 can be a web server that enables a first configuration web portal when preference driver 824 executes the first software application or the first firmware application retained in application storage 838; a first configuration environment rendered by the interface component 810 is at least a portion of the first web portal. Additionally, configuration component 820 receives the one or more screening rule(s) 1819 and commits such rule(s) to at least one of screening logic 1834 or screening criteria 1838 within memory 830. To commit to at least the one or more screening rule(s) 1819 such ends, screening driver 1824, also referred to as screening driver component 1824, can execute a second software application or a second firmware application retained in application storage 838. The configuration component 820 embodied in the web server can enable a second configuration web portal when screening driver 1824 executes the second software application or the second firmware application retained in application storage 838. In an embodiment, memory 830 is the same or substantially the same as memory 550.

In an embodiment in which interface component 810, configuration component 820, memory 845, and memory 830 are integrated systems, configuration component 820 can deliver data (e.g., data 1760) to customization server 1750, wherein the data includes the at least one preference parameter 1817 and one or more screening rule(s) 1819. As described supra, delivery can be accomplished in peer-to-peer mode in accordance with one or more communication protocols (e.g., XDMS, XCAP . . . ). In an aspect, routing preference storage 1730 can operate as a data cache to store the at least one preference parameter 812 and the one or more screening rule(s) 1819 in accordance with a retention protocol (not shown) which can be retained in memory 830. As described supra, the retention protocol can be statically or dynamically configured and includes a set of predetermined parameters that dictate preservation or removal of data in at least one of memory elements 834, 1834, or 1838. As indicated supra, in the subject embodiment, interface component 810 also can provide the functionality of a presence client component (e.g., 610).

FIG. 19 displays an example UI 1900 to configure a routing service for a specific device based on location according to aspects described herein. In an aspect, the subject example UI is a realization of example UI 1300 wherein "Other" service is a "Filter" or "Filtering" service. As illustrated, location menu 1910 presents a selection of "In Premises" category for location type; location menu 1910 also includes "Not In Premises" category, which can be selected even though it is not illustrated in FIG. 19. In turn, device menu 1920 presents a selection of "Mobile 1" as the wireless device for which a service is to be configured; as discussed supra, "Mobile 1" can identify a mobile device associated with (e.g., owned or leased by) a subscriber the consumes personalized routing of incoming communications as described herein. Moreover, device menu 1920 also can render a list of one or more optional devices wireless devices for which a routing service and associated routing preference(s) can be configured. Service menu 1930 offers "Intrinsic," "Extrinsic", or "Filter" service as possible routing services to configure. The "Intrinsic" and "Extrinsic" service categories afford the same or substantially the same service functionality described supra. Selection of the "Filter" category allows configuration of at least one screening criterion that can be applied when routing a communication (e.g., incoming call 204) in accordance with aspects described in the subject disclosure.

FIG. 20 represents an example UI 2000 that enables configuration of a screening criterion in accordance with aspects of the subject disclosure. In one or more scenarios, an interface component (e.g., 810) can display example UI 2000, and data collected through the displayed UI can be conveyed to a customization component (e.g., 820) and retained in a memory element (e.g., a register, a database; 2038) that contains screening criteria. Panel 2004 affords composition of a list of equipment allowed to have call session(s) intended to a device provisioned with extrinsic forwarding service processed and routed to the device; the equipment can be wireless or wireline, and the device can be wireless or wireline as well. The list of equipment is thus a "White List" or access list. Panel 2004 also allows categorization of the listed equipment into "Always On" (marked with an "A" in FIG. 20) or "Rule-based On" (marked with "R"); in panel 2004, checkmarks establish one of these categories. For "Rule-based On" equipment, various restrictions, location-based or time-based, can apply to allowance of call session routing. In an aspect, a user interface (not shown) can be rendered to configure at least one restriction upon selection of "Rule-based On"; such UI (not shown) can include a configurable field to define the restriction (e.g., If "restriction"), a configurable field to identify the device, wireless or otherwise ("Dev"); and a configurable field to identify a filtering action (Then "action", with action being "Block" or "Allow").

Indicia 2008 allows delivery of signaling, and associated payload data, to store a configured access list. In response to actuation of indicia 2008, data can be delivered to the interface component that renders the example UI 2000 and relayed to the customization component that executes the screening configuration application (software or firmware). In addition or in the alternative, actuation of indicia 2008 can result in rendition of a listing of equipment that is available for screening configuration. Actuation of soft-button 2012 enables inclusion of equipment identifying data into the access list that can be composed via panel 2004.

Example UI 2000 also conveys panel 2016, which affords generation of a list of equipment blocked from having call session(s) intended to a device provisioned with extrinsic forwarding service processed and routed to the device; thus, such list of equipment functions as a "Black List." Listed equipment can be classified into an "Always Block" group ("A" in panel 2016) or a "Ruled-based Blocked" ("R" in panel 2016). Similar to "Rule-based On" class, equipment classified as "Rule-based Block" is not always blocked; instead, the equipment is blocked according to one or more restrictions, which can be space-based restrictions or time-based restrictions. Indicia 2020 and 2024 has similar functionality as that of indicia 2008 and 2012.

FIG. 21 presents an example UI 2100 that can prompt an end-user that owns or leases a femtocell AP to select a group of mobile devices that can exploit extrinsic forwarding service and related service(s) in accordance with aspects described herein. Example UI 2100 can be rendered if an interface component (e.g., 810) receives a directive to provide a listing of mobile devices for which extrinsic forwarding service can be made available; in an aspect, the directive can be received as part of configuration proceedings for filtering service. As discussed supra, a subscriber who owns or leases a mobile device that is provisioned with extrinsic forwarding service benefits from such service. Accordingly, the listing of mobile devices can include identification numbers, codes, or tokens, for mobile devices of subscribers associated with the end-user who configures a routing preference for extrinsic forwarding service and related service(s), such as filtering service. In another aspect, example UI 2100 can render a list of sources of identification numbers, codes, or tokens, for mobile devices. Such list can include a set of access control lists (e.g., "Access List 1", "Access List 2", and "Access List 3") and a set of address books (for example, "Address Book 1" and "Address Book 2"). The example UI 2100 also renders control indicia that allow selection of mobile device(s). As illustrated, a source in the list of sources has associated two soft buttons: a first soft button to select specific numbers, codes, or tokens, and a second soft button to grant a service that is configured, e.g., filtering service, to all mobile devices identified in the source.

Figure 22:
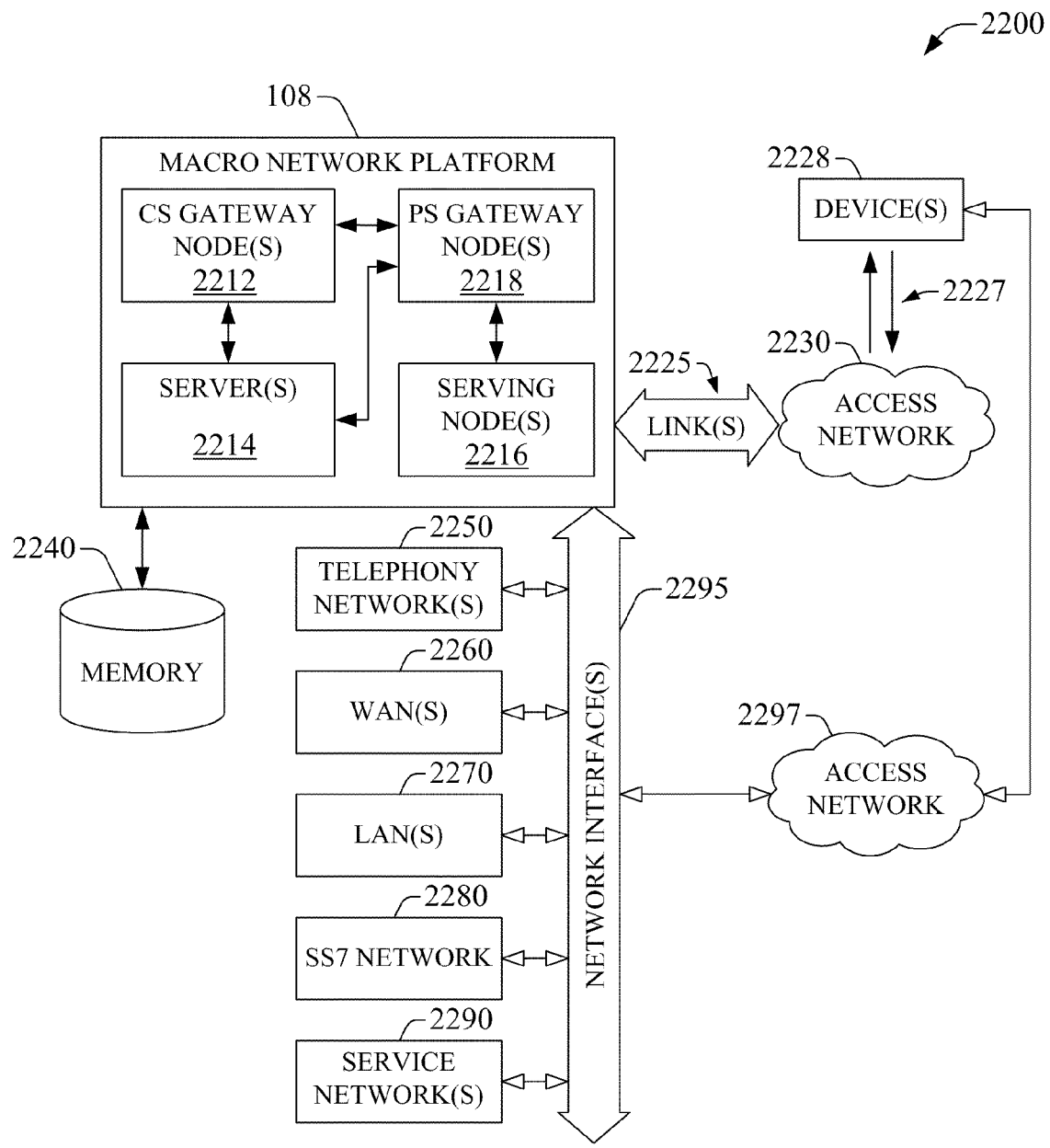
FIG. 22 presents a high-level block diagram of an example network environment that can enable aspects described herein.

FIG. 22 presents a high-level block diagram of an example network environment 2200 that can enable implementation and exploitation of various aspects described in the subject disclosure. Macrocell (macro) network platform 108 can include one or more functional elements, e.g., component(s), node(s), gateway node(s), interface(s), server(s), or platform(s) that enable both packet-switched (PS) (e.g., internet protocol (IP), frame relay, asynchronous transfer mode (ATM)) and circuit-switched (CS) traffic (e.g., voice and data) and control generation for networked communication, wireless or otherwise. It should be appreciated that in cellular wireless technologies (e.g., 3GPP UMTS, HSPA, 3GPP LTE, 3GPP UMTS, 3GPP2 UMB), macro network platform 2210 embodies a core network. PS gateway node(s) 2218 can embody at least part the PS domain. Functional element within the PS domain can enable exchange of notifications, indications, and directives in accordance with various networked communication protocols indicated herein, including one or more peer-to-peer transport protocol(s). With respect to CS communication, macro network platform 410 includes CS gateway node(s) 412, which can interface CS traffic received from legacy networks like telephony network(s) 2250 (e.g., public switched telephone network (PSTN), or public land mobile network (PLMN)) or a SS7 network 2280. CS gateway node(s) 2212 also can enable exchange of messaging communications in SMS protocol. In addition, CS gateway node(s) 2212 can authorize and authenticate traffic (e.g., voice) arising from such networks. Moreover, CS gateway node(s) 2212 can access mobility, or roaming, data generated through SS7 network 2260 in response to various mobility events as described herein; for instance, the mobility data can be stored in a VLR, which can reside in memory 2240. Furthermore, CS gateway node(s) 2212 can interface CS-based traffic or signaling with PS gateway node(s) 2218. As an example, in a 3GPP UMTS network, CS gateway node(s) 2212 can be embodied, at least in part, in gateway GPRS support node(s) (GGSN).

In the subject disclosure, in addition to receiving and processing CS-based traffic and signaling data, PS gateway node(s) 2218 can authorize and authenticate PS-based data sessions (e.g., an incoming call 204, or setup call 224) with device(s) 2228 served through access network 2230 via link(s) 2225 and link(s) 2227, which include wireline links (e.g., reference links) or wireless link(s) (e.g., line-of-sight (LOS) links). Device(s) 2228 is a set of devices that includes wireless device(s), wireline device(s), or a combination thereof. For example, device(s) 2228 can include a mobile device of a subscriber that exploits customized communication routing as described herein, and a set of wireline devices (e.g., 308, 312, 214) that operate within service coverage area (e.g., 302) served by a femtocell AP (e.g., 320).

Access network(s) 2230 can include one or more components that enable transmission of data and signaling, including related payload data, amongst device(s) 2228 and macro network platform 108; access network(s) 2220 can be part of access network(s) 152 and operate in substantially the same or the same manner thereof. Access network(s) 2230 can include a radio access network (RAN), and associated component(s). The RAN comprises one or more outdoor-based (or outdoor) base stations, and associated electronic circuitry, and respective deployment site(s) of the one or more outdoor base stations. In addition, the RAN includes the air-interface which comprises a least one wireless radio link operated in accordance with the base station(s) radio technology. It should be noted that the RAN comprises various coverage cells such as cell 105. For a wireless device served by base station(s) (not shown), one or more network components that are part of a radio access network in access network 2230 enable transmission of data and signaling. For wireline devices, one or more components that are part of a wireline network (e.g., service network(s) 2290) enable the transmission of data and signaling. Link(s), represented with open arrows, operationally connected to network interface(s) 2295 can deliver data and signaling to the wireline device via the one or more components of the wireline network, for example represented by access network 2297, and related link(s) represented with open arrows connecting the access network 2297 to device(s) 2228. Data sessions (e.g., an incoming call 204, or setup call 224) can include traffic exchange with networks external to network platform 2210, such as wide area network(s) (WAN(s)) 2260 or service network(s) 2290; local area network(s) (LAN(s)) 2270 (e.g., enhanced 911) also can be interfaced with macro network platform 108 through PS gateway node(s) 2218. Network interface(s) 2295 enable the traffic exchange; such interface(s) can include conventional wireline or wireless links, or reference links specific to each of the external network(s) that interface with PS gateway node(s) 2218, or other portions of the PS domain in macro network platform 108. In an aspect, PS gateway node(s) 2218 can generate packet data protocol (PDP) contexts when a data session is established. To at least that end, in an aspect, PS gateway node(s) 2218 can include a tunnel interface (e.g., tunnel termination gateway (TTG) in 3GPP UMTS network(s) (not shown)) which can facilitate packetized communication with disparate wireless network(s), which can be part of access network(s) 2220 and can include Wi-Fi networks, femtocell network(s), macrocell network(s) and associated radio access network(s) (RAN(s)) based on various radio technology generations, etc. It should be further appreciated that packetized communication can include multiple flows of data that can be generated through server(s) 2214, such as management server(s) (e.g., a provisioning server, a MSC) or application server(s), which can implement at least a part of the functionality of customized routing server 520, presence server 540, or customization server 560. It is to be noted that in 3GPP UMTS network(s), PS gateway node(s) 2218 (e.g., GGSN) and tunnel interface (e.g., TTG) comprise a packet data gateway (PDG).

In network environment 2200, network platform 2210 also includes serving node(s) 2216 that conveys the various packetized flows of data streams that can be directed to device(s) 2228, and that are received through PS gateway node(s) 2218 from server(s) 2214. In turn, server(s) 2214 can receive the communication(s), such as request for data intended to service network(s) 2280, which can include an IMS core or other packet-based cores, from user equipment within device(s) 2228 or network elements (e.g., customized routing server 520 requests presence information from a HSS). As an example, in a 3GPP UMTS network, serving node(s) 2216 can be embodied in serving GPRS support node(s) (SGSN). As another example, in a 3GPP LTE network, service node(s) 2216 can be embodied in a Mobility Management Entity (MME).

Server(s) 2214 can operate in various layers of macro network platform 108. For example, server(s) 2214 can operate as part of Operations Support Systems (OSS), Business Support Systems (BSS), or network subsystems such as IMS core network. In addition to embodying one or more of customized routing server 520, presence server 540, or customization server 560, and enabling functionality thereof as described herein, server(s) 2214 can execute numerous applications, which can include consumer-oriented application(s), such as messaging services, location services, online gaming, wireless banking, or system-oriented applications, e.g., wireless device management, scheduling or queuing of network traffic, or the like. Such application(s), either consumer-oriented or system-oriented, can generate sets of packetized data streams or flows, and manage (e.g., schedule, queue, format . . . ) such flows. Such application(s), for example can include add-on features to standard services provided by mobile network platform 2210; in an aspect, the add-on features can include the customized communication processing described herein. Data streams generated by server(s) 2214 can be conveyed to PS gateway node(s) 2218 for authentication/authorization and initiation of a data session (e.g., an incoming call 204, or setup call 224), and to serving node(s) 2216 for communication to device(s) 2228 thereafter.

Server(s) 2214 also can effect security (e.g., implement one or more firewalls) of macro network platform 108 to ensure network's operation and data integrity in addition to authentication and authorization procedures that CS gateway node(s) 2212 and PS gateway node(s) 2218 can enact. In addition, server(s) 2214 can implement timing protocols (e.g., Network Time Protocol (NTP)) that supply timing framework(s) for various operation(s) of macro network platform 108. Moreover, server(s) 2214 can provision services from external network(s), e.g., WAN 2260, LAN(s) 2270, IMS core network, which can be part of service network(s) 2290, or Global Positioning System (GPS) network(s) (not shown). Server(s) 2214 can include one or more processors (not shown) configured to provide or that provide, in part, the functionality of macro network platform 108. To that end, the one or more processors can execute one or more sets of code instructions (not shown) stored in memory 2240, for example.

In example network environment 2200, memory 2240 can store information related to operation of macro network platform 108. Information can include content(s), such as subscriber-generated content or from various other sources; subscriber account(s) and associated credential(s); pricing schemes, e.g., promotional rates, flat-rate programs, couponing campaigns; and so forth. Memory 2240 also can store data related to implementation of customized communication routing described in the subject disclosure; for instance, in an aspect, memory 2240 can retain at least part of one or more of presence intelligence 534, routing preference(s) storage 558, or routing logic 554. In addition, memory 2240 can store information from at least one of telephony network(s) 2250, WAN(s) 2260, LAN(s) 2270, SS7 network 2280, or service network(s) 2290. While illustrated as a single entity, memory 2240 can be distributed amongst one or more of the described external networks, server(s) 2214, or other functional elements of network platform 2210. Memory 2240 can be embodied at least in part in a VLR, a HSS, or storage available within a consolidated data repository that centralizes data (administrative data, operational data, etc.) for at least macro network platform 108.

Figure 23:
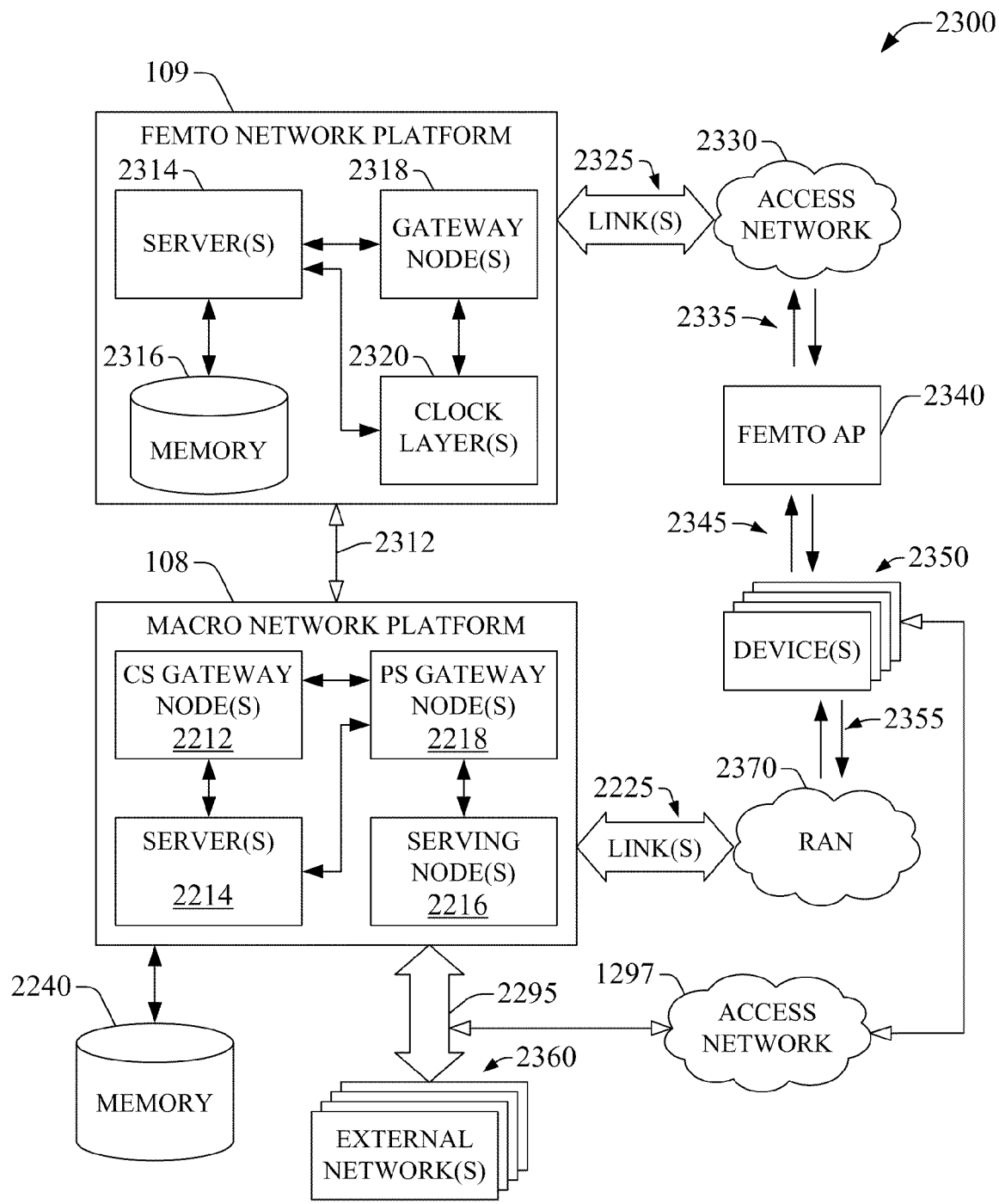
FIG. 23 illustrates an example wireless network environment that includes femtocell and macrocell platforms that can enable aspects or features described herein.

FIG. 23 illustrates an example wireless network environment 2800 that includes a femto network platform and a macro network platform that can enable aspects or features described in the subject disclosure. Macro network platform 108 operates as described supra, and can serve or exchange traffic and signaling communication with wireless devices in the set of one or more devices 2350 via macro radio access network (RAN) 2370 and associated link(s) 2225 and wireless link 2355. As indicated supra, the macro RAN comprises one or more outdoor-based (or outdoor) base stations, and associated electronic circuitry, and respective deployment site(s) of the one or more outdoor base stations. The macro RAN also includes the air-interface, which comprises a least one wireless radio link operated in accordance with the base station(s) radio technology. Femto network platform 109 can serve or exchange traffic and signaling with a mobile device in the set of one or more devices 2350 through access network 2330, which is linked to the femto network platform 109 via backhaul link(s) 2325, and a femtocell (femto) AP 2340 and associated wireless link(s) 2345 and wired link(s) 2335. Access network 2330 is part of access network(s) 152, and femto AP 2340 can operate in accordance with aspects described herein. It should be appreciated that femto AP 2340 can be part of access network 2330; however, in the illustrated embodiment, femto AP 2340 is represented as customer premise equipment separate from the access network 2330.

Femto network platform 109 includes component(s), node(s), gateway node(s), interface(s), server(s), or platform(s) that enable both packet-switched (PS) communication (e.g. IP-based communication, frame relay communication, ATM communication . . . ) and generation of control signaling for networked wireless communication. In an aspect, femto network platform 109 includes femto gateway node(s) 2318, which have substantially the same functionality as PS gateway node(s) 2218. Femto gateway node(s) 2884 also can include substantially all or all functionality of serving node(s) 2216. In an aspect, disparate femto gateway node(s) 2884 can control or operate disparate sets of deployed femto APs. Femto network platform 109 also includes clock layer(s) 2320, which can include the clock strata of network time protocol (NTP) and thus supply various time-based utilities and one or more time records.

Server(s) 2314 have substantially the same functionality as described in connection with server(s) 2214. In an aspect, server(s) 2314 can execute multiple application(s) that provide service (e.g., voice and data) to wireless devices served through access network 2330 and associated femto AP(s). Server(s) 2314 also can provide security features to femto network platform 109. Moreover, server(s) 2314 can manage (e.g., schedule, queue, format . . . ) substantially all packetized flows (e.g., IP-based flows, frame-relay-based flows, ATM-based flows . . . ) the server(s) 2314 generates in addition to data received, via interface 2312 (reference link(s), wireless link(s), various bus architectures, etc.), from macro network platform 108. Furthermore, server(s) 2314 can provision, at least in part, femtocell service and exchange signaling, and related payload data, with one or more network components that effect activation of the femtocell service. Further yet, server(s) 2314 also implement operations and maintenance (O&M) procedures associated with at least one femto AP and one or more functional elements in femto network platform. In one or more embodiments, server(s) 2314 can include one or more processors configured to enable or that enable, at least in part, the functionality of femto network platform 109. To that end, the one or more processors can execute one or more sets of code instructions stored in memory 2316, for example.

Memory 2316 also can retain information relevant to operation of the various components of femto network platform 109 and femtocell service provided to one or more subscribers. For example operational information that can be stored in memory 2316 can comprise subscriber intelligence, such as physical address(es), billing preference(s) and plan(s), one or more records of incidents; contracted services, which can include media entertainment, gaming, or the like; maintenance and service records related to femtocell service; femtocell configuration, including devices authorized for femtocell service and authorized subscribers (e.g., access control list(s)) associated with one or more deployed (e.g., provisioned and active) femto APs; service policies, such as service priority for a device attached to a deployed femto AP, and equipment specifications; privacy policies; add-on features, which can include parental controls; and so forth. In one or more embodiments, memory 2316 can retain at least part of one or more of presence intelligence 534, routing preference(s) storage 558, or routing logic 554.

Figure 24:
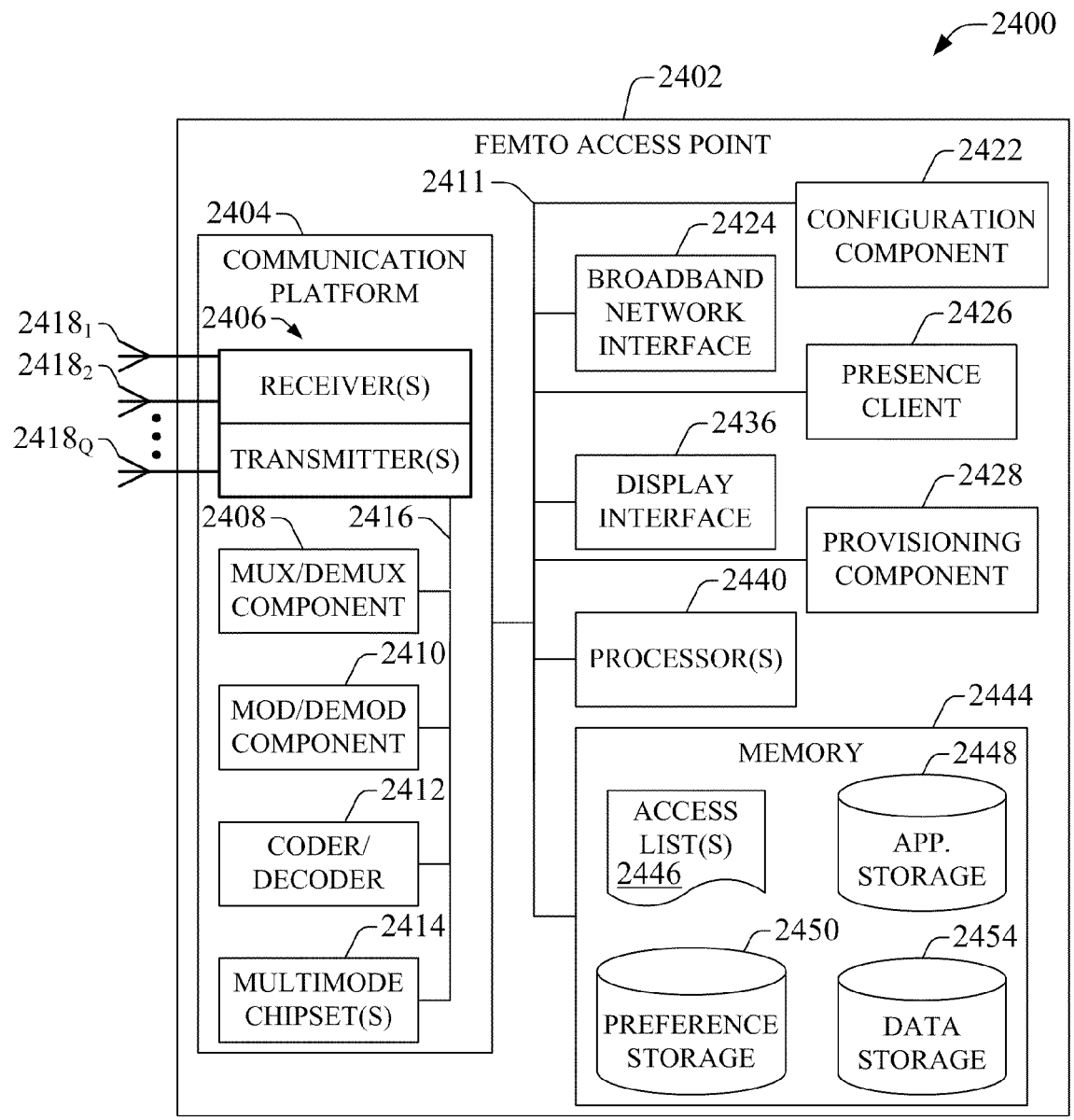
FIG. 24 illustrates an example embodiment of a confined-coverage access point that can operate in accordance with aspects of the subject disclosure.

FIG. 24 illustrates an example embodiment 2400 of a femtocell AP 2402 that can operate in accordance with aspects of the subject disclosure. Femtocell AP 2402 can embody one or more femto AP, or any other confined-coverage access point referred to and described herein. In one or more additional or alternative embodiments, access point 2402 can include fewer or more components or functional elements. To enable wireless service, femto AP 2402 includes communication platform 2404. Communication platform 2404 comprises a set of receiver(s)/transceiver(s) 2406. While each transceiver in the set includes an antenna $2418_\kappa$, with $\kappa=1, 2, \ldots, Q$, with Q a natural number greater or equal than unity. In the subject disclosure, receiver(s)/transceiver(s) 2406 can transmit and receive signal via broadband network interface 2432 and antennas $2418_\kappa$.

Communication platform 2404 comprises electronic components and associated circuitry that enable processing and manipulation, e.g., coding/decoding, deciphering, modulation/demodulation, of signal(s) received by femto AP 2402 and signal(s) to be transmitted by femto AP 2402; received or transmitted signal(s) are modulated and coded, or otherwise processed, in accordance with various radio technology protocols (e.g., 3GPP UMTS, 3GPP LTE . . . ). Components, or functional elements, in communication platform 2404 exchange information through a bus 2416; information includes data, code instructions, signaling and related payload data, or the like, and the bus 2416 can be embodied in at least one of a system bus, and address bus, a data bus, a message bus, or a reference link or interface. The electronic components and circuitry can include the set of Q receiver(s)/transmitter(s) 2406 and component(s) therein, a multiplexer/ demultiplexer (mux/demux) component 2408, a modulator/demodulator component 2410, a coder/decoder 2412, and a set of one or more chipsets, e.g., multi-mode chipset(s) 2414. Receiver(s)/transmitter(s) 2406 can convert signal from analog to digital and vice versa. In addition, receiver(s)/transmitter(s) 2406 can divide a single data stream into multiple parallel data streams, or perform the reciprocal operation; such operations are typically conducted in various multiplexing schemes. Functionally coupled to receiver(s)/transmitter(s) 2406 is a multiplexer/demultiplexer (mux/demux) component 2408 that enables processing or manipulation of signal(s) in time and frequency space or domain. Electronic mux/demux component 2408 can multiplex and demultiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 2408 can scramble and spread information (e.g., codes) according to substantially any code; e.g., Hadamard-Walsh codes, Baker codes, Kasami codes, polyphase codes, and so on. A modulator/demodulator (mod/demod) component 2410 also is a part of communication platform 2404, and can modulate and demodulate information according to various modulation techniques, such as frequency modulation (e.g., frequency-shift keying), amplitude modulation (e.g., M-ary quadrature amplitude modulation (QAM), with M a positive integer; amplitude-shift keying (ASK)), phase-shift keying (PSK), and the like. In embodiment 2400, mod/demod component 2410 is functionally coupled to mux/demux component 2408 via bus 2416. In addition, processor(s) 2440 enables, at least in part, femto AP 2402 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc.

Communication platform 2404 also includes a coder/decoder 2412 that operates on data in accordance with one or more coding/decoding schemes suitable for communication, at least in part, through one or more receivers(s)/transmitter(s) 2406. In an aspect, the coding/decoding schemes, or related procedures, can be retained as a group of one or more code instructions in memory 2444. When telecommunication through one or more transmission point(s) (not shown) associated with femto AP exploits multiple-input multiple-output (MIMO), multiple-input single-output (MISO), single-input multiple-output (SIMO) or single-input single-output (SISO) operation, coder/decoder 2412 can implement at least one of space-time block coding (STBC) and associated decoding; or space-frequency block (SFBC) coding and associated decoding. Coder/decoder 2412 also can extract information from data streams coded in accordance with spatial multiplexing scheme. To decode received information, e.g., data or control, coder/decoder 2412 can effect at least one of computation of log-likelihood ratios (LLR) associated with constellation realization for a specific demodulation; maximal ratio combining (MRC) filtering, maximum-likelihood (ML) detection, successive interference cancellation (SIC) detection, zero forcing (ZF) and minimum mean square error estimation (MMSE) detection, or the like. In addition, to operate in the manner described herein, coder/decoder 2412 can employ, at least in part, mux/demux component 2408 and mod/demod component 2410.

In addition, communication platform 2404 can process (code, decode, format, etc.) signal(s) originated in a wireless environment within a set of one or more electromagnetic (EM) radiation frequency bands, also referred to as frequency bands in the subject specification. The set of EM frequency bands can comprise radio frequency (RF) portion(s) and microwave portion(s) of the EM spectrum, although other spectral regions such as infrared (IR) also can be included. In addition, in one aspect, the set of EM radiation frequency bands can include at least one of (i) all or substantially all licensed EM frequency bands, or (ii) all or substantially all unlicensed frequency bands currently available for telecommunication. It is noted that the set is configurable and can be upgraded to incorporate frequency bands, or frequency carriers therein, as such bands or carriers become available for telecommunication, e.g., auctioned for utilization or authorized for free-of-charge utilization. Communication platform 2404 also can operate in accordance with a configurable set of radio technologies, or communication protocols thereof; procedures that when executed, for example, by a processor, implement the communication protocols can be retained in memory 2444. As new radio technologies become standardized, or available, a network operator that provides telecommunication service via femtocell network can introduce such technologies in the set of radio technologies that can be utilized for telecommunication through a femto AP 2402 deployed in a confined restricted area.

In embodiment 2400, multimode chipset(s) 2414 can enable femtocell AP 2402 to operate in multiple communication modes through various radio network technologies (e.g., second generation (2G), third generation (3G), fourth generation (4G)) or deep-space satellite-based communication in accordance with disparate technical specifications, or standard protocols, for the radio network technologies or satellite communication. The various radio network technologies being part of the set of radio technologies indicated supra. In an aspect, multimode chipset(s) 2414 can enable, at least in part, communication platform 2404 to operate in accordance with standard protocols specific to a telecommunication mode of operation, e.g., Long Term Evolution (LTE)-based communication. In another aspect, multimode chipset(s) 2414 can be scheduled to operate concurrently in various modes or within a multitask paradigm in which the multimode chipset(s) 2414 operates in a dedicated mode for a specific time interval.

Communication platform 2404 can receive and deliver attachment signaling, which can be exchanged with a mobile device as a result of a mobility event. In one or more embodiments, presence client component 2424 can collect, via a scanner component (not shown) and through communication platform 2404, the attachment signaling. To collect attachment signaling, presence client component 2424, via, for example, the scanner component (not shown), can decode the attachment signaling based at least in part on blind decoding of received signal(s), computation of log-likelihood ratios (LLR) associated with constellation realization for a specific demodulation; maximum likelihood (ML) estimation, minimum mean square equalization (MMSE), zero forcing (ZF) filtering, or maximal ratio combining (MRC) filtering. In response to the attachment signaling, presence client component 2424 can generate a notification of attachment (e.g., IMSI attachment) to femto AP 2402, or a notification of detachment (e.g., implicit detachment or explicit detachment) from femto AP 2402. presence client component 2424 also can generate a a notification of attachment based on signaling exchanged with a mobile device as part of location area update (LAU) or a notification of routing area update (RAU). Presence client component 2424 can supply the foregoing notifications of attachment for delivery through communication platform 2404; to provide a notification of attachment, presence client component 2425 can generate, format or encoded, and convey the notification based on attachment signaling. The foregoing notifications of attachment can be provided by presence client component 2424, or presence client 2424, as described supra (see, e.g., FIG. 6 and related discussion).

In embodiment 2400, femto AP 2402 also includes display interface 2436, which can render various indicia associated with functions that control operation of femto AP 2402 or reveal operation conditions thereof, e.g., available connectivity to backhaul broadband network. In addition, display interface 2436 can convey information to an end user, such as number of currently served mobile devices. Moreover, display interface 2445 can receive one or more directives to render an environment (e.g., display a user interface) to configure at least one routing preference associated with customized communication routing as described herein. The one or more directives can be issued (e.g., generated and delivered) by configuration component 2422, which operates in substantially the same or the same manner as configuration component 820.

Figure 25:
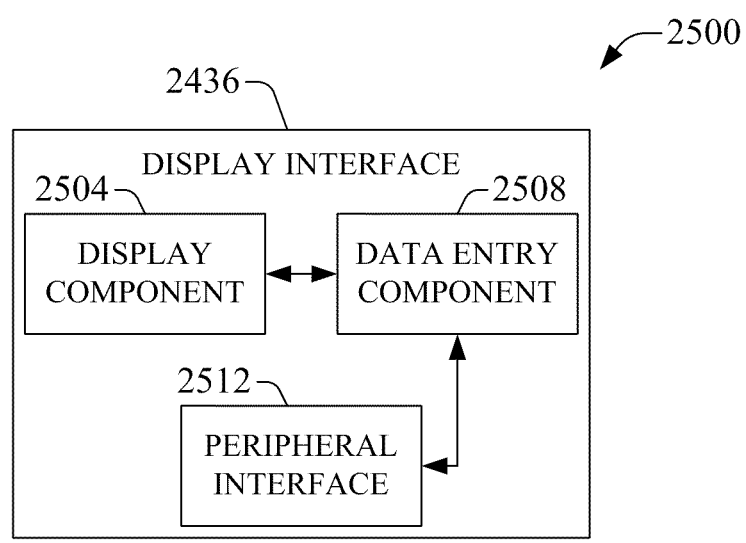
FIG. 25 is a block diagram of a display interface that operates in a confined-coverage access point or other wireless or wireline devices.

Display interface 2436 can convey the environment to configure the at least one routing preference via visual or aural indicia. In an example embodiment 2500 of display interface 2436, see FIG. 25, display component 2504 can render such environment or other content(s) associated with configuration of a routing preference; to at least such end, display component 2504 can convey visual or aural indicia. Various schemes can be employed to render the environment to configure the routing preference, such as, but not limited to, windows-based schemes, e.g., iconic representation, pop-up representation; or text-based representation, with scroll-down or scroll-sideways delivery, or static rendering. In an aspect, display component 2504 can be embodied, at least in part, in a display element within a monitor such as a cathode ray tube (CRT) monitor, a Liquid Crystal Display (LCD) monitor, a plasma monitor, a light emitting diode (LED) monitor, an electrochromic monitor, or the like. Display component 2436 also can enable communication of aural indicia; for example, via speaker(s) (not shown).

In response to rendering a configuration environment to define a set of routing preferences (see, e.g., FIGS. 9-14 and related description), display interface 2436 enables entry of data that defines one or more routing preferences in the set of routing preferences. Display interface 2436 can collect entry of data, through data entry component 2508, that can enable femto AP 2402 to receive external commands (e.g., restart operation) or configuration information (e.g., edit access control list(s) within femto AP 2402 or in administration component within a core network). Display interface 2436 can process (e.g., decode/code), at least in part, received input data and convey it as signaling to one or more functional elements (component(s), platform(s), etc.) or memory 2444 within femto AP 2402. To mitigate fraudulent transaction(s), entry of data can be secured through various credential-based mechanisms, such as password protection, biometric protection, or the like, and associated secured transport protocol(s) that can include data encryption. In an aspect, one or more sets of code instructions that can be executed to implement such mechanisms can be retained within application (app.) storage 2448.

Various functional elements and associated circuitry that can embody, at least in part, data entry component 2508 enable data input through one or more gestures (e.g., touch, speech, motion), one or more communication protocols. Such functional elements can include a keypad, a touch screen, a microphone, a camera(s); a bar code reader, radio frequency ID (RFID) reader, infrared (IR) wireless-based reader; or the like. In addition, data entry component 2508 also can be functionally coupled to peripheral interface 2512 that enables connection to a peripheral device and communication therewith. As an example, peripheral interface 2512 can allow connection of an external antenna to receive global navigation data, e.g., global positioning system (GPS) data; the antenna can reside in an outer location of a confined restricted area in which example femto AP 2402 is deployed, so the antenna is exposed to open sky. As another example, peripheral interface 2512 can enable connection to disparate femto AP(s). In an aspect, peripheral interface 2512 can include a set of ports, which comprises at least one of parallel ports, serial ports, Ethernet ports, V.35 ports, X.21 ports, wherein parallel ports can comprise General Purpose Interface Bus (GPIB), IEEE-1284, while serial ports can include Recommended Standard (RS)-232, V.11, Universal Serial Bus (USB), FireWire or IEEE-1394.

Femto AP 2402 includes processor(s) 2440 which can be configured to provide or that can provide, at least in part, functionality to substantially any or any component(s), platform(s), interface(s), node(s), and so forth, within femto AP 2402 in accordance with one or more aspects of the described operation of femto AP 2402. Processor(s) 2440 is functionally coupled to each functional element within femto AP 2402 and to memory 2444 through bus 2411, which can be embodied in at least one of a memory bus, a system bus, an address bus, a message bus, or one or more reference link(s) or interface(s). In embodiment 2400, processor(s) 2440 is illustrated as external to the various functional elements (e.g., component(s), interface(s), platform(s), node(s)) of femto AP 2402; however, in additional or alternative embodiment(s), processor(s) 2440 can be distributed amongst a plurality of such functional elements. In some embodiment(s), one or more functional elements that comprise femto AP 2402 can reside within memory 2440 as one or more sets of code instructions that, when executed by processor(s) 2440, implement the various functional elements and described functionality thereof.

Processor(s) 2440 also can supply information to and retrieve information from memory 2444. Such information can enable, at least in part, operation of or can provide, at least in part, functionality to communication platform 2404, and at least a portion of functional elements therein; display interface and functional element(s) therein; as well as other operational components (not shown) of femto AP 2402. The information can include at least one of code instructions, code structure(s), data structures, or the like.

Processor(s) 2440 can execute code instructions stored in memory 2444, for example within app. storage 2448, or other memory(ies) functionally coupled to femto AP 2402, to provide, at least in part, the described functionality of femto AP 2402. Such code instructions can include program modules or software applications or firmware applications that implement various methods described in the subject specification and associated, at least in part, with functionality or operation of femto AP 2402.

Memory 2444 also can retain, at least in part in application storage 2448, at least one of data structures (e.g., objects, classes, metadata); code structure(s) (e.g., modules, procedures) or code instructions; or substantially any type of software application(s) or firmware application(s) that processor(s) 2440 can execute to enable, at least in part, functionality associated with substantially any or any component(s), platform(s), interface(s), or functional element(s) within femto AP 2402 in accordance with aspects described herein. In addition, memory 2444 can store network or device information, e.g., within data storage 2454, such as one or more communication protocol(s) or technical specification(s); code sequences for scrambling or spreading; blind decoding hypotheses; semi-persistent scheduling parameters; frequency offsets, macrocell base station identifiers and femtocell AP identifiers (IDs); address book(s); or the like. Moreover, memory 2444 can retain content(s) such as multimedia files or subscriber-generated data. Furthermore, memory 2444 can retain, e.g., within data storage 2454, security credentials (e.g., passwords, encryption keys, digital certificates, biometric keys such as voice recordings, iris patterns, fingerprints, deoxyribonucleic acid (DNA) profiles); hardware identifying tokens or codes such as at least one of an IMSI, a temporary international mobile subscriber identity (TIMSI), packet TIMSI (P-TIMSI), an IMEI, an MDN, a MIN, a TIA ESN, or a multi-bit identification number such as MEID. It is noted that memory 2444 can include affixed or removable elements such as a subscriber identification module (SIM) card storage, a universal integrated circuit card (UICC) storage, or a removable user identity module (RUIM). In one or more embodiments, at least a portion of memory 2444 and content thereof can be external to femto AP 2402 and linked thereto via a peripheral interface (e.g., 2512).

Memory 2444 also includes access control list(s) (ACL(s)) 2446, which can be employed to at least configure default logic for customized routing of an incoming call, as discussed supra. ACL(s) 2446 enable, at least in part, regulation of access to wireless service supplied through femto AP 2402 and features of supplied wireless service. To at least that end, ACL(s) 2446 can comprise a set of access attributes, which identify devices that can communicate wirelessly and are authorized to receive telecommunication service through femto AP 2402. An access attribute uniquely identifies a device.

An access control list associated with a femtocell AP can enable regulation of access thereto in at least the following manner. If a femtocell AP, e.g., 110, receives attachment signaling (e.g., LAU signaling or RAU signaling in UMTS-based radio technology) originated by a device, e.g., a handset in set 102, the femtocell AP validates an identity of the device, as conveyed in the attachment signaling, against the access control list, e.g., ACL(s) 116, associated with the femtocell AP. If the identity of the device matches a device identifier in the ACL, the attachment procedure associated with received attachment signaling is completed and the femtocell AP allows the device to camp therein and establish call sessions normally. In the alternative, if validation against the ACL results in no match amongst the identity of the device and a device identity retained in the ACL, the femtocell AP rejects the attachment signaling and the device is allowed only to establish emergency calls. An owner or lessee of a femtocell AP can determine access attributes to be recorded in or removed from an access control list associated with the femtocell AP.

More than one ACL can be retained in memory 2444; however, a single ACL can be active at a time in order to regulate access and provide wireless services. Memory 2444 also can retain service attributes that control logic for provision of service to a wireless device identified in an ACL. Service attributes can be specific to a femto AP 2402. The logic for provision of service can establish at least one of the following features: (i) Supplied service(s), e.g., voice-only service, data-only service and available applications, voice and data service and provided applications associated with the service(s). In addition, radio technology employed to supply service(s) also can be set. (ii) Service priority, e.g., ranking of access to radio resources such as radio technology (3G or 4G), bandwidth, dedicated channels. (iii) Access schedule or time constraints, such as time of day considerations, or expected duration of provided service. (iv) Level of service or access quality of service, e.g., quality of service (QoS) profile such as best effort, conversational, real-time. It should be appreciated that service attributes also can determine other service features.

A configuration of service attributes, also referred to as a profile of service attributes or access profile, is specific to a mobile device identified in an access control list, even though it should be noted that a particular configuration of service attributes can display a one-to-many relationship with identified devices in an ACL. Accordingly, specification of a service attribute profile can customize provision of wireless service through a femto AP 2402.

Figure 26:
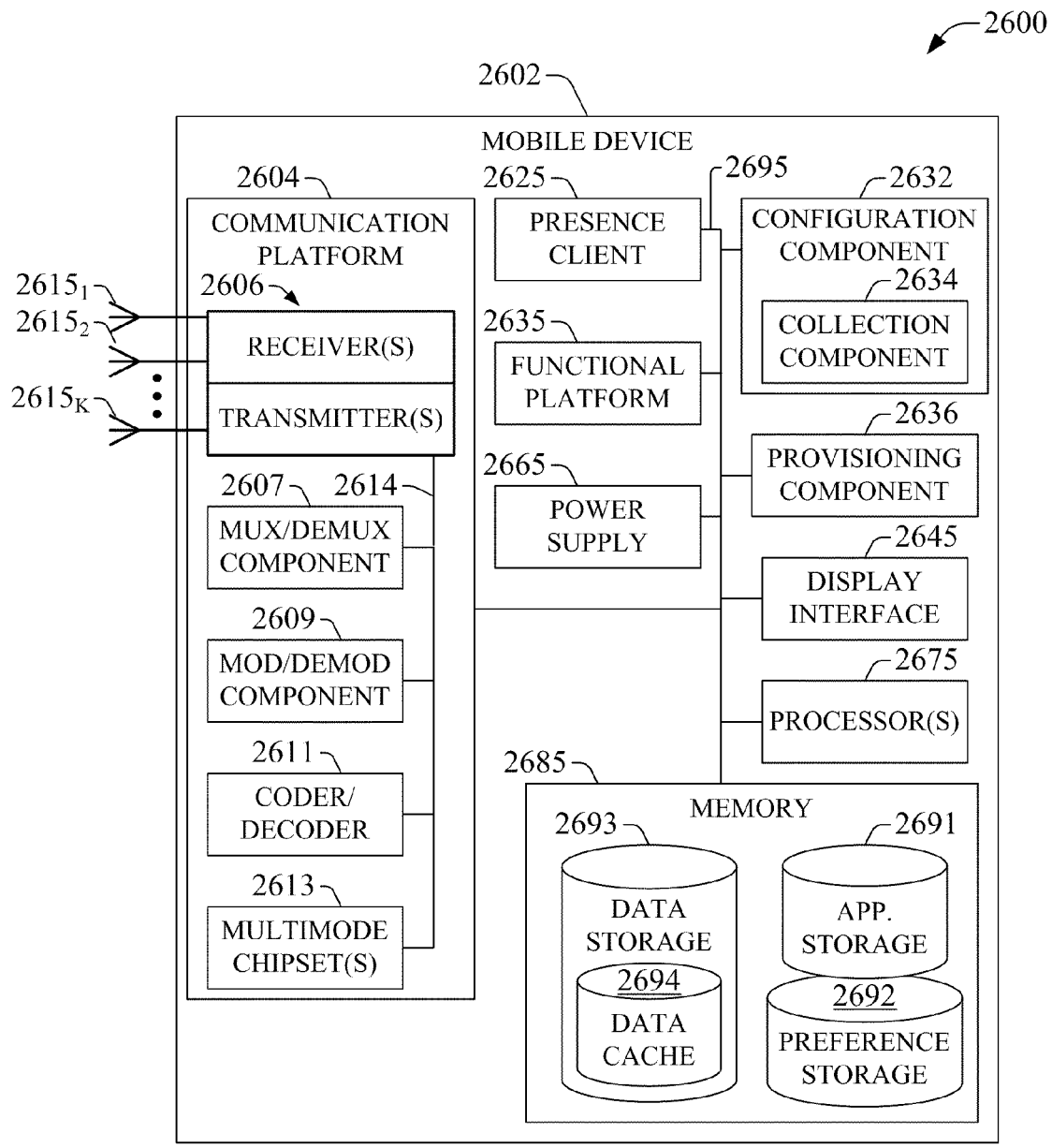
FIG. 26 displays a block diagram of an example embodiment of a mobile device that operate in accordance with aspects described herein.

FIG. 26 illustrates a block diagram of an example embodiment 2600 of a mobile device 2602 that can be leased in accordance with aspects described herein. Mobile device 2602 also can embody certain aspects a wireline device (e.g., a pseudo-stationary or tethered device) that can communicate wirelessly. In one or more additional or alternative embodiments, mobile device 2602 can include fewer or more components or functional elements. To enable wireless communication, and transmit and receive data and signaling wirelessly, mobile device 2602 includes a communication platform 2604, which comprises a set of receiver(s)/transceiver(s) 2606; each transceiver in the set includes an antenna $2615_\lambda$, with $\lambda=1, 2, \ldots K$, with K a natural number greater or equal than unity. One or more of receiver(s)/transmitter(s) 2606 can be configured, e.g., by a base station or component (s) therein, to operate in various telecommunication modes: MIMO mode, MISO mode, SIMO mode, or SISO mode. Receiver(s)/transmitter(s) 2606 include respective filter(s) and amplifiers. The filters are installed between antenna(s) $2615_\lambda$, and the amplifier(s), and tune specific portions of electromagnetic (EM) radiation spectrum available for telecommunications.

Communication platform 2604 comprises electronic components and associated circuitry that enable processing and manipulation, e.g., coding/decoding, deciphering, modulation/demodulation, of wireless signal(s) received by mobile device 2602 and wireless signal(s) to be transmitted by mobile device 2604; the wireless signal(s) modulated and coded, or otherwise processed, in accordance with various radio technology protocols. Components, or functional elements, in communication platform 2604 exchange information through a bus 2614; information includes data, code instructions, signaling, or the like, and the bus 2614 can be embodied in at least one of a system bus, and address bus, a data bus, a message bus, or a reference link or interface. The electronic components and circuitry can include the set of K receiver(s)/transmitter(s) 2606 and component(s) therein, a multiplexer/demultiplexer (mux/demux) component 2607, a modulator/demodulator component 2609, a coder/decoder 2611, and a set of one or more chipsets, e.g., multi-mode chipset(s) 2613. As indicated above, the transceivers includes receiver(s)/transmitter(s) 2606 that can convert signal from analog to digital upon reception, and from digital to analog upon transmission. Receiver(s)/transmitter(s) 2606 also can divide a single data stream into multiple parallel data streams, or perform the reciprocal operation; such operations typically conducted in various multiplexing schemes. Functionally coupled to receiver(s)/transmitter(s) 2606 is a multiplexer/demultiplexer (mux/demux) component 2607 that enables processing or manipulation of wireless signal(s) in time and frequency space or domain. Electronic mux/demux component 2607 can multiplex and demultiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 2607 can scramble and spread information (e.g., codes) according to substantially any code; e.g., Hadamard-Walsh codes, Baker codes, Kasami codes, polyphase codes, and so on. A modulator/demodulator (mod/demod) component 2609 also is a part of communication platform 2604, and can modulate and demodulate information according to various modulation techniques, such as frequency modulation (e.g., frequency-shift keying), amplitude modulation (e.g., M-ary quadrature amplitude modulation (QAM), with M a positive integer; amplitude-shift keying (ASK)), phase-shift keying (PSK), and the like. In embodiment 2600, mod/demod component 2609 is functionally coupled to mux/demux component 2607 via bus 2614. In addition, processor(s) 2675 enables, at least in part, mobile device 2602 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc.

Communication platform 2604 also includes a coder/decoder 2611 that operates on data in accordance with one or more coding/decoding schemes suitable for telecommunication through one or more receivers(s)/transmitter(s) 2604. When communication platform 2604 exploits MIMO, MISO, SIMO modes of operation, coder/decoder 2611 can implement at least one of space-time block coding (STBC) and associated decoding; or space-frequency block (SFBC) coding and associated decoding. Coder/decoder 2611 also can extract information from data streams coding in accordance with spatial multiplexing scheme. To decode received information, e.g., data or control signaling, coder/decoder 2611 can effect at least one of computation of log-likelihood ratios (LLR) associated with constellation realization for a specific demodulation; maximal ratio combining (MRC) filtering, maximum-likelihood (ML) detection, successive interference cancellation (SIC) detection, zero forcing (ZF) and minimum mean square error estimation (MMSE) detection, or the like. In addition, to operate in the manner described herein, coder/decoder 2611 can employ, at least in part, mux/demux component 2607 and mod/demod component 2609.

A network operator can configure, as part of provisioning of mobile device 2602, a set of electromagnetic (EM) radiation frequency bands and a set of radio technologies that communication platform 2604 and components therein can exploit for wireless communication. The set of EM radiation frequency bands, also referred to herein as frequency bands, can comprise radio frequency (RF) portion(s) and microwave portion(s) of the EM spectrum, although other spectral regions such as infrared (IR) also can be included. In an aspect, the set of EM radiation frequency bands can include at least one of (i) all or substantially all EM frequency bands licensed by the network operator (e.g., PCS bands, AWS bands, GWCS bands, and so forth); or (ii) all or substantially all unlicensed frequency bands currently available for telecommunication (e.g., the 2.4 GHz Industrial, Scientific and Medical (ISM) band or one or more of the Unlicensed National Information Infra-structure (UNII) bands in the 5 GHz range). It is noted that as part of network upgrades, the network operator can add frequency bands, or frequency carriers therein, to the set of EM radiation frequency bands as such bands or carriers become available for telecommunication, e.g., auctioned for utilization or authorized for free-of-charge utilization. Similarly, as new radio technologies become standardized, or available, the network operator can introduce such technologies in the set of radio technologies that can be utilized for telecommunication by mobile device 2602.

Additionally, in embodiment 2600, multimode chipset(s) 2613 can allow mobile device 2602 to operate in multiple communication modes through various radio network technologies (e.g., 2G, 3G, 4G) or deep-space satellite-based communication in accordance with disparate technical specifications, or standard protocols, for the radio network technologies or satellite communication. In an aspect, multimode chipset(s) 2613 can enable, at least in part, communication platform 2604 to operate in accordance with standard protocols specific to a telecommunication mode of operation, e.g., 3GPP Long Term Evolution (LTE)-based communication. In another aspect, multimode chipset(s) 2613 can be scheduled to operate concurrently (e.g., when K>1) in various modes or within a multitask paradigm in which the multimode chipset(s) 2613 operates in a dedicated mode for a specific time interval. In yet another aspect, multi-mode chipset(s) enable communication platform 2604 to receive global positioning system (GPS) pilot signals, e.g., timing message(s), orbit information, from one or more deployed global navigation satellite systems (GNNSs).

Communication platform 2604 can exchange (e.g., received and transmit) attachment signaling with at least one confined-coverage AP (e.g., a femtocell AP) or outdoor-based base station (e.g., an eNode B), and deliver notification of attachment (e.g., IMSI attachment) to the confined-coverage AP, or a notification of detachment (e.g., implicit detachment or explicit detachment) from the confined-coverage AP. Moreover, based on exchange of attachment signaling, communication platform 2604 can deliver notification of attachment to the outdoor-based base station (e.g., an eNode B), or a notification of detachment therefrom. In one or more embodiments, for example in UMTS-based radio technology, communication platform 2604 also can deliver a notification of location area update (LAU) or a notification of routing area update (RAU). In an aspect, the foregoing notifications of mobility events can be provided by presence client component 2625, or presence client 2625, as described supra (see, e.g., FIG. 6 and related discussion); to provide a notification, presence client component 2625 can generate, format or encoded, and convey the notification based on attachment signaling. Presence client component 2625 operates in the same manner or substantially the same manner as presence client component 610.

In an aspect, display interface 2645 can receive one or more directives to render an environment (e.g., display one or more user interfaces) to configure at least one routing preference, as described supra. In addition, display interface 2645 can receive and process (e.g., decode, encode, format, or deliver) data from a subscriber via one or more gestures (e.g., touch, speech, motion). In response to rendering the environment to configure the at least one routing preference, the display interface can receive and process data that defines the at least one routing preference; a data entry interface, and associated circuitry, within display interface 2645 can cast such input into data. Display interface can deliver the data, either raw or processed, to memory 2685 to be retained in memory element 2692 or data cache 2694. To mitigate fraudulent or undesired configuration of the at least one routing preference, in an embodiment, a security component (not shown) can secure input data that defines the at least one routing preference through various credential-based mechanisms, such as password protection, biometric protection, or the like, and associated secured transport protocol(s) which include data encryption.

Further to enabling wireless communication of voice or data, mobile device 2602 can provide a specific functionality; for instance, device 2602 can be a mobile phone, a photography camera, a video camera, a wireless dedicated computer (such as a device in an industrial environment), a navigation device, a printer or photocopier, a scanner, a fax machine, a television set, a digital picture frame, or the like. Such specific functionality can be supplied primarily through a functional platform 2635 that comprises a set of components (not shown) that enable, at least in part, one or more specific functionalities that can complement or supplement wireless communication. It should be appreciated that functional platform 2635 can exploit an application (either a software application or a hardware application) retained in application storage 2691 in order to provide one or more functionalities of mobile device 2602; the application is retained as one or more sets of code instructions. As an example, in an aspect of the subject innovation, application storage 2691 can include an application that, when executed, can provide tutorial(s) for operation of mobile device 2602. As another example, when mobile device 2602 is a telephone, functional platform 2635 can include functional elements such as a data entry interface (e.g., a touch screen, a keyboard, a biometric pad for biometric-based access, a microphone, a loud speaker), a camera, peripheral connectors (e.g., a universal serial bus (USB) port or an IEEE 1394 port for transferring data to, or exchanging data with, a disparate device), a voice coder-decoder, which can be part of coder/decoder 2611; intelligent component(s) that can respond to voice activated command(s); and so on.

Display interface 2645 also can render visual or aural indicia that control functionality of mobile device 2602 as supplied through functional platform 2635, or reveal operational conditions of mobile device 2602; for example, battery level, radio technology employed for communication, or the like.

Mobile device 2602 includes processor(s) 2675 configured to enable or that enable, at least in part, functionality to substantially any or any component(s) or platform(s), interface(s), and so forth, within mobile device 2602 in accordance with one or more aspects of the subject disclosure. In embodiment 2600, processor(s) 2675 is illustrated as external to the various functional elements (e.g., component(s), interface(s), platform(s)) of mobile device 2602; however, in additional or alternative embodiments, processor(s) 2675 can be distributed amongst a plurality of such various functional elements. Processor(s) 2675 is functionally (e.g., communicatively) coupled to each functional element within mobile device 2602 and to memory 2685 through bus 2695, which can be embodied in at least one of a memory bus, a system bus, an address bus, a message bus, or one or more reference link(s) or interface(s). In addition, processor(s) 2675 can supply information to and retrieve information from memory 2685, wherein the information can enable, at least in part, operation and/or can provide, at least in part, functionality to communication platform 2605 and at least a portion of component(s) therein; presence client component 2625; configuration component 2632 and component(s) therein; functional platform 2635 and component(s) therein; provisioning component 2636; as well as other operational components (not shown) of mobile device 2602. The information can include at least one of code instructions, code structure(s), data structures, or the like.

It should be appreciated that provisioning component 2636 can operate in substantially the same or the same manner as provisioning component 1510. In addition, provisioning component 2636 can include at least a sub-set of the components that comprise provisioning component 1510.

Processor(s) 2675 can execute code instructions stored in memory 2685, for example within application storage 2691, or other memory(ies) functionally coupled to mobile device 2602, to provide the described functionality of mobile device 2602. Such code instructions can include program modules or software applications or firmware applications that implement various methods described in the subject disclosure and that are associated, at least in part, with described functionality of mobile device 2602.

Memory 2685 can retain, at least in part in an application storage 2691, at least one of data structures (e.g., objects, classes, metadata); code structure(s) (e.g., modules, procedures) or instructions; or substantially any type of software or firmware that processor(s) 2675 can execute to provide functionality associated with substantially any or any component(s), platform(s), interface(s), or functional element(s) within mobile device 2602 in accordance with aspects of the subject innovation. In addition, memory 285 can store network or device information, e.g., within data storage 2693, such as encoded pilot signal(s); one or more communication protocol(s) or technical specification(s); code sequences for scrambling or spreading; blind decoding hypotheses; semi-persistent scheduling parameters; frequency offsets, macro-cell and femtocell identifiers (IDs); address book(s); or the like. Moreover, memory 2685 can retain content(s) such as multimedia files or subscriber-generated data; security credentials (e.g., passwords, encryption keys, digital certificates, biometric keys such as voice recordings, iris patterns, fingerprints, deoxyribonucleic acid (DNA) profiles); hardware identifying tokens or codes such as at least one of an IMSI, a temporary mobile subscriber identity (TMSI), packet TMSI (P-TMSI), an IMEI, an MDN, a MIN, a TIA ESN, or a multi-bit identification number such as MEID. It is noted that memory 2685 can include affixed or removable elements such as a subscriber identification module (SIM) card storage, a universal integrated circuit card (UICC) storage, or a removable user identity module (RUIM).

Mobile device 2602 also includes power supply 2665, which can provide power to one or more components or functional elements that operate within mobile device 2602. In an aspect, power supply 2665 can be rechargeable, e.g., it can be embodied in a rechargeable battery. In addition, power supply 2665 can include one or more transformers to achieve power level(s) that can operate mobile device 2602 and components or functional elements, and related circuitry therein. In an aspect, power supply 2665 can attach to a conventional power grid to recharge, or ensure mobile device 2602 is operational; power supply 2665 can include input/output (I/O) interface(s) (not shown), or connector(s) (not shown), to functionally attach to the conventional power grid. Power supply 2665 also can include an energy conversion component(s) (not shown) such as a solar panel or a thermoelectric device or material, which can be external or internal to the mobile device 2602, in order to provide additional or alternative power resources or autonomy to mobile device 2602.

In view of the example systems described above, example methods that can be implemented in accordance with the disclosed subject matter can be better appreciated with reference to FIGS. 27-46. For purposes of simplicity of explanation, various methods disclosed herein are presented and described as a series of acts; however, it is to be understood and appreciated that the claimed subject matter is not limited by the order of acts, as some acts may occur in different order and/or concurrently with other acts from that shown and described herein. It is noted that not all illustrated acts may be required to implement a described method in accordance with the subject specification. In addition, for example, one or more methods disclosed herein could alternatively be represented as a series of interrelated states or events, such as in a state diagram. Moreover, interaction diagram(s) or call flow(s) represent several of the example methods disclosed herein in accordance with the described subject matter; particularly in instances when disparate entities, or functional elements, enact disparate portions of one or more of the several methods. Furthermore, two or more of the disclosed example methods can be implemented in combination, to accomplish one or more features or advantages described in the subject disclosure.

Methods disclosed throughout the subject specification and annexed drawings are capable of being stored on an article of manufacture (e.g., a removable volatile memory or non-volatile memory) to facilitate transporting and transferring such methods to computers for execution, and thus implementation, by a processor, or for storage in a memory. In an aspect, one or more processors, such as processor(s) that enact the one or more method described herein, can be employed to execute code instructions retained in a memory (volatile or non-volatile), or any computer- or machine-readable storage medium, to implement one or more of the method described herein. Such code instructions provide a computer- or machine-executable framework to enact the various methods described herein.

Figure 27:
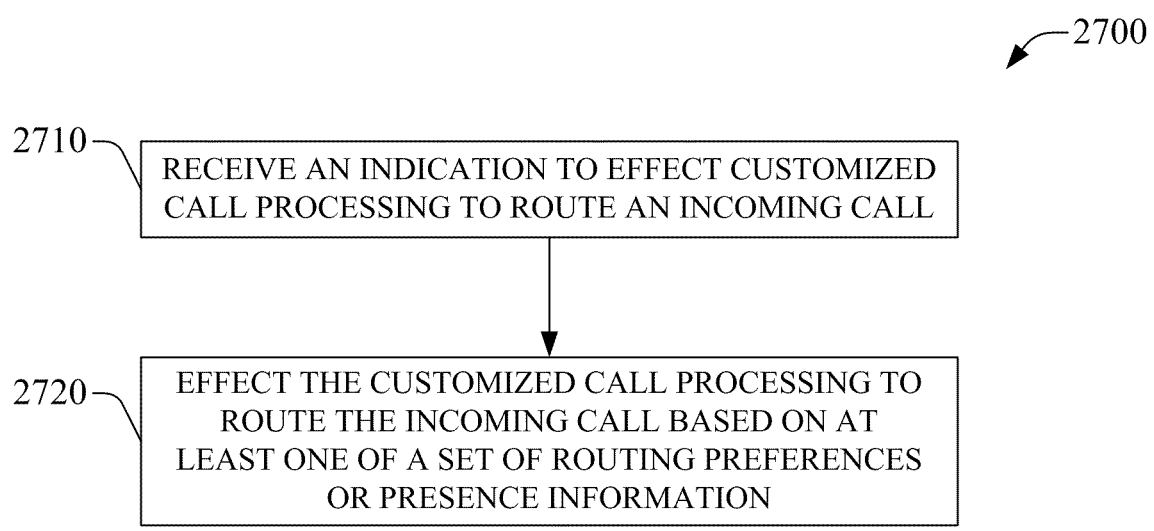
FIG. 27 is a flowchart of an example method for routing a communication to a user device, wireless or otherwise, based on femtocell presence information according to an aspect of the subject disclosure.

FIG. 27 is a flowchart of an example method 2700 for routing a communication to a user device, wireless or otherwise, based on femtocell presence information according to an aspect of the subject disclosure. In an aspect, a routing server (e.g., customized routing server 520) or one or more component(s) therein can implement, at least in part, the subject example method. In another aspect, one or more processors configured to provide or that provide at least part of the functionality to the routing server (e.g., customized routing server 520) also can enact, at least in part, the subject example method. In yet another aspect, in scenarios in which the routing server is embodied in one or more sets of code instructions stored in a memory, at least one processor that executes the routing server, or the one or more sets of code instructions, can enact the subject example method.

At act 2710, an indication to effect customized call processing to route an incoming call is received; routing the incoming call is based in part on presence information of a mobile device in a confined area. A femtocell AP or any type of confined-coverage access point can serve the confined area, while the mobile device is associated with a called device in the incoming call. The presence information can be embodied in a presence condition record retained in a memory or computer-readable or machine-readable storage medium. The mobile device can be the called device, in which case the association is the identity. In an aspect, the indication can be received in response to invoking a CAMEL service when the incoming call is intended for a mobile device associated with (e.g., owned or leased by) a subscriber that consumes personalized communication routing service described in the subject disclosure. In another aspect, the indication can be received as a result of invoking an AS within an IMS core network when the incoming call is directed to the mobile device of the subscriber.

Figure 28:
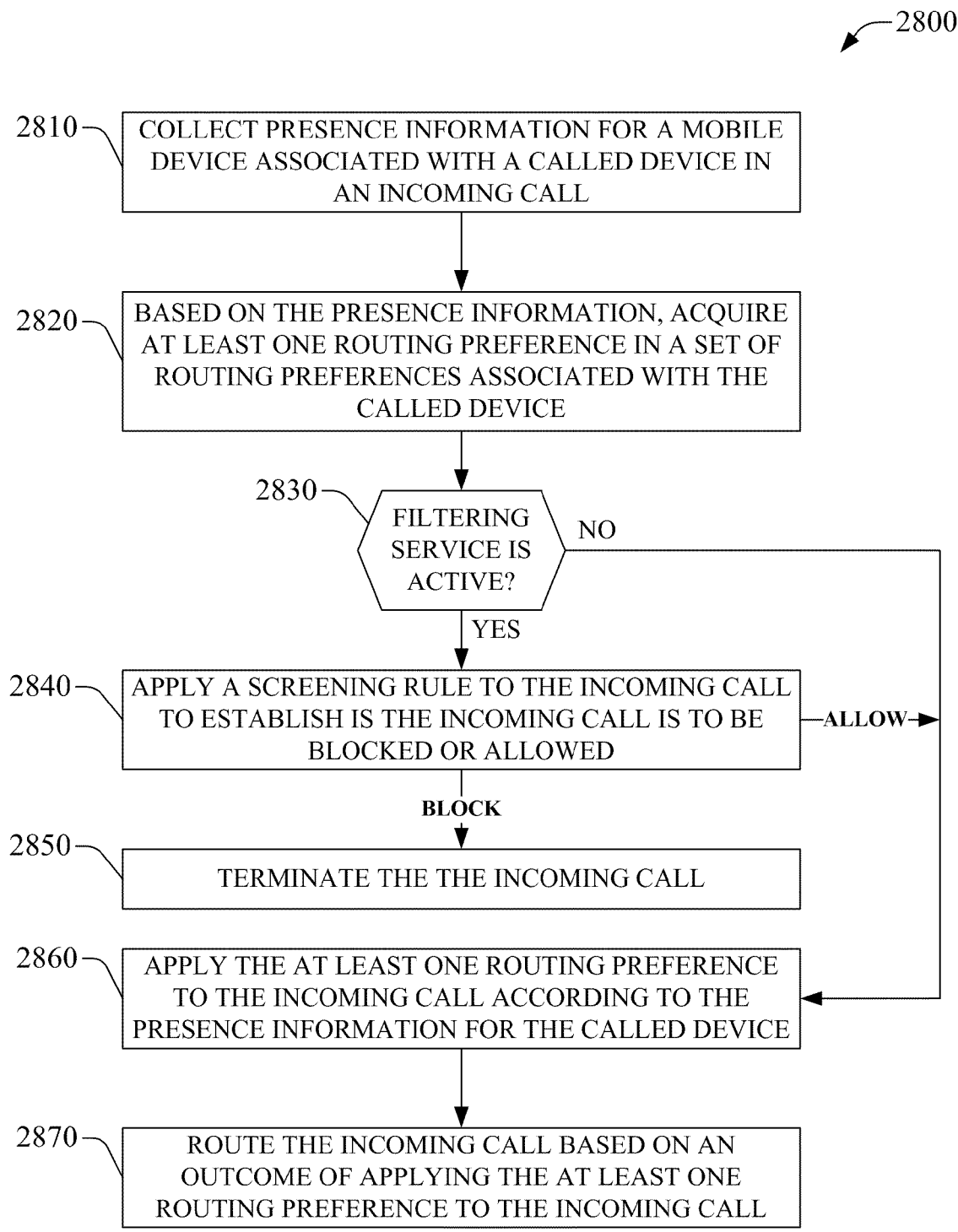
FIG. 28 is a flowchart of an example method for effecting customized call processing based on at least one of presence information or one or more routing preferences according to aspects described herein.

At act 2720, customized call processing to route the incoming call based on at least one of the presence information or a set of routing preferences is effected. In an embodiment, the subject act 2720 can include various acts, as illustrated in FIG. 28, which displays a flowchart of an example method 2800 for effecting customized call processing according to aspects described herein. Server(s), component(s), or processor(s) that effect at least act 1720 also can effect the subject example method. At act 2810, presence information for a mobile device associated with a called device in an incoming call is collected. As described supra, the presence information can characterize the location of the mobile device and can be embodied in a presence condition record retained in memory: (1) "In Premises:At Home", which conveys the mobile device is attached to a femto AP or any other type of confined-coverage access point that is owned or leased by a subscriber who owns or leases, or is otherwise responsible for, the mobile device; (2) "In Premises:At Party Name", which conveys the mobile device is attached to a femto AP owned or leased by a third party (a relative, a friend, or a colleague; a vendor such as a dentist, a mechanic, or a childcare provider; an employer of the subscriber; etc.); or (3) "Not In Premises", which conveys the mobile device is registered on at least one macrocell. At act 2820, at least one routing preference in a set of routing preferences associated with the called device is acquired (retrieved, received, etc.) based in part on the presence information, as described supra. At act 2830, it is determined if a filtering service is active. In the negative case, flow is directed to act 2860, but in the positive case, a screening rule is applied to the incoming call to establish if the incoming call is to be blocked or allowed. If outcome of applying the screening rule dictates that the incoming call is to be blocked, the incoming call is terminated at act 2850. Conversely, if outcome of applying the screening rule dictates that the incoming call is to be allowed, flow is directed to act 2860, in which the at least one routing preference is applied to the incoming call according to the presence information for the called device. As described supra, the at least one routing preference is personalized to a subscriber that owns or leases the mobile device; personalization effected by the subscriber. At act 2870, the incoming call is routed based on an outcome of applying the at least one routing preference to the incoming call.

Figure 29:
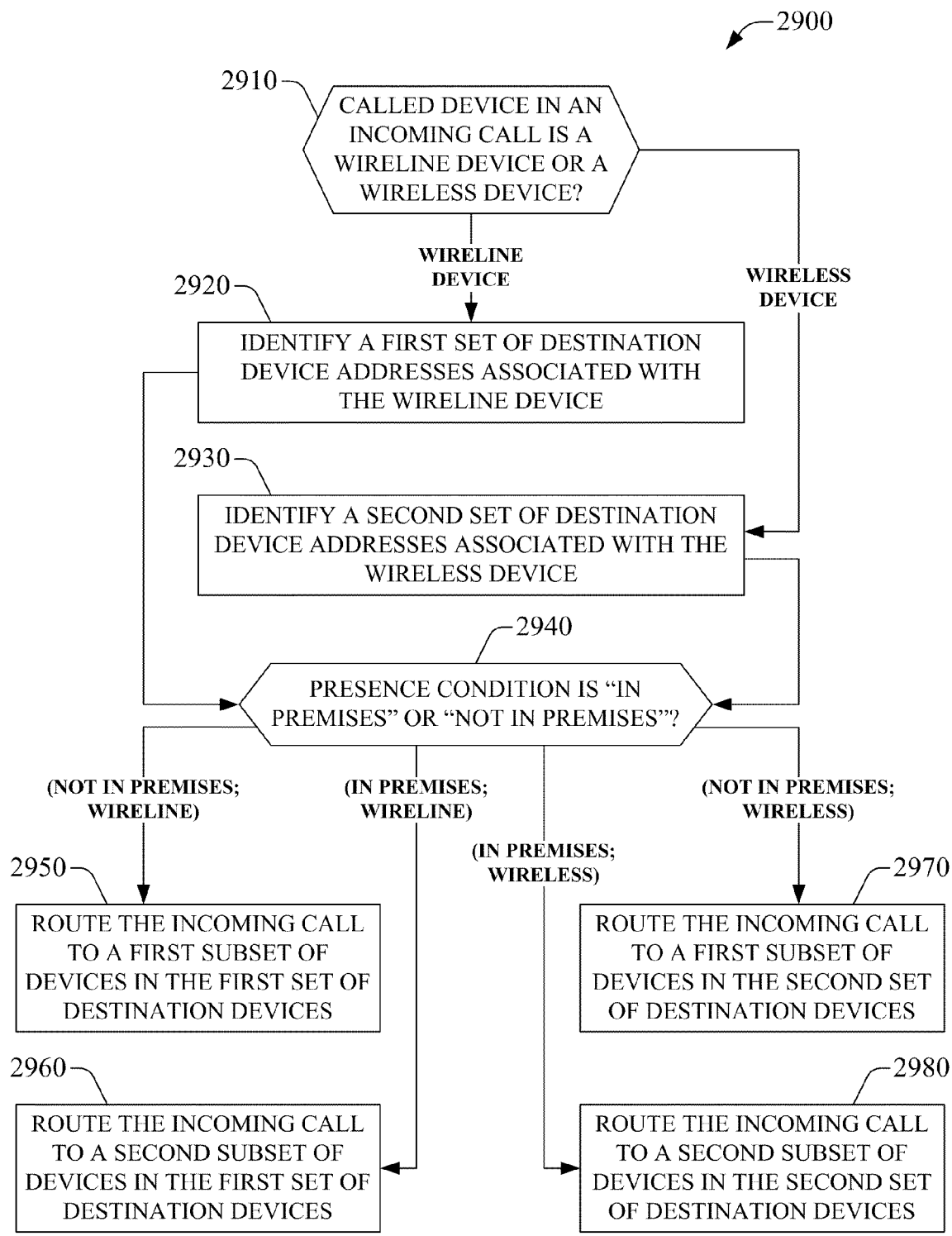
FIG. 29 illustrates a flowchart of an example method for routing a communication based on presence information according to aspects described herein.

FIG. 29 is a flowchart of an example method 2900 for routing a communication based on presence information and at least one routing preference according to aspects described herein. Server(s), component(s) or processor(s) that effect example methods 2700 or 2800 also can implement the subject example method. At act 2910, it is established whether a called device is a wireline device or a wireless device. In case of a wireline device, a first set of destination devices associated with the wireline device is extracted is identified at act 2920; identifying a device in the first set of destination devices includes extracting an address (e.g., device number(s), internet protocol (IP) address(es), or a combination thereof) of the device. In case the outcome of act 2910 establishes the called device is a wireless device, a second set of destination devices associated with the wireless device is identified at act 2930; identifying a device in the second set of destination devices includes extracting an address (e.g., device number(s), internet protocol (IP) address(es), or a combination thereof) of the device. At act 2940, it is determined if the presence condition of a mobile device of a subscriber linked to the incoming call is "In Premises" or "Not in Premises." For the wireline device, if the presence condition is "Not in Premises," the incoming call is routed to a first subset of devices in the first set of destination devices at act 2950, whereas in the presence condition is "In Premises," the incoming call is routed to a second subset of devices in the first set of devices at act 2960. For the wireless device, if the presence condition is "Not in Premises," the incoming call is routed to a first subset of devices in the second set of destination devices at act 2970, whereas in the presence condition is "In Premises," the incoming call is routed to a second subset of devices in the second set of devices at act 2980.

Figure 30:
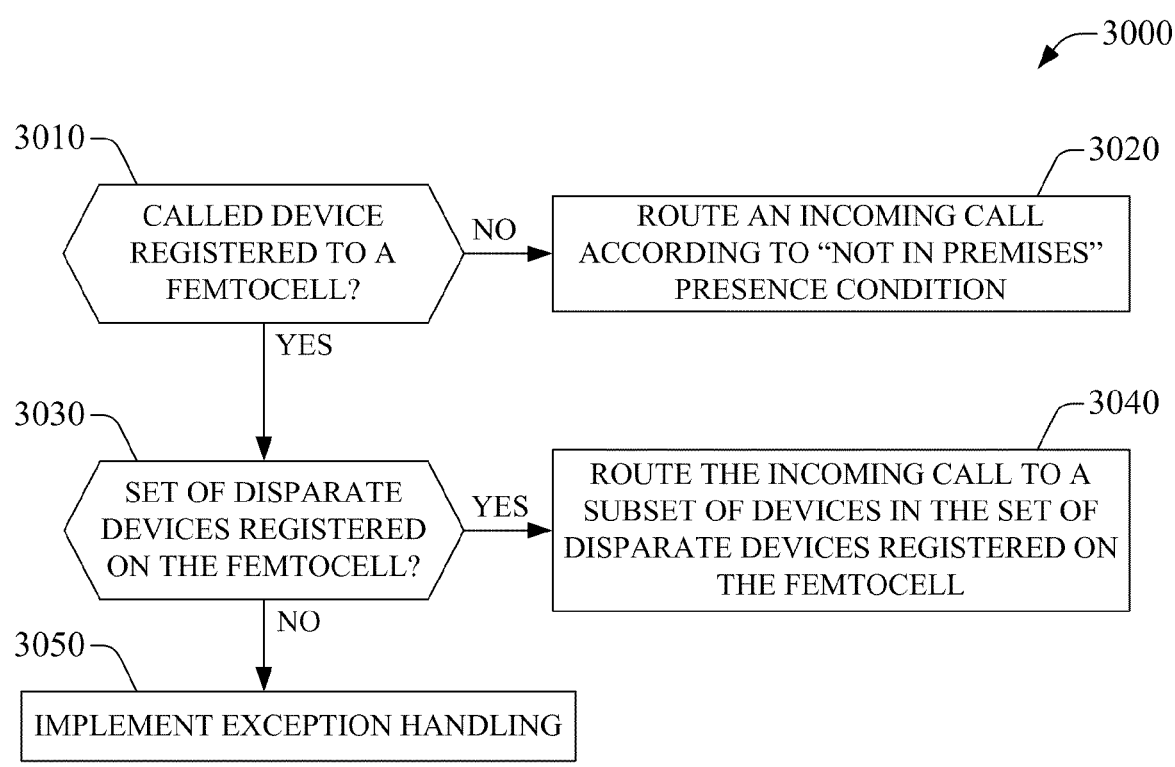
FIG. 30 is a flowchart of another example method for routing an incoming call based on presence information according to aspects described herein.

FIG. 30 is a flowchart of another example method 3000 for routing an incoming call based on presence information and at least one routing preference according to aspects described herein. Server(s), component(s) or processor(s) that effect example methods 2700, 2800, or 2900 also can implement the subject example method. At act 3010, it is determined if a called device is registered to a femtocell. In the negative case, the incoming call is routed according to "Not In Premises" presence condition. Conversely, in case the called device is registered with the femtocell, it is determined if a set of disparate devices is registered on the femtocell at act 3030. A negative determination leads to act 3050, in which exception handling is implemented, but a positive determination leads to act 3040 in which the incoming call is routed to a subset of the set of devices registered on the femtocell.

Figure 31A:
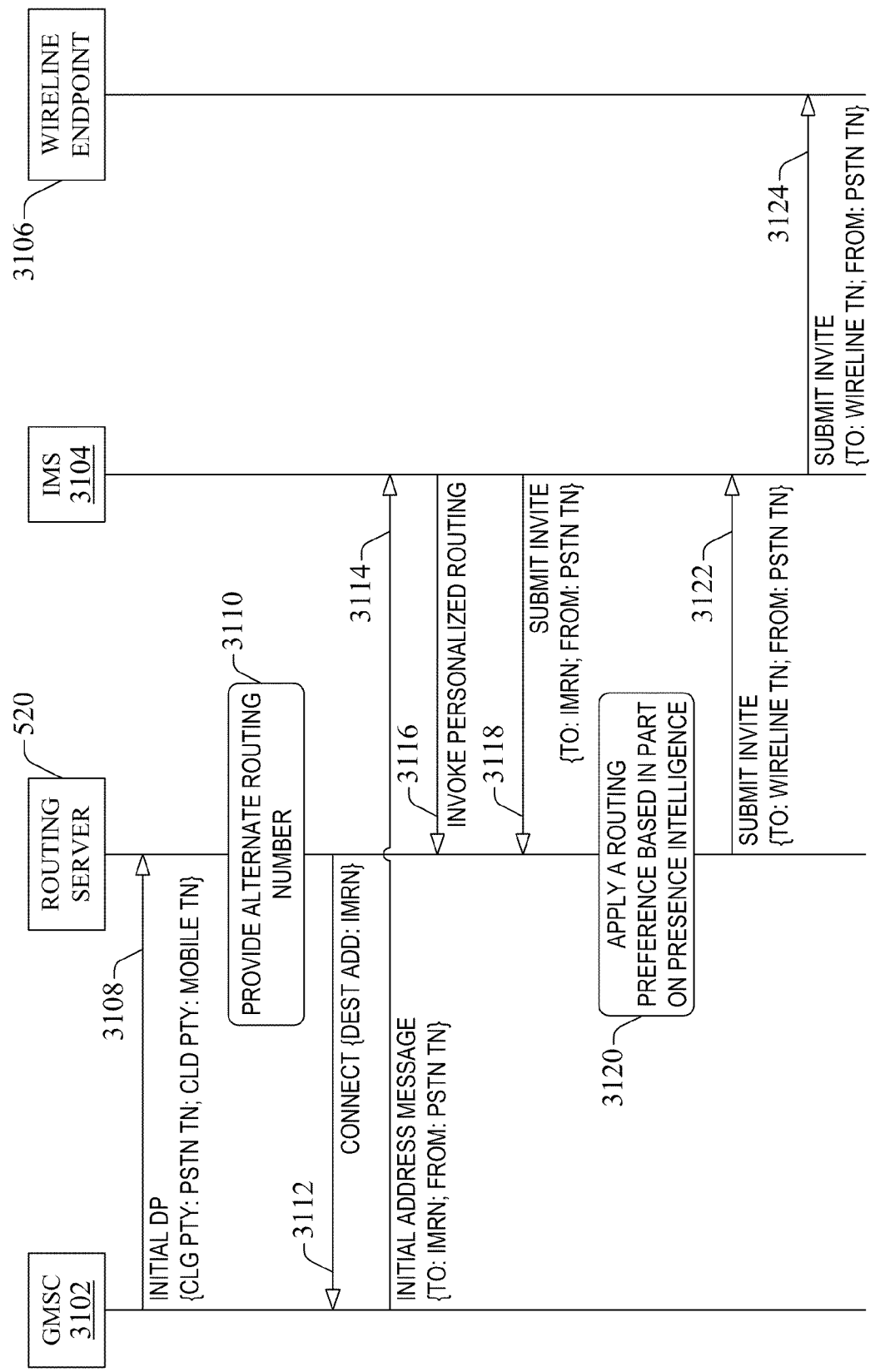
FIGS. 31A-31B illustrate call flows of example methods for directing a wireless incoming call based on customized call routing according to aspects described herein.
Figure 31B:
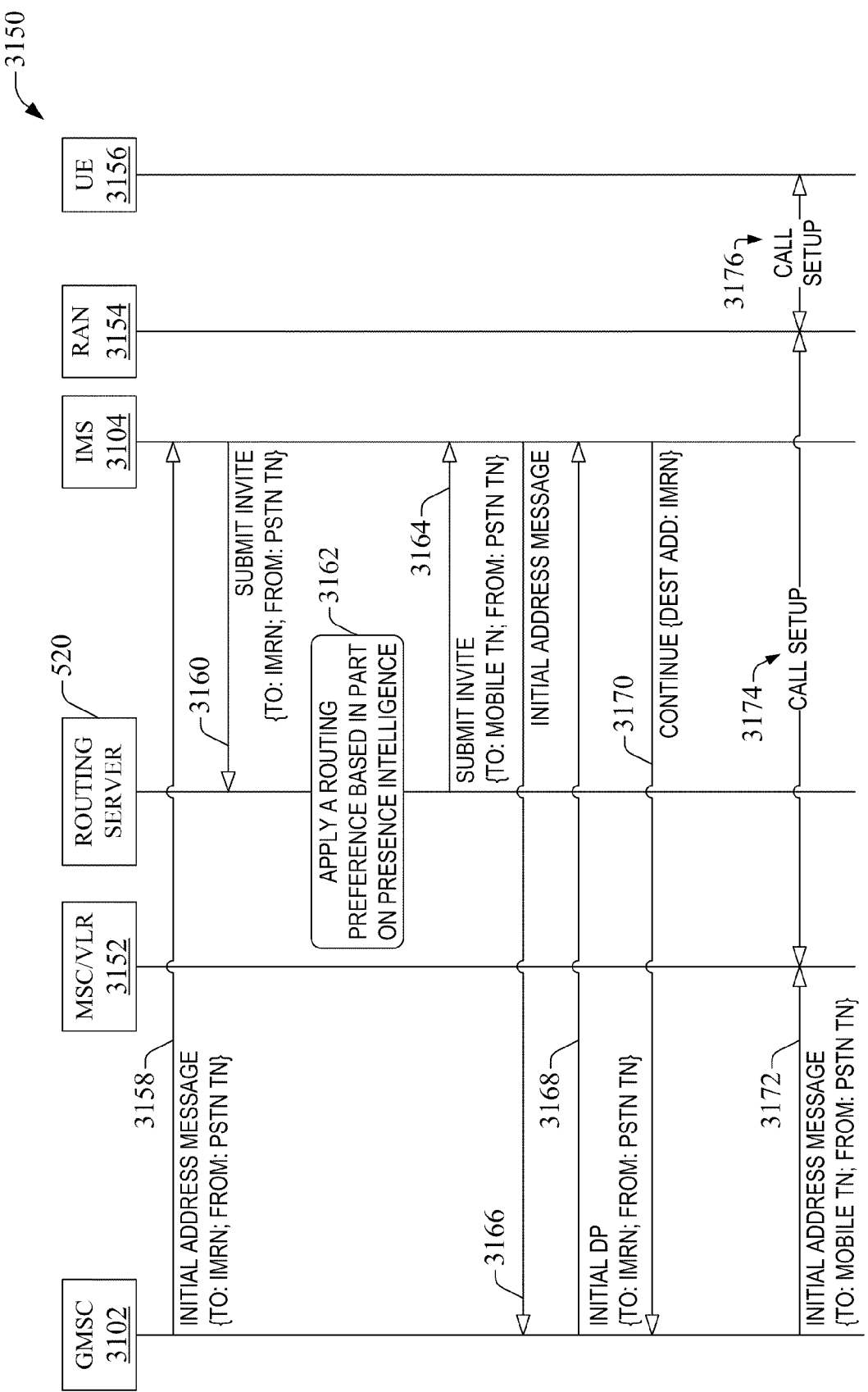

FIGS. 31A-31B illustrate call flows of example methods 3100 and 3150, respectively, for directing a wireless incoming call based on customized call routing according to aspects described herein. While the subject example methods are illustrated for UMTS radio technology and make reference to GMSC, MSC, VLR, or the like, the subject example methods 3100 and 3150 can be similarly implemented for other radio technologies, such as 3GPP LTE. In connection with FIG. 31A, the incoming call is directed, or routed, to a wireline endpoint (e.g., a wireline device or a pseudo-stationary device). At act 3108, an initial data packet (DP) is conveyed to a customized routing server 520 from a gateway mobile switching center (GMSC) 3102, which includes one or more servers. As in conventional telecommunication systems, the initial DP (Data Packet) includes a reference to a calling party, e.g., a PSTN telephone number, and a called party, e.g., a mobile telephone number (TN). The routing server 520, at act 3110, provides an alternate routing number, based at least in part on routing criteria. Routing logic retained in a memory element (e.g., routing logic store 554) in a memory functionally coupled to routing server 520 can include the routing criteria. At act 3112, the customized routing server 520 delivers a connect message that references an alternate destination address as the alternate destination number (e.g., an IP Multimedia Routing Number (IMRN)). In response, at act 3114, the GMSC 3102 conveys an initial address message with IMRN as destination and PSTN as source as the incoming call. In an aspect, the initial address message is conveyed to an IP multimedia subsystem (IMS) 3104, which invokes personalized routing at act 3116. In an aspect, to invoke personalized routing, the IMS 3104, or a network node therein, conveys an indication to effect customized call processing; IMS 3104 can deliver such indication in accordance with an IMS TAS trigger point or filter rule. In addition, IMS 3104 submits an INVITE message at act 3118; the INVITE message is delivered in accordance with session initiation protocol (SIP) and it includes IMRN as destination address and PSTN TN as source address. It should be appreciated, however, that packet-based network platforms other than IMSs can provide the functionality described herein and administer telecommunication services as part of the subject customized call routing. Other protocols for session initiation, such as H.323, also can be employed.

At act 3120, customized routing server 520 applies a routing preference based in part on presence intelligence, which discloses registration status of a mobile device associated with the mobile TN on a confined-area AP owned or leased by a subscriber that owns or leases the mobile device or by a third party. Accordingly, the presence intelligence not only can disclose if the mobile device is "In Premises" or "Not In Premises", but it can convey a discriminator that denotes if the mobile device is "At Home" or "At Party_name Home", for example. The routing preference can be retained within a memory element (e.g., routing preference(s) storage 558) functionally connected to customized routing server 520. The customized routing server 520 can receive presence intelligence from a repository (e.g., presence intelligence storage 534) functionally linked thereto. At act 3122, the customized routing server 520 submits an INVITE message, with PSTN TN as source address and a wireline TN as the destination address, to the IMS 3104. It is noted that in one or more embodiments, a plurality of INVITE messages can be delivered. At act 3124, the IMS 3104 initiates a call session with the wireline endpoint 3106 identified by the destination address by relaying the INVITE message received from the customized routing server 520.

Regarding FIG. 31B, the incoming call is directed, or routed, to a wireless device (UE 3156). At act 3158, an initial address message is delivered to IMS 3104 from GMSC 3102. The address message includes references to a destination number (IMRN) and a source number (PSTN TN). In response, at act 3160, the IMS 3104 submits an INVITE message to customized routing server 520; the invite message is directed to IMRN from PSTN TN. At act 3162, the routing server 520 applies a routing preference based in part on presence intelligence—this act is substantially the same as act 3120 and shares most or all aspects thereof—and conveys an INVITE to IMS 3104. The INVITE is directed to the wireless device, through a reference to a mobile telephone number (TN) associated with the wireless device. The INVITE message has a reference to the source number (PSTN TN). In view of the reference to the mobile TN, IMS 3104 delivers an initial address message to GMSC 3102 at act 3166. The GMSC 3102 responds by supplying an initial DP, with references to IMRN and PSTN TN, to IMS 3104 at act 3168. IMS 3104 conveys, at act 3170, signaling to continue the call session towards destination address IMRN. GMSC 3102 receives such signaling and validates destination address with a mobility management component, such as a Home Location Register (HLR) (validation acts not depicted in FIG. 31B). After validation, GMSC delivers, at act 3172, an initial address message, with references to mobile TN as source and PSTN TN as destination; the initiation address message is delivered to mobility switching center (MSC)/Visited Location Register (VLR) 3152. In response to the initial address message, MSC/VLR 3152 exchanges signaling, and related payload data, through various acts 3174 with at least one component of a radio access network (RAN) 3154 for call setup. The RAN 3154 exchanges signaling, and related payload data, with the intended wireless device (UE 3156) via one or more acts 3176. The various acts 3174 and the at least one component of RAN 3154 are specific to the radio technology employing for wireless communication.

Figure 32A:
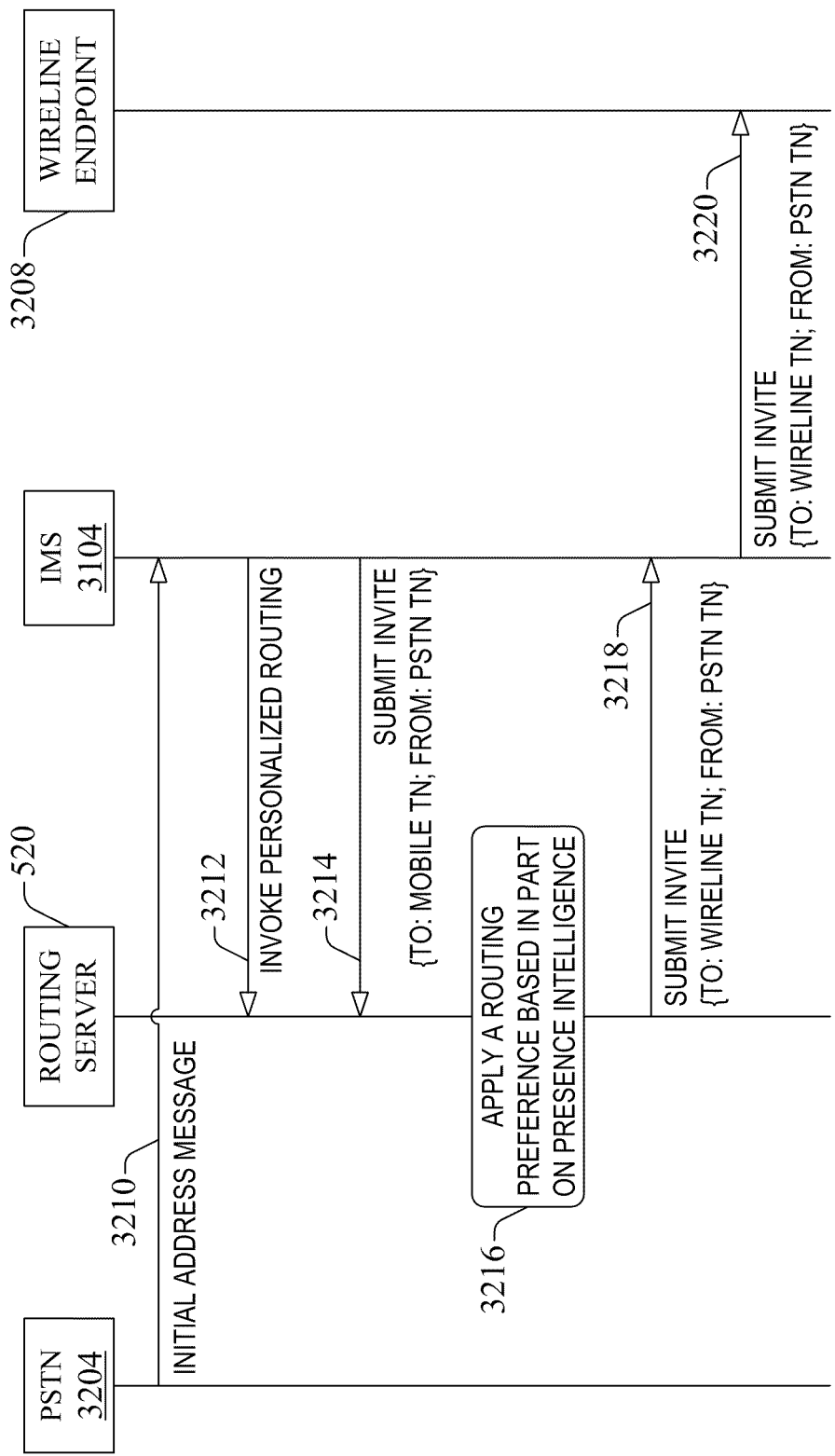
FIGS. 32A-32B illustrate call flows of example methods for directing a wireline incoming call based on customized call routing according to aspects described herein.
Figure 32B:
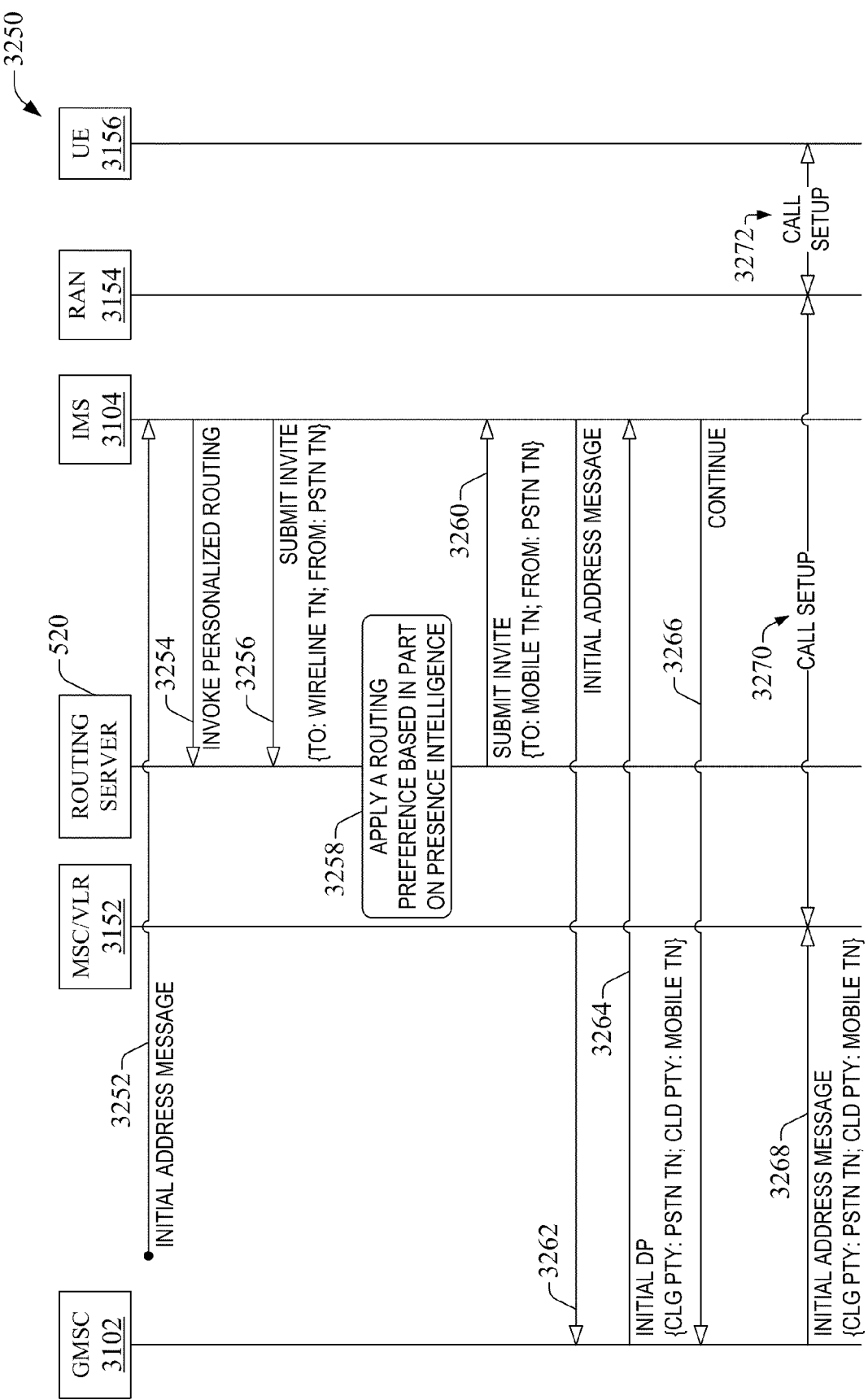

FIGS. 32A-32B illustrate call flows of example methods 3200 and 3250, respectively, for directing a wireline incoming call based on customized call routing according to aspects described herein. While the subject example method 3250 is illustrated for UMTS radio technology and makes reference to GMSC, MSC, VLR, or the like, the subject example method can be similarly implemented for other radio technologies, such as 3GPP LTE. With respect to example method 3200, at act 3204, one or more components of PSTN 3204 delivers an initial address message to IMS 3104, which invokes personalized routing at act 3212 and submits an INVITE message to routing server 520 at act 3214; the INVITE message includes references to destination address, e.g., mobile TN, and source address, PSTN TN. IMS 3104 can invoke personalized routing by delivering an directive in accordance with an IMS TAS trigger point or filter rule. At act 3216, routing server 520 applies a routing preference based in part on presence intelligence; as described supra, presence intelligence discloses registration status of a mobile device associated with the mobile TN on a confined-area AP owned or leased by a subscriber that owns or leases the mobile device or by a third party. Accordingly, the presence intelligence not only can disclose if the mobile device is "In Premises" or "Not In Premises", but it can convey a discriminator that denotes if the mobile device is "At Home" or "At Party_name Home", for example. In an aspect, as a result of applying the routing preference, routing server 520 submits an INVITE message to IMS 3104. The INVITE message includes a reference to a disparate destination address, wireline TN, arising from applying the routing preference, and a reference to source address, PSTN TN. To set up the incoming call, at act 3220, IMS 3104 relays the INVITE message to wireline endpoint 3208 identified by the disparate destination address in the INVITE message.

In example method 3250, at act 3252 an initial address message is delivered to IMS 3104 by one or more components within PSTN 3204 (not shown; represented with a solid circle in the drawing). In response, at act 3256, IMS 3104 invokes personalized routing and delivers an INVITE message to routing server 520 at act 3256; the INVITE message includes references to destination address (wireline TN) and source address (PSTN TN). At act 3258, the applies a routing preference based in part on presence intelligence. Similarly to act 3216, presence intelligence discloses registration status of a mobile device associated with the mobile TN on a confined-area AP owned or leased by a subscriber that owns or leases the mobile device or by a third party. Accordingly, the presence intelligence not only can disclose if the mobile device is "In Premises" or "Not In Premises", but it can convey a discriminator that denotes if the mobile device is "At Home" or "At Party_name Home", for example. In an aspect, in the illustrated scenario, a routing destination address is a mobile device address (mobile TN), and customized routing server 520 submits, at act 3260, an INVITE message to IMS 3104 with references to mobile TN as destination address and PSTN TN as source address. In response to the received INVITE message and since the destination address is a mobile device address, IMS 3104 delivers an initial address message to GMSC 3102 at act 3262. After the initial address message is received, at act 3264, GMSC 3102 conveys an initial DP message with references to PSTN TN as the calling party and mobile TN as the called party. IMS 3104 recognizes the destination address as the wireless device address and conveys a CONTINUE message to GMSC 3102 to proceed with call session establishment towards the wireless device.

Subsequent to routing validation (not shown), GMSC 3102 responds, at act 3268, by delivering an initial address message with references to PSTN TN as calling party and mobile TN as called party to MSC/VLR 3152. It should be appreciated that in one or more embodiments such initial address message can be delivered to a MM component determined by a specific radio technology utilized to establish wireless call session(s). In one or more acts 3270, MSC/VLR 3152 exchanges a set messages for call set up with one or more components of RAN 3154. Likewise, in one or more acts 3272, the one or more components of the RAN 3154 exchanges messages for call setup with UE 3156. As discussed supra, packet-based network platforms other than IMSs can provide the functionality described herein and administer telecommunication services as part of the subject customized call routing. Other protocols for session initiation, such as H.323, also can be employed.

Figure 33:
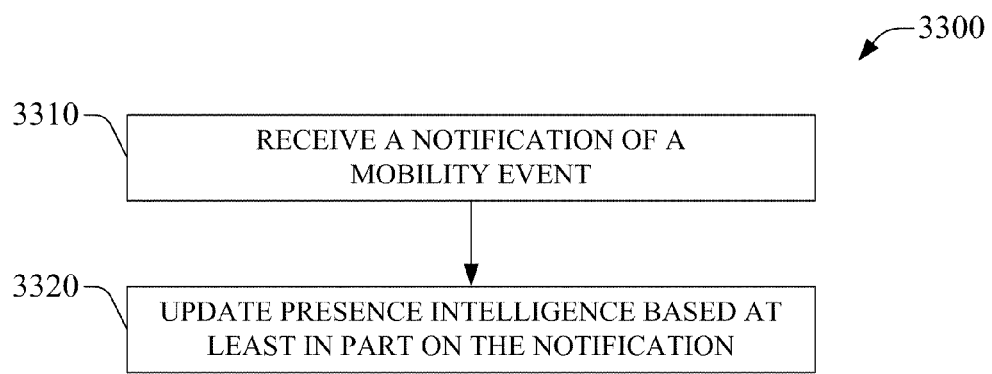
FIG. 33 is a flowchart of an example method for generating presence intelligence according to aspects described herein.

FIG. 33 is a flowchart of an example method 3300 for generating presence intelligence according to aspects described herein. A presence server (e.g., 540) can effect the subject example method, by executing code instructions that implement the acts that are part of the subject example method. In an aspect, one or more processors that are part of the presence server can execute the code instructions, which can be retained in a memory that is functionally coupled to or a part of the presence server. Alternatively or additionally, in scenarios in which the presence server is embodied in one or more sets of code instructions stored in a memory, at least one processor that executes the presence server, or the one or more sets of code instructions, can enact the subject example method 3300.

At act 3310, a notification of a mobility event is received. The mobility event includes attachment towards either a macrocell base station or a femtocell AP, and the notification can include information that characterizes the location of the macrocell base station or the femtocell AP. Receiving the notification can include receiving a notification message, or message, according to a peer-to-peer communication protocol, as described supra.

At act 3320, presence intelligence based at least in part on the notification is updated. In an aspect, updating the presence intelligence includes creating or modifying at least one record in a presence intelligence database or memory element.

Figure 34:
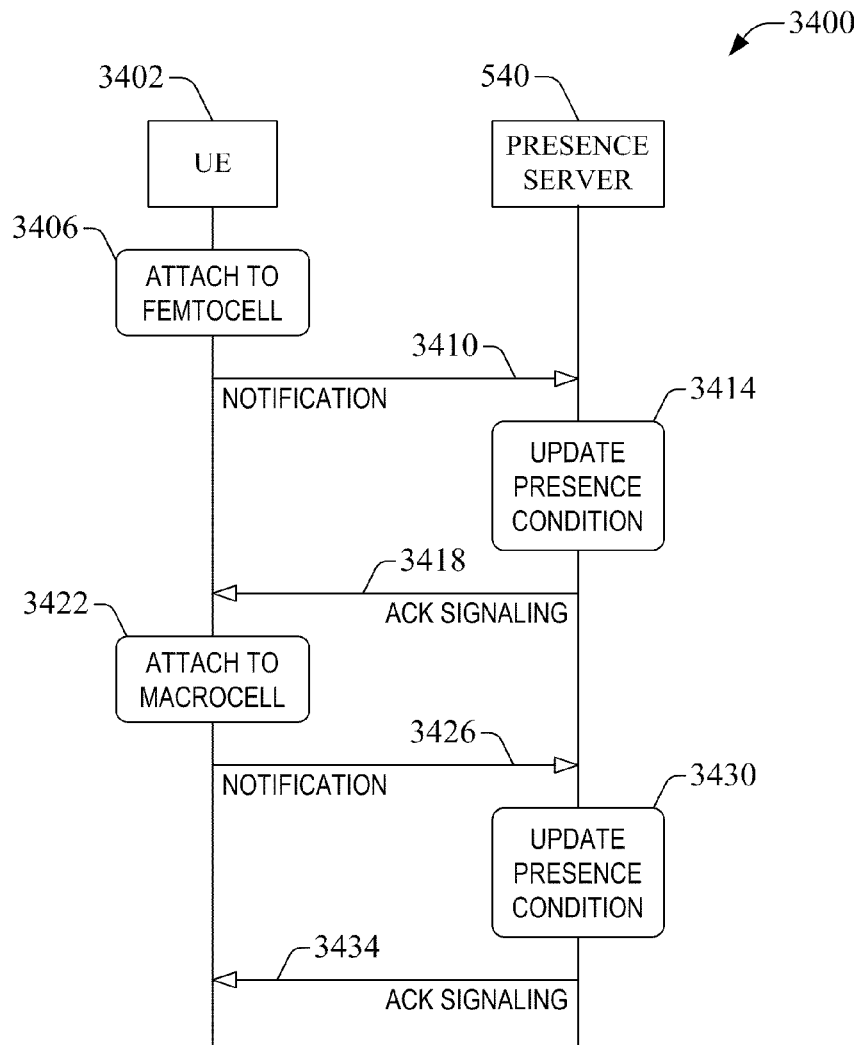
FIG. 34 is a call flow, or interaction diagram, of a method for generating presence intelligence according with aspects described herein.
Figure 35:
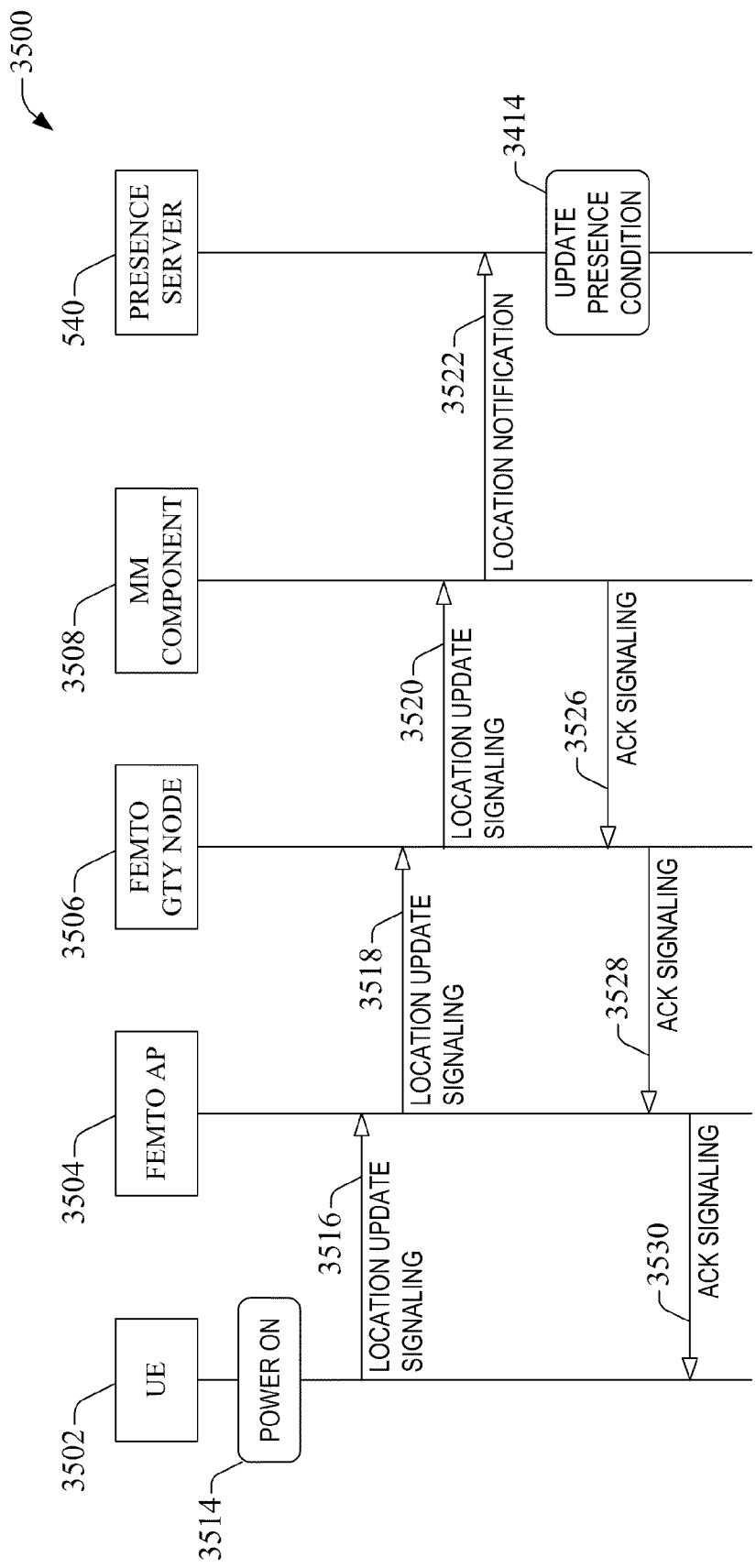
FIGS. 35-38 illustrate various call flows of example methods for updating presence intelligence according to aspects of the subject disclosure.
Figure 36:
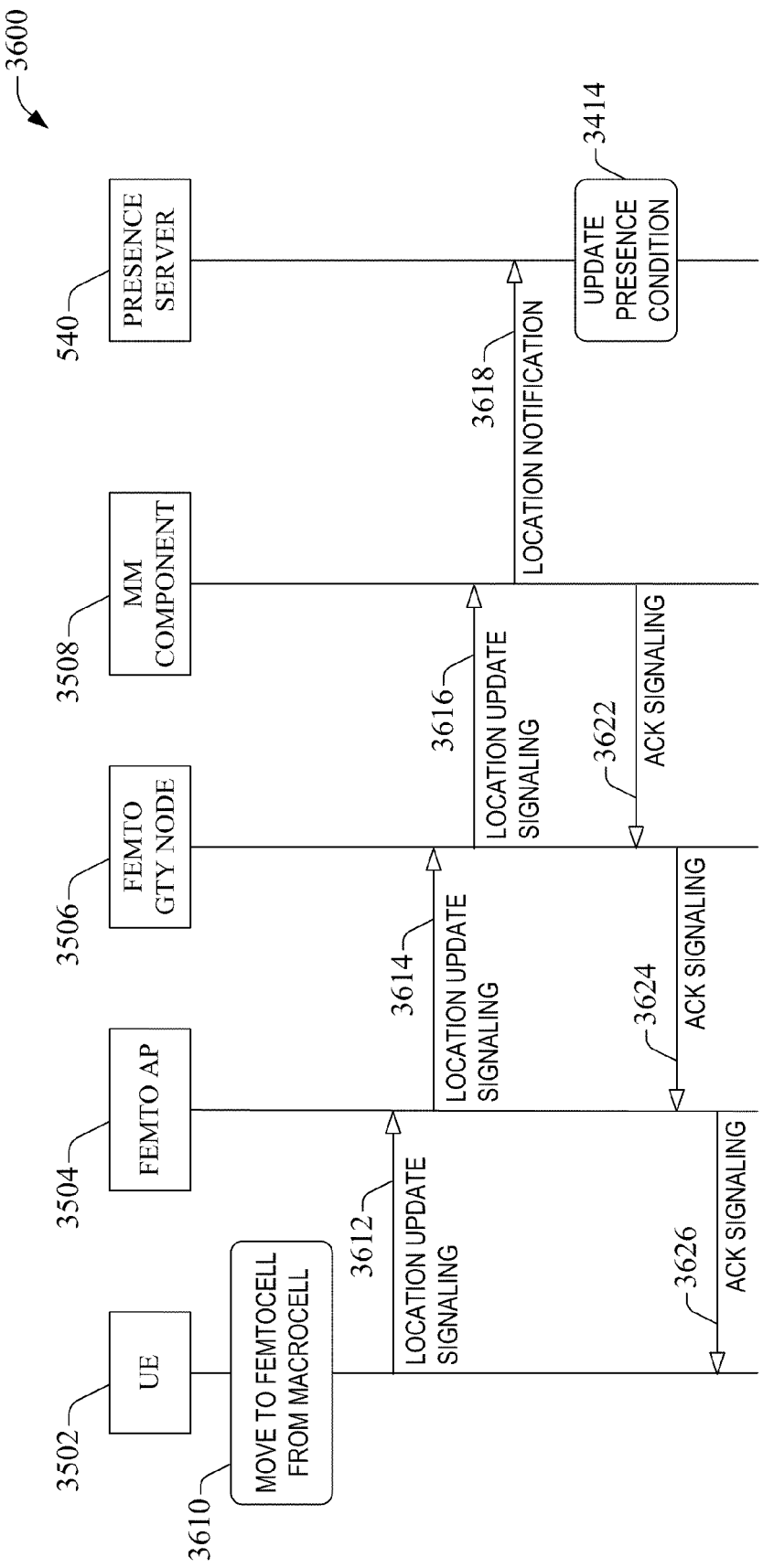
Figure 37:
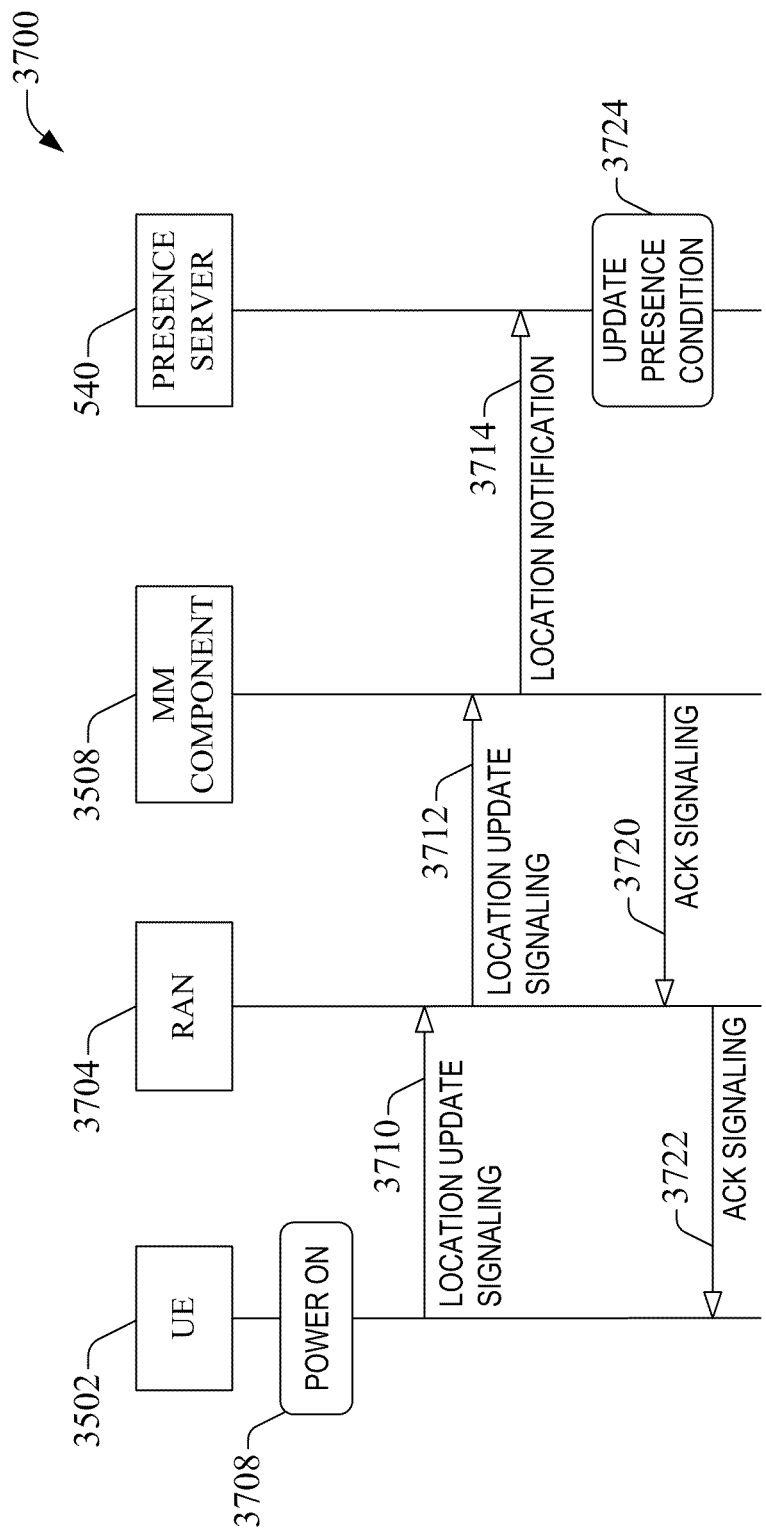
Figure 38:
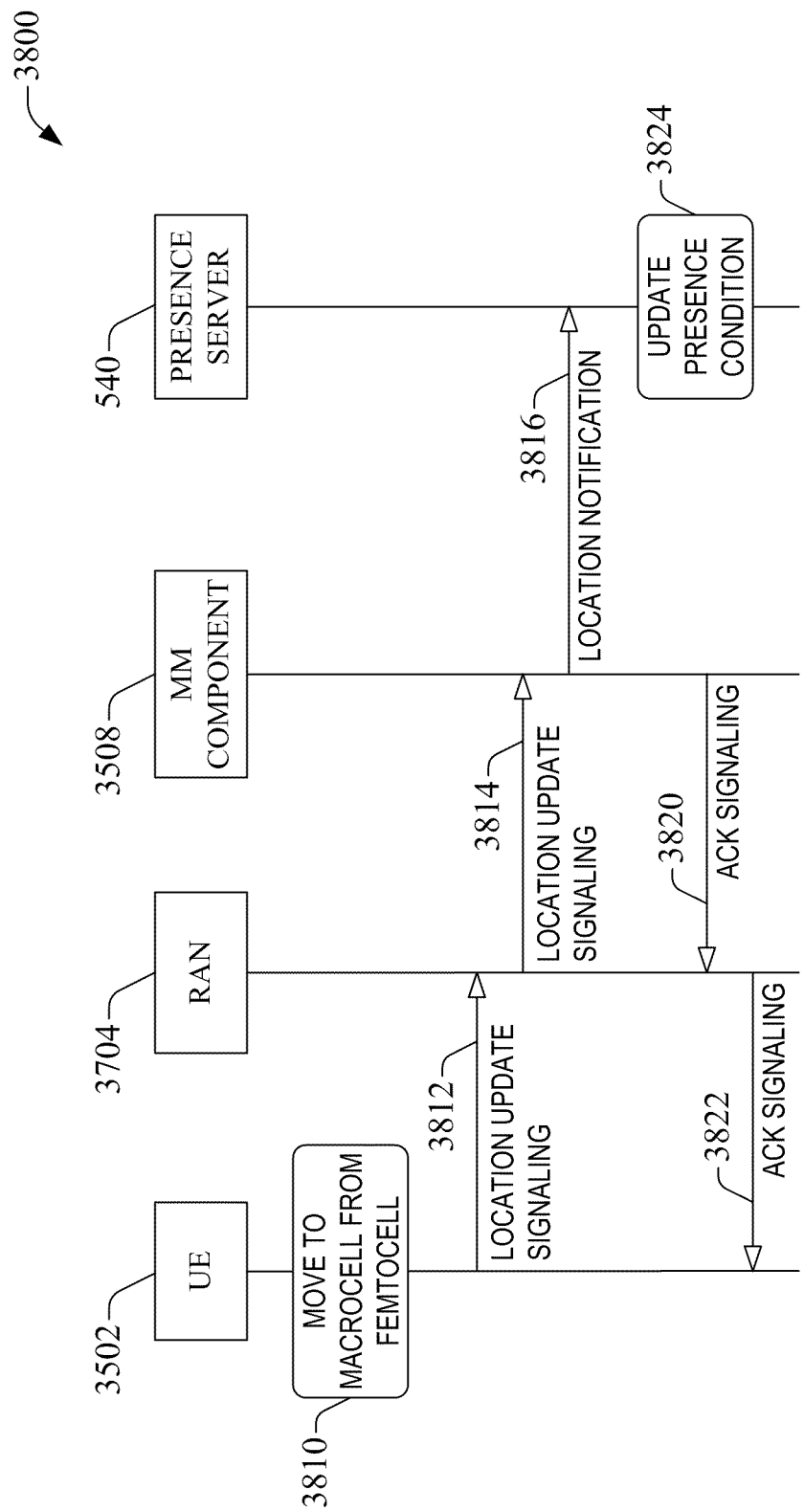

FIG. 34 is a call flow, or interaction diagram, of a method 3400 for generating presence intelligence according with aspects described herein. In the subject example method, UE (e.g., 2600) exchanges information, such as signaling and related payload data, with a presence server (e.g., 540) based on a mobility event; the presence server can be a core network component, as described supra, that manages (e.g., creates, modifies) subscriber femtocell presence intelligence. In addition, in an aspect, the information exchanged amongst the UE and the presence server can be based, in part, on one or more packet based (e.g., IP based) peer-to-peer signaling mechanism or protocol. The UE in the subject example method 3400 can embody any mobile device described or referred to herein.

At act 3406, user equipment 3402 attaches to a femtocell access point or any other type of confined-coverage AP,and delivers, at act 3410, a notification of the attachment to presence server 540. As indicated supra, the notification can be delivered according to a proprietary data delivery protocol or one or more standardized data delivery protocol, such as XDMS, XCAP, HTTP, or the like. In an aspect, UE 3402 can deliver the notification via a presence client component (e.g., 2625) described herein or a processor that executes the presence client component and resides within the UE 3402. At act 3414, the presence server 540 updates a presence condition, which can be retained in a presence record (e.g., a logical flag, a database entry) stored in a memory (e.g., presence intelligence store 534) accessible to the presence server 540. The presence record, or presence condition record, discloses attachment status of the UE 3402 to the confined-coverage AP owned or leased by a subscriber that owns or leases UE 3402 or by a third party. Accordingly, the presence record not only can disclose if UE 3402 is "In Premises" or "Not In Premises", but it can convey a discriminator that denotes if the mobile device is "At Home" or "At Party_name Home", for example. After the update is completed (e.g., upon completion, substantially upon completion, or after a predetermined period subsequent to completion), presence server 540 delivers acknowledgement signaling 3418 to UE 3402.

At act 3422, the UE 3402 attaches to a macrocell base station and delivers, at act 3426, a notification of attachment to presence server 540. Attachment to the macrocell base station can arise as a result of UE 3402 moving outside the area of coverage afforded by the femtocell AP. In response, the presence server 540 updates the presence condition at act 3430. As described supra, after the update is completed (e.g., upon completion, substantially upon completion, or after a predetermined period subsequent to completion), presence server 540 delivers acknowledgement (ACK) signaling 3434 to UE 3402.

FIGS. 35-38 illustrate various call flows of example methods 3500-3800 for updating presence intelligence according to aspects of the subject disclosure. The subject example methods 3500-3800 are particular illustrations of example method 3400. Various components in one or more telecommunication network platforms (e.g., 108 or 109) exchange one or more messages as part of notification and acknowledgement discussed supra. Messages in example methods 3500-3800 can be delivered according to a proprietary data delivery protocol or one or more standardized data delivery protocol, such as XDMS, XCAP, HTTP, or the like.

Example method 3500 can be implemented in a scenario a mobile device (e.g., UE 2600) attaches to, or registers in, a femtocell upon powering on. At act 3514, UE 3502 powers on within area of coverage of femtocell AP 3504, and delivers location update signaling thereto at act 3516. The location update signaling is specific to the radio technology utilized by the femtocell AP; e.g., in UMTS-based technology, attachment signaling can include location area update (LAU) or routing area update (RAU). Since UE 3502 powers on, the location update signaling can include an IMSI attach request; the updated location can be area information. Femtocell AP 3504 relays, at act 3518, the location update signaling to femtocell gateway (GTY) node 3506, which conveys, at act 3520, the location update signaling to mobility management (MM) component 3508. In turn, at act 3522, MM component 3508 delivers a location notification to presence server 540. It should be appreciated that MM component 3508 can be specific to the radio technology implemented for telecommunication through macro network platform; for instance, in 3GPP LTE networks, MM component 3508 can be embodied in a mobility management entity (MME), whereas in the 3GPP UMTS network, MM component 3508 can be embodied in a MSC. In an aspect, acts 3506 through 3512 embody notification act 3410; the location notification embodies notification of attachment delivered in act 3410. At act 3414, presence server 540 updates presence condition, or presence intelligence, for UE 3502 by creating or modifying values of a presence flag to "In Premises", with a suitable discriminator (e.g., "At Home", "Own", etc., or "3P", "Party Name", etc.,) which characterizes the femtocell AP 3504. While the subject example method 3500 is illustrated for a femtocell AP and related access network element(s), the subject example method 3500 can be advantageously exploited for other types of confined-coverage access points (Wi-Fi AP, picocell AP, etc.).

At act 3516, MM component 540 delivers ACK signaling to femtocell GTY node 3506, which relays, at act 3518, the ACK signaling to femtocell AP 3504. At act 3520, the femtocell AP 3504 conveys the ACK signaling to UE 3502. It is noted that the order of acts 3522 and 3526 can be reversed without affecting the functionality provided by the subject example method. In addition, in one or more additional or alternative embodiments, presence server 540 can receive the location notification from femtocell GTY 3506; in such embodiments, the presence server 540 can be embodied in one or more servers within a femtocell network platform (e.g., 109).

Example method 3600 can be implemented in a scenario a mobile device attaches to a femtocell AP as a result of a mobility event that leads the mobile device into the coverage area of the femtocell AP. At act 3610, UE 3502 moves from femtocell to macrocell and, at act 3612, delivers location update signaling to femtocell AP 3504, which relays, at act 3614, the location update signaling to femtocell gateway node 3506. As indicated supra, the location update signaling is specific to the radio technology utilized by the femtocell AP; e.g., in UMTS-based technology, attachment signaling can include location area update (LAU) or routing area update (RAU). Since UE 3502 moves into femtocell service coverage, the location update signaling can include LAU request. In turn, the femtocell GTY node 3506 delivers, at act 3616, the location update signaling to MM component 3508, which conveys, at act 3618, a location notification to presence server 540. In an aspect, acts 3506 through 3512 embody notification act 3410; the location notification embodies notification of attachment delivered in act 3410. In response to receiving (e.g., collecting and processing) the location notification, at act 3414, presence server 540 updates presence condition, or presence intelligence, for UE 3502 by creating or modifying a value of a presence flag to reflect "In Premises." In a scenario extrinsic forwarding service is enabled, "In Premises" value can be composite, including a field attribute that identifies femtocell AP 3504 as an "At Home" or "Own" femtocell AP. Similarly to example method 3500, while the subject example method 3600 is illustrated for a femtocell AP and related access network element(s), example method 3600 can be advantageously exploited for other types of confined-coverage access points (Wi-Fi AP, picocell AP, etc.)

In response to receiving (e.g., collecting and processing) the location update signaling, MM component 3508 delivers, at act 3622, ACK signaling to femtocell GTY node 3506, which transmits, at act 3624, the ACK signaling to femtocell AP 3504. In turn, femtocell AP 3504 delivers, at act 3626, the ACK signaling to UE 3502. In an aspect, acts 3526 through 3530 embody acknowledgement act 3418.

As discussed supra, it is noted that the order of acts 3618 and 3622 can be reversed without affecting the functionality provided by the subject example method. In addition, in one or more additional or alternative embodiments, presence server 540 can receive the location notification from femtocell GTY 3506; in such embodiments, the presence server 540 can be embodied in one or more servers within a femtocell network platform (e.g., 109).

Example method 3700 can be implemented in a scenario a mobile device powers on in an area of coverage of a macrocell base station and attaches thereto. At act 3708, UE 3702 powers on within area of coverage of a macrocell base station that is part of RAN 3704, and delivers location update signaling thereto at act 3516. The signaling is specific to the radio technology utilized by the femtocell AP; e.g., in UMTS-based technology, attachment signaling can include location area update (LAU) or routing area update (RAU). Since UE 3502 powers on, the location update signaling can include an IMSI attach request; the updated location can be area information. At act 3712, one or more components of the RAN 3704, e.g., the macrocell base station, delivers the location update signaling to MM component 3508. In turn, at act 3714, MM component 3508 delivers a location notification to presence server 540. In an aspect, acts 3710-3514 embody notification act 3410; the location notification embodies notification of attachment delivered in act 3410. In response to receiving (e.g., collecting and processing) the location notification, at act 3724, presence server 540 updates presence condition, or presence intelligence; the update performed as described hereinbefore.

At act 3720, MM component 540 delivers ACK signaling to one or more components of RAN 3704, e.g., the macrocell base station, which relay the ACK signaling to UE 3702 at act 3722. In an aspect, acts 3720 and 3722 embody acknowledgement act 3418. As discussed supra, the order of acts 3714 and 3720 can be reversed without affecting the functionality provided by the subject example method.

Example method 3800 for updating presence intelligence according to aspects of the subject innovation. The subject example method can be implemented in a scenario a mobile device attaches to a macrocell base station as a result of a mobility event that leads the mobile device into the coverage area of the macrocell base station. At act 3810, UE 3502 moves to macrocell from femtocell and, at act 3812, delivers location update signaling to one or more component of RAN 3704, e.g., the macrocell base station, which relays, at act 3814, the location update signaling to MM component 3508. The signaling is specific to the radio technology utilized by the femtocell AP; e.g., in UMTS-based technology, attachment signaling can include location area update (LAU) or routing area update (RAU). In turn, MM component 3508 conveys, at act 3816, a location notification to presence server 540. In an aspect, acts 3812 through 3816 embody notification act 3410; the location notification embodies notification of attachment delivered in act 3410. In response to receiving (e.g., collecting and processing) the location notification, at act 3824, presence server 540 updates presence condition, or presence intelligence, for UE 3502; the update is conducted as described supra.

In response to receiving (e.g., collecting and processing) the location update signaling, MM component 3806 delivers, at act 3820, ACK signaling to one or more components of RAN 3804, e.g., the base station, which transmits, at act 3822, the ACK signaling to the UE 3802. In an aspect, acts 3820 and 3822 embody acknowledgement act 3418. As discussed supra, it is noted that the order of acts 3816 and 3820 can be reversed without affecting the functionality provided by the subject example method.

Figure 39:
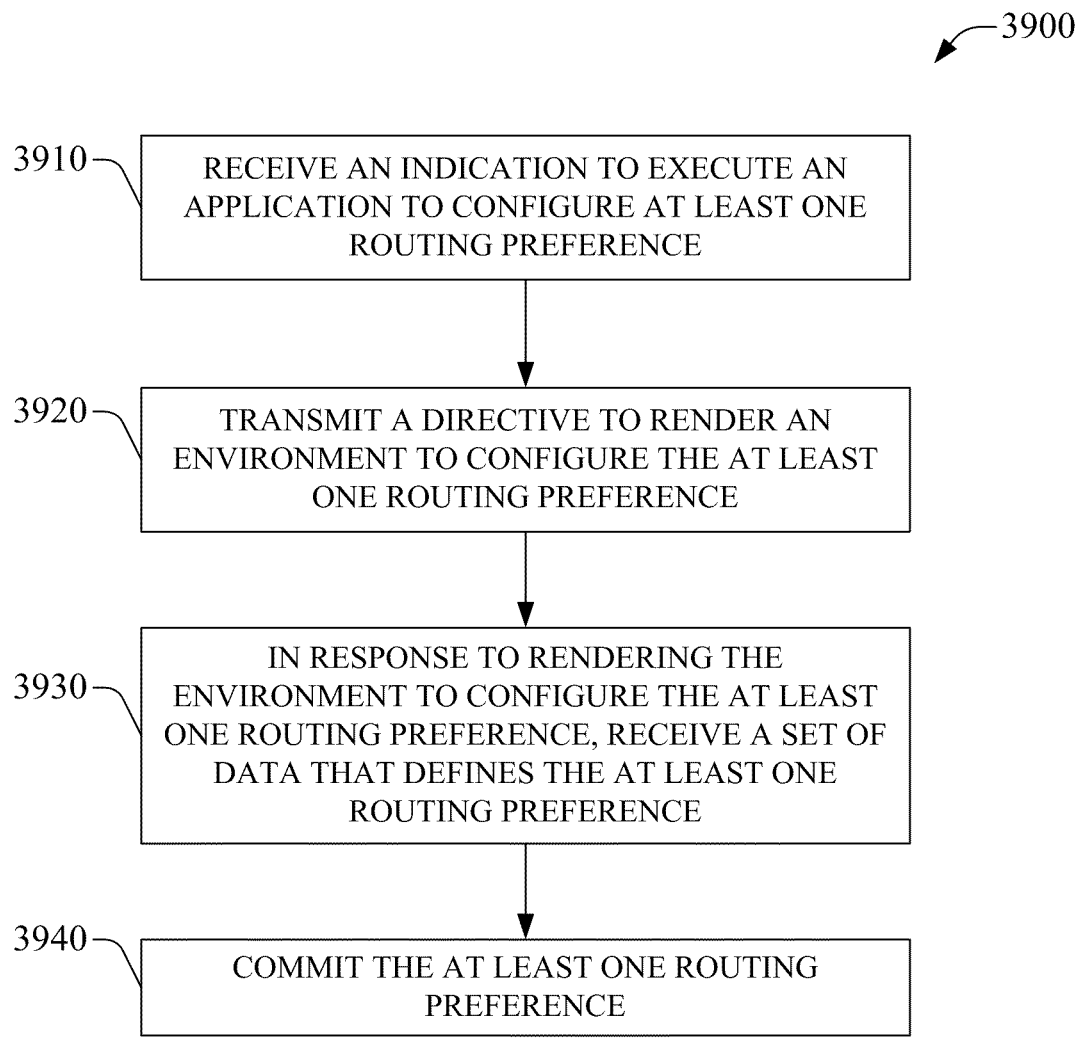
FIG. 39 is a flowchart of an example method for configuring a set of routing preferences according to aspects described herein.

FIG. 39 is a flowchart of an example method 3900 for configuring a set of routing preferences according to aspects described herein. In an aspect, a server (e.g., customization server 460) or one or more component(s) therein can implement, at least in part, the subject example method. In another aspect, one or more processors configured to enable or that enable at least part of the functionality to the server (e.g., customization server 460) also can enact, at least in part, the subject example method. In yet another aspect, in scenarios in which the server or the one or more component(s) therein are embodied in one or more sets of code instructions stored in a memory, at least one processor that executes the one or more sets of code instructions that embody the server or the one or more component(s) therein can enact the subject example method.

At act 3910, an indication to configure at least one routing preference is received. Receiving the indication can include receiving an instruction to execute an application, e.g., a software application or a firmware application. At act 3920, a directive to render an environment to configure the at least one routing preference is transmitted as a result, in part, of executing the application. At act 3930, a set of input data that defines the at least one routing preference is received. At act 3940, the at least one routing preference is committed. In an aspect, committing the at least one routing preference includes storing the at least one routing preference in one or more memories (removable or affixed) accessible by component(s) or processor(s) that enact the subject example method or other methods described herein. For instance, the at least one routing preference can be retained in routing preference storage 558 within memory 550.

Figure 40:
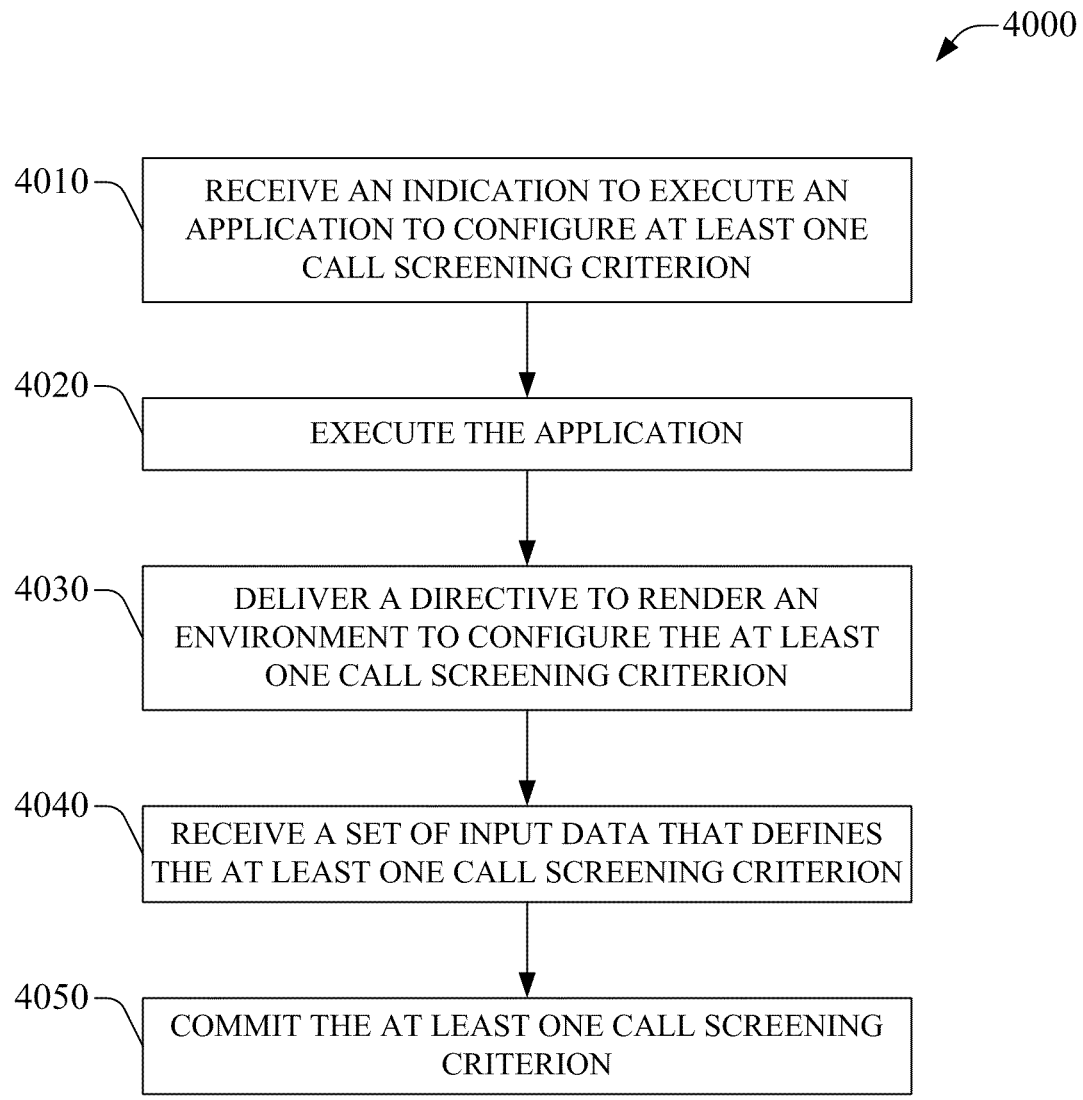
FIG. 40 displays a flowchart of an example method for defining one or more call screening criteria for customized call processing and routing according to aspects described herein.

FIG. 40 displays a flowchart of an example method 4000 for defining one or more call screening criteria for customized call processing and routing according to aspects described herein. In an aspect, a mobile device (e.g., UE 2602), or one or more components therein, can implement, at least in part, the subject example method. In another aspect, customer premise equipment, such as a personal computer or a femtocell AP, or one or more components therein, can implement, at least in part, the subject example method. In yet another aspect, a network-based component, such as customization server or configuration component, also can effect the subject example method. In still another aspect, one or more processors that enable, at least in part, functionality of the mobile device, the customer premise equipment, or the customization server, also can implement the subject example method.

At act 4010, an indication to execute an application to configure at least one call screening criterion is received. At act 4020, the application is executed. At act 4030, a directive to render an environment to configure the at least one call screening criterion is delivered. At act 4040, a set of input data that defines the at least one call screening criterion is received. At act 4050, the at least one call screening criterion is committed. Similarly to committing a routing preference, in an aspect, committing the at least one call screening criterion includes storing the at least one call screening criterion in one or more memories (removable or affixed), such as screening data storage 1740 within memory 550.

Figure 41:
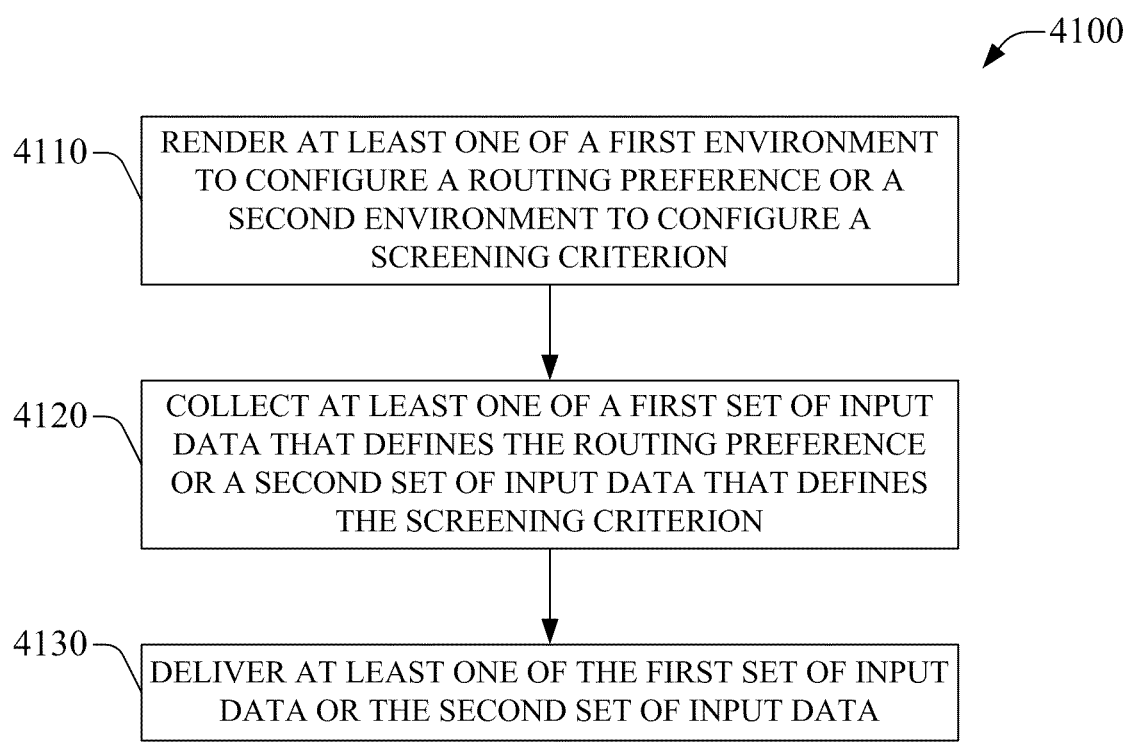
FIG. 41 is a flowchart of an example method for collecting information to configure routing preference(s) or one or more screening criteria according to aspects described herein.

FIG. 41 is a flowchart of an example method 4100 for collecting information to configure routing preference(s) or one or more screening criteria according to aspects described herein. In an aspect, a mobile device (e.g., UE 2602), or one or more components therein, can implement, at least in part, the subject example method. In another aspect, customer premise equipment, such as a personal computer or a femtocell AP, or one or more components therein, can implement, at least in part, the subject example method. In yet another aspect, a network-based component, such as customization server 560 or configuration component 820, also can effect the subject example method. In still another aspect, one or more processors that enable, at least in part, functionality of the mobile device, the customer premise equipment, or the customization server 560, also can implement the subject example method.

At act 4110, at least one of a first environment to configure a routing preference or a second environment to configure a screening criterion is rendered; it should be appreciated that in one or more scenarios, both the first and second environments can be rendered concurrently. In alternative or additional scenario(s), the first and second environment can be rendered in sequence. At act 4120, at least one of a first set of input data that defines the routing preference or a second set of input data that defines the screening criterion is collected. At act 4130, at least one of the first set of input data or the second set of input data are delivered.

Figure 42:
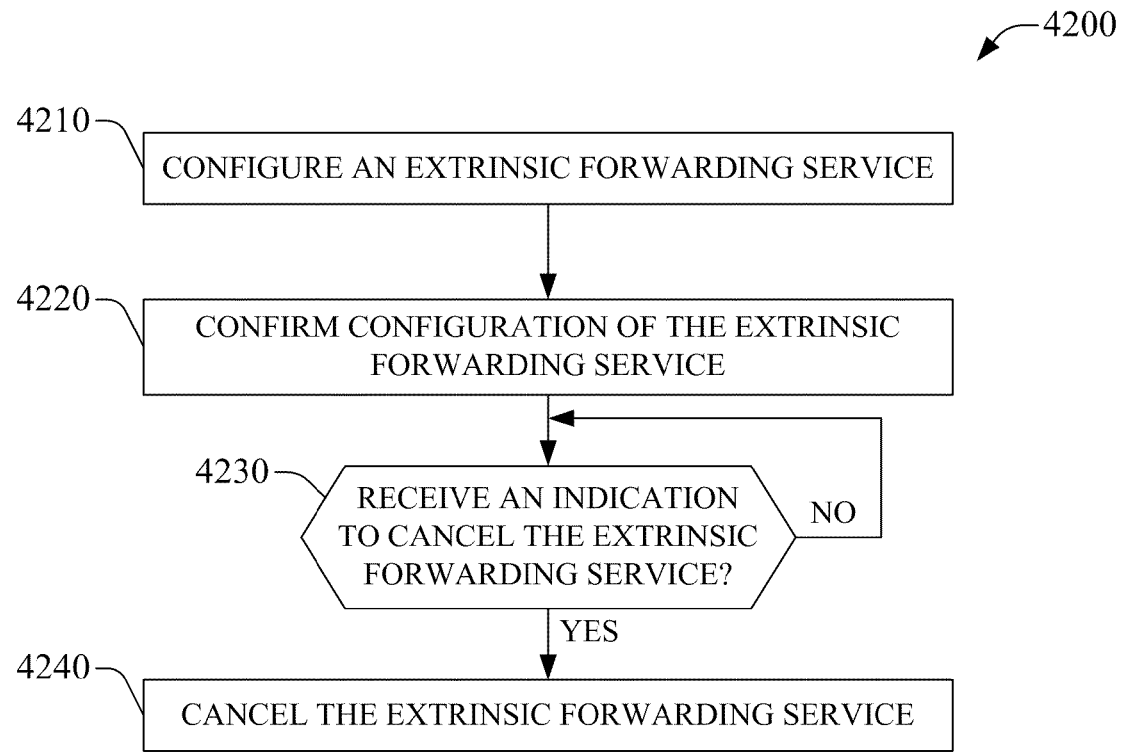
FIG. 42 is a flowchart of an example method for managing operation of an extrinsic forwarding service according to aspects described herein.

FIG. 42 is a flowchart of an example method 4200 for managing operation of an extrinsic forwarding service according to aspects described herein. In an aspect, a mobile device (e.g., UE 2602), or one or more components therein, can implement, at least in part, the subject example method. In another aspect, customer premise equipment, such as a personal computer or a femtocell AP, or one or more components therein, can implement, at least in part, the subject example method. In yet another aspect, a network-based component, such as provisioning component 1510 or configuration component 820, also can effect the subject example method. In still another aspect, one or more processors that enable, at least in part, functionality of the mobile device, the customer premise equipment, or the provisioning component 1510, also can implement the subject example method. In a further aspect, in certain embodiments in which the provisioning component 1510 or the configuration component 820 are embodied in one or more set of code instructions, the one or more processors can execute the one or more sets of code instructions to implement the subject example method 4200. At act 4210, an extrinsic forwarding service is configured. Configuring the extrinsic forwarding service occurs in response to accepting a prompt for activation of the extrinsic forwarding service. Configuring the extrinsic forwarding service can include selecting at least one femtocell AP and establishing at least one routing preference for scenarios in which presence condition is "In Party Name Premises." At act 4220, configuration of an extrinsic forwarding service is confirmed. In an aspect, the confirming can include receiving an indication that routing an incoming call to a device, wireless or otherwise, that operates in the coverage area of a 3P confined-coverage AP is agreed upon. At act 4230, it is probed if an indication to cancel the extrinsic forwarding service is received. In an aspect, the probing can be performed periodically, at a rate f (where f is a real number), or according to a schedule (e.g., at predetermined time intervals). If the probing reveals the indication to cancel the extrinsic forwarding service is not received, the flow is redirected to act 4230 and further probing is conducted, either periodically or according to the schedule. If the probing reveals such indication is received, the extrinsic forwarding service is cancelled at act 4240. In an aspect, cancelling the extrinsic forwarding service includes deleting a service record that discloses availability of the extrinsic forwarding service, such deleting can deactivate routing of an incoming call through extrinsic driver within customized routing server. In addition, billing server(s), AAA server(s), or related databases can be updated to reflect cancellation of the extrinsic forwarding service.

Figure 43:
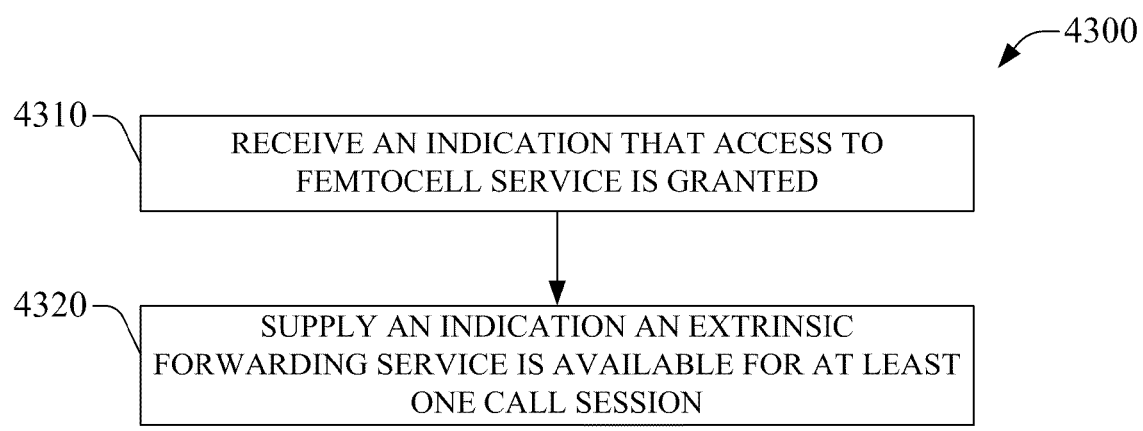
FIG. 43 represents a flowchart of an example method for disclosing an extrinsic forwarding service is enabled according to aspects of the subject disclosure.

FIG. 43 represents a flowchart of an example method 4300 for disclosing an extrinsic forwarding service is enabled according to aspects of the subject disclosure. A provisioning component (e.g., 1510), or component(s) therein, can implement the subject example method in accordance with various aspects related to example method 4200. At act 4310, an indication that access to femtocell service is granted is received. Receiving the indication can be a result of configuring (e.g., creating or updating) an access control list. At act 4320, an indication an extrinsic forwarding service is available for at least one call session is supplied. In an aspect, supplying the indication includes delivering a message (e.g., voice message, SMS message, MMS message, etc.) directed to equipment associated with the mobile device that is granted femtocell service.

Figure 44:
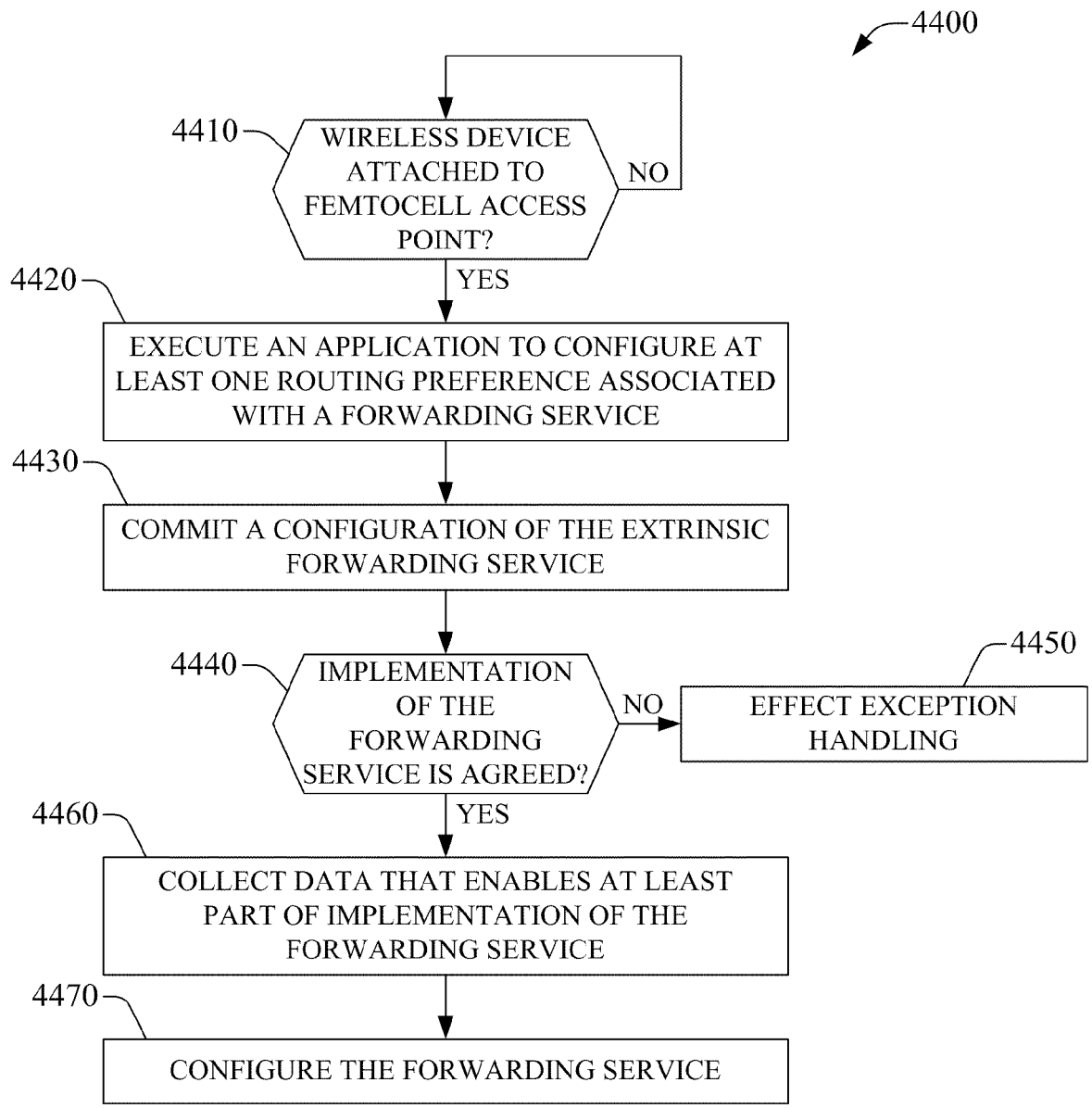
FIG. 44 is a flowchart of an example method for establishing an extrinsic forwarding service according to aspects described herein.

FIG. 44 is a flowchart of an example method 4400 for establishing an extrinsic forwarding service according to aspects described herein. The subject example method can be implemented by at least a provisioning component (e.g., 1510) in accordance with aspects described in connection with example method 4200. At act 4410, it is determined if a wireless device is attached to a femtocell AP. In the negative case, the subject act is reiterated, but in the affirmative case, an application (a software application or a firmware application) to configure at least one routing preference associated with a forwarding service is executed at act 4420. At act 4430, a configuration of the extrinsic forwarding service is committed. In an aspect, committing the at least one routing preference includes storing the at least one routing preference in one or more memories (removable or affixed) accessible by component(s) or processor(s) that enact the subject example method or other methods described herein. For instance, the at least one routing preference can be retained in routing preference(s) storage 1730 within memory 550. Acts 4420 and 4430 can allow establishing at least one routing preference associated with the forwarding service.

At act 4440, it is determined if implementation of the forwarding service is agreed. In the negative case, exception handling is effected at act 4450. At act 4460, data than enables at least part of the implementation of the forwarding service is collected. The data can include the femtocell ID, name of owner or lessee of the femtocell AP, one or more codes or tokens that identify a set of devices, wireless or wireline, that operate in a confined area served by the femtocell ID. At act 4470, the forwarding service is configured. In an aspect, configuring the forwarding service can include generating and storing at least one of trigger point in a CAMEL server or associated register or a filter rule in a server in a PS-based network node (e.g., an AS in an IMS core network). In one or more embodiments, broker component 1514 can effect the subject act.

Figure 45:
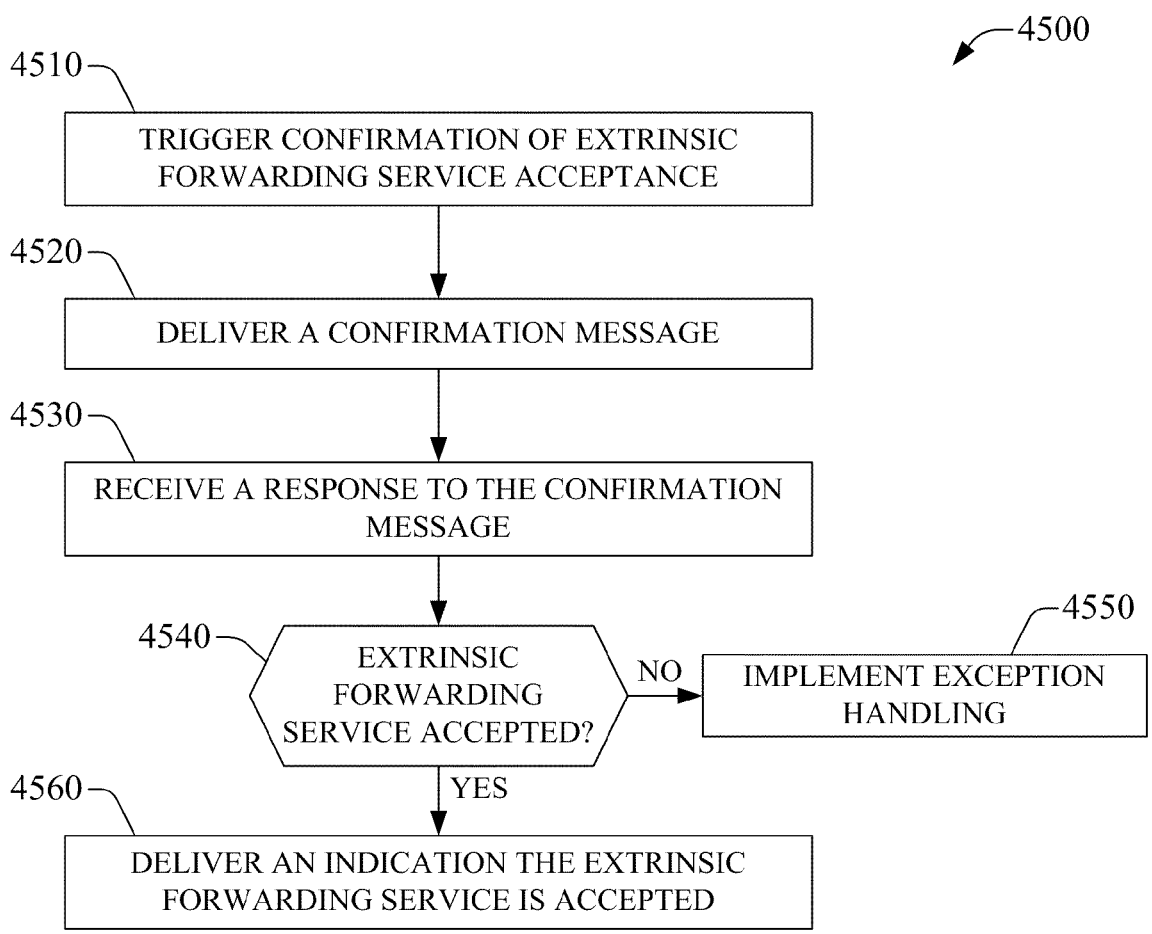
FIG. 45 presents a flowchart of an example method for determining if implementation of an extrinsic forwarding service is agreed according to aspects described in the subject disclosure.

FIG. 45 presents a flowchart of an example method 4500 for determining if implementation of an extrinsic forwarding service is agreed according to aspects described in the subject disclosure. Component(s) or other functional elements that implement example method 4400 also can implement the subject example method. At act 4510, confirmation of extrinsic forwarding service acceptance is triggered. The triggering includes delivering a directive to render a prompt to accept or decline extrinsic forwarding service. At act 4520, a confirmation message is delivered. Acts 4510 and 4520 can be a realization of supplying a message to confirm acceptance of the extrinsic forwarding service. At act 4530, a response to the confirmation message is received. At act 4540, it is determined if the extrinsic forwarding service is accepted based on the response to the confirmation message. In the negative case, exception handling is implemented at act 4550. In the affirmative case, at act 4560, an indication the extrinsic forwarding service has been accepted is delivered.

Figure 46:
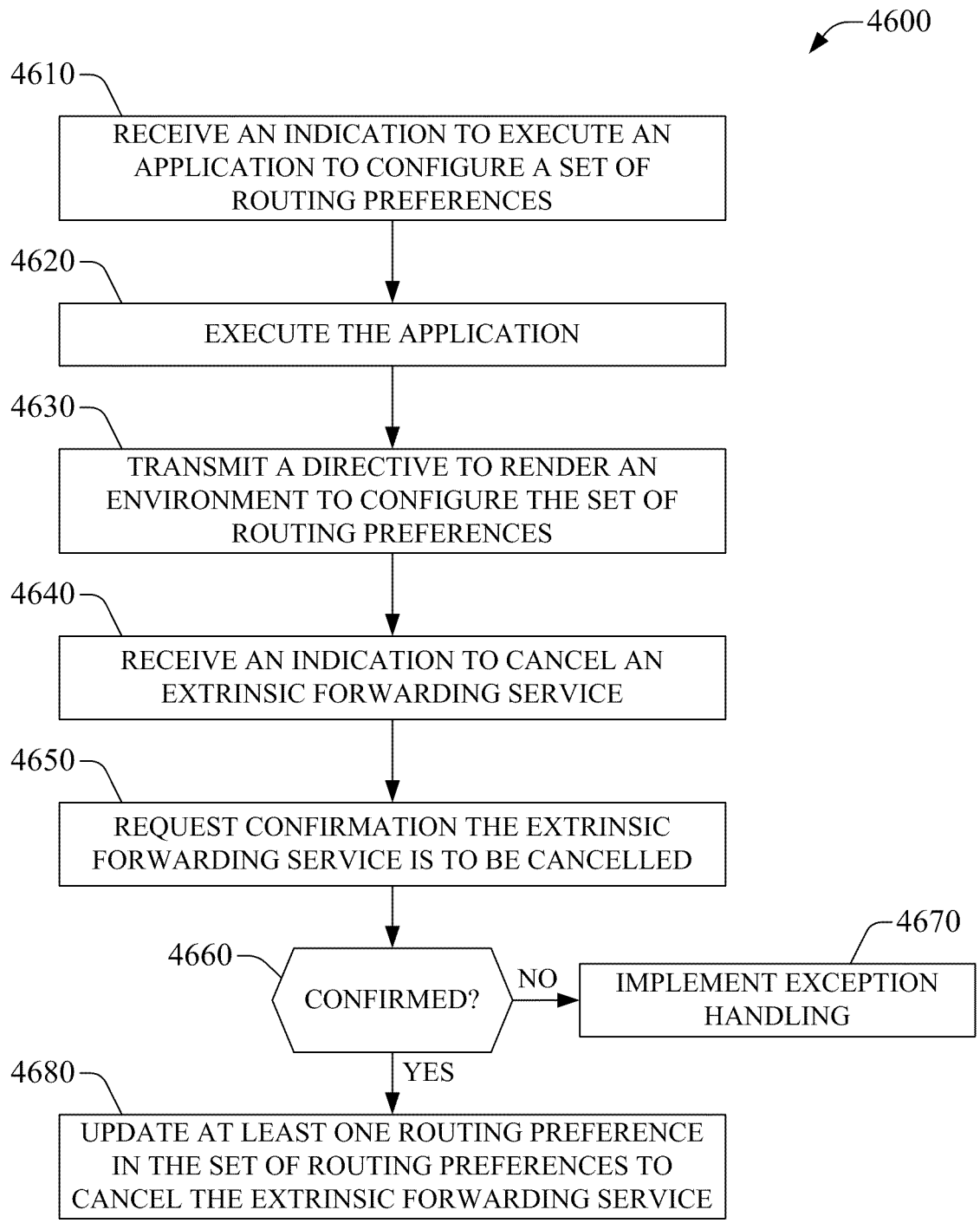
FIG. 46 displays a flowchart of an example method for defining at least one routing preference within an extrinsic forwarding service according to aspects described herein.

FIG. 46 displays a flowchart of an example method 4600 for defining at least one routing preference within an extrinsic forwarding service according to aspects described herein. Provisioning component can implement a portion of the subject example method. At act 4610, an indication to execute an application to configure a set of routing preferences is received. At act 4620, the application is executed. At act 4630, a directive to render an environment to configure the set of routing preferences is transmitted. At act 4640, an indication to cancel an extrinsic forwarding service is received. At act 4650, confirmation the extrinsic forwarding service is to be cancelled is requested. In a scenario, confirming cancellation of the extrinsic forwarding service can include rendering indicia to request confirmation of cancellation. At act 4660, it is probed if cancellation has been confirmed. In the negative case, exception handling is implemented at act 4670, whereas in the affirmative case, at act 4680, at least one routing preference in the set of routing preferences is updated to cancel the extrinsic forwarding service. Updating the at least one routing preference can include modifying an extrinsic service record stored in memory (e.g., 1530). In an aspect, acts 4640-4680 can be effected by a configuration component in response to at least one directive from a cancellation component, or one or more processors that provide, at least in part, its functionality.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification and annexed drawings, terms such as "store," "data store," "data storage," "database," "repository," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory elements described herein can be affixed, removable, or a combination thereof.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. In addition, various aspects disclosed in the subject specification can also be implemented through code instructions, or program modules, stored in a memory and executed by a processor, or other combination of hardware and software, or hardware and firmware. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disc (CD), digital versatile disc (DVD), blu-ray disc (BD) . . . ), smart cards, and flash memory devices (e.g., card, stick, key drive . . . ).

It should be appreciated that while various aspects, features, or advantages described herein have been illustrated through femtocell access point(s) and associated coverage, such aspects or features also can be exploited in confined-coverage access point(s) that provide wireless coverage through substantially any or any disparate telecommunication technologies, such as for example Wi-Fi (wireless fidelity) or picocell telecommunication. In addition, aspects, features, or advantages of the subject disclosure also can be exploited in macrocellular base station(s). Moreover, aspects, features, or advantages of the subject disclosure can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Furthermore, substantially all aspects of the subject disclosure can include legacy telecommunication technologies.

What has been described above includes examples of systems and methods that provide advantages of the subject disclosure. It is, of course, not possible to describe every conceivable combination of components or methodologies for purposes of describing the subject disclosure, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
    receiving, by a device comprising a processor, an indication to route an incoming call based on a presence condition of a mobile device in a confined-coverage area, wherein the mobile device is associated with a called device in the incoming call, and the presence condition of the mobile device in the confined-coverage area conveys registration of the mobile device with an access point device that serves the confined-coverage area;
    identifying, by the device, an entity associated with control of the access point device; and
    in response to the entity being determined to be a subscriber identity associated with the mobile device,
        acquiring, by the device, a first routing preference in a set of routing preferences associated with the called device, and
        routing, by the device, the incoming call according to the first routing preference; and
    in response to the entity being determined to be an identity different from the subscriber identity,
        acquiring, by the device, a second routing preference in the set of routing preferences associated with the called device, and
        routing, by the device, the incoming call according to the second routing preference.

2. The method of claim 1, wherein the routing the incoming call according to the second routing preference includes provisioning, by the device, a service to direct the incoming call to a wireline device in the confined-coverage area, and wherein the confined-coverage area is associated with the identity different from the subscriber identity.

3. The method of claim 1, further comprising:
applying, by the device, a screening rule to the incoming call prior to the routing using a filtering service comprising determining whether the incoming call is to be blocked.

4. The method of claim 2, wherein the provisioning includes:
receiving, by the device, an indication that access to wireless coverage through the access point device is granted; and
supplying, by the device, an indication the service is available for a call session.

5. The method of claim 2, wherein the provisioning includes:
determining, by the device, that the mobile device is attached to the access point device; and
establishing, by the device, a third routing preference associated with the service.

6. The method of claim 5, further comprising:
in response to receiving an instruction that implementation of the service is agreed upon, collecting, by the device, data that enables the service.

7. The method of claim 2, wherein the provisioning includes:
supplying, by the device, a message to confirm acceptance of the service;
receiving, by the device, a response to the message; and
delivering, by the device, an indication of acceptance responsive to the response indicating the service is accepted.

8. The method of claim 7, wherein the supplying includes delivering, by the device, a directive to render a prompt to accept the service.

9. The method of claim 2, further comprising:
receiving, by the device, an indication to cancel the service;
in response to the indication, rendering, by the device, a request to confirm cancellation of the service; and
updating, by the device, a third routing preference in the set of routing preferences to reflect the cancellation of the service.

10. The method of claim 2, further comprising:
rendering, by the device, an environment to construct a third routing preference for inclusion in the set of routing preferences, wherein the environment allows selecting the access point device associated with the identity different from the subscriber identity, selecting the wireline device, and selecting a ringtone for the wireline device.

11. The method of claim 3, further comprising:
rendering, by the device, an environment to configure the screening rule, wherein the environment allows defining a rule applicable to the incoming call based on a set of conditions.

12. A system, comprising:
a memory to store executable instructions; and
a processor, coupled to the memory, that facilitates execution of the executable instructions to perform operations, comprising:
acquiring a presence condition of a mobile device in a confined-coverage area served by an access point device, and a routing preference in accordance with the presence condition of the mobile device, wherein the presence condition of the mobile device conveys a registration status with the access point device;
directing, based on the routing preference and the presence condition of the mobile device, an incoming call associated with the mobile device to a first set of devices in response to the confined-coverage area being determined to be a home area; and
directing, based on the routing preference and the presence condition of the mobile device, the incoming call to a second set of devices in response to the confined-coverage area being determined to be a visited area.

13. The system of claim 12, wherein the visited area is served by an access point device associated with an identity different from a subscriber identity associated with the mobile device, and the first set of devices comprises the mobile device.

14. The system of claim 12, wherein the operations for directing the incoming call to the second set of devices in response to the confined-coverage area being determined to be a visited area includes operations for provisioning a service.

15. The system of claim 14, wherein the operations further comprise supplying data to enable the provisioning the service based on an update of an access control data structure that regulates registration with the access point device.

16. The system of claim 15, wherein the operations further comprise directing the incoming call with a ringtone identified in the routing preference and that is associated with a device in the second set of devices.

17. The system of claim 12, wherein the operations further comprise applying a screening criterion to allow the incoming call, and wherein the screening criterion is associated with an equipment that places the incoming call.

18. A non-transitory computer-readable medium comprising executable instructions that, in response to execution, cause a computing system comprising a processor to perform operations, comprising:
receiving an indication to route an incoming call based on a presence condition of a mobile device in a confined-coverage area, wherein the mobile device is associated with a called device in the incoming call, and the presence condition of the mobile device in the confined-coverage area conveys a registration status of the mobile device with an access point device that serves the confined-coverage area;
based on the presence condition, acquiring a routing preference in a set of routing preferences associated with the called device;
routing the incoming call according to the routing preference, comprising:
in response to the access point device being determined to be associated with an entity that is not a subscriber identity, provisioning a service to direct the incoming call to a wireline device in the confined-coverage area; and
in response to the access point device being determined to be associated with the subscriber identity, provisioning a service to direct the incoming call to another device in the confined-coverage area; and
applying a screening rule to the incoming call prior to the routing based on activation of a filtering service configured to control reception of the incoming call.

19. The non-transitory computer-readable medium of claim 18, wherein the operations further comprise:
applying a screening rule to the incoming call prior to the routing based on activation of a filtering service configured to control reception of the incoming call.

20. The non-transitory computer-readable medium of claim 18, wherein the provisioning the service to direct the incoming call to the wireline device in the confined-coverage area comprises:

receiving an indication that access to wireless coverage through the access point device is granted; and supplying another indication that the service is available for a call session.

\* \* \* \* \*